United States Patent
Babaei et al.

(10) Patent No.: US 12,432,773 B2
(45) Date of Patent: *Sep. 30, 2025

(54) CELL AND BANDWIDTH PART OPERATIONS IN UNLICENSED BANDS

(71) Applicant: Samsung Electronics Co., Ltd., Suwon-si (KR)

(72) Inventors: Alireza Babaei, Fairfax, VA (US); Esmael Hejazi Dinan, McLean, VA (US); Hyoungsuk Jeon, Centreville, VA (US); Hua Zhou, Herndon, VA (US); Kyungmin Park, Vienna, VA (US); Ali Cagatay Cirik, Herndon, VA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 371 days.

This patent is subject to a terminal disclaimer.

(21) Appl. No.: 17/522,362

(22) Filed: Nov. 9, 2021

(65) Prior Publication Data

US 2022/0070928 A1    Mar. 3, 2022

Related U.S. Application Data

(63) Continuation of application No. 16/871,640, filed on May 11, 2020, now Pat. No. 11,184,925, which is a (Continued)

(51) Int. Cl.
*H04W 74/0808* (2024.01)
*H04W 74/00* (2009.01)

(52) U.S. Cl.
CPC ..... *H04W 74/0808* (2013.01); *H04W 74/004* (2013.01)

(58) Field of Classification Search
CPC .......... H04W 74/0808; H04W 74/004; H04W 74/006; H04W 16/14; H04W 72/0453
See application file for complete search history.

(56) References Cited

U.S. PATENT DOCUMENTS

| | | |
|---|---|---|
| 2016/0057731 A1 | 2/2016 | Damnjanovic et al. |
| 2016/0127098 A1* | 5/2016 | Ng ............... H04L 5/001 370/329 |

(Continued)

FOREIGN PATENT DOCUMENTS

| | | |
|---|---|---|
| CN | 107079494 A | 8/2017 |
| CN | 107534908 A | 1/2018 |
| WO | 2020/069114 A1 | 4/2020 |

OTHER PUBLICATIONS

3GPP TS 38.211 V15.2.0 (Jun. 2018); Technical Specification; 3rd Generation Partnership Project; Technical Specification Group Radio Access Network; NR; Physical channels and modulation; (Release 15).

(Continued)

*Primary Examiner* — Fred A Casca
(74) *Attorney, Agent, or Firm* — Jefferson IP Law, LLP

(57) ABSTRACT

A wireless device receives one or more messages comprising a parameter indicating a first value of a listen before talk (LBT) counter. The LBT counter is incremented based on an LBT procedure indicating an LBT failure for an uplink transmission via a first bandwidth part. Based on the LBT counter reaching the first value, a switch is made from the first bandwidth part to a second bandwidth part as an active bandwidth part.

16 Claims, 35 Drawing Sheets

Related U.S. Application Data continuation of application No. PCT/US2019/045288, filed on Aug. 6, 2019.

(60) Provisional application No. 62/714,923, filed on Aug. 6, 2018.

(56) References Cited

U.S. PATENT DOCUMENTS

| | | | |
|---|---|---|---|
| 2016/0278048 A1 | 9/2016 | Nory et al. | |
| 2017/0006599 A1* | 1/2017 | Dinan | H04W 56/0045 |
| 2017/0006640 A1* | 1/2017 | Dinan | H04W 74/0833 |
| 2017/0318607 A1 | 11/2017 | Tiirola et al. | |
| 2017/0359808 A1 | 12/2017 | Dinan | |
| 2018/0077724 A1 | 3/2018 | Kim et al. | |
| 2018/0115394 A1 | 4/2018 | Harada et al. | |
| 2018/0176961 A1* | 6/2018 | Babaei | H04W 74/0833 |
| 2019/0306867 A1 | 10/2019 | Cirik et al. | |
| 2019/0319833 A1 | 10/2019 | Nagaraja et al. | |
| 2019/0349815 A1* | 11/2019 | Tiirola | H04W 72/12 |
| 2020/0288494 A1* | 9/2020 | Heo | H04W 72/20 |
| 2020/0344819 A1* | 10/2020 | Myung | H04W 74/0841 |

OTHER PUBLICATIONS

3GPP TS 38.212 V15.2.0 (Jun. 2018); Technical Specification; 3rd Generation Partnership Project; Technical Specification Group Radio Access Network; NR; Multiplexing and channel coding; (Release 15).

3GPP TS 38.213 V15.2.0 (Jun. 2018); Technical Specification; 3rd Generation Partnership Project; Technical Specification Group Radio Access Network; NR;Physical layer procedures for control (Release 15).

3GPP TS 38.214 V15.2.0 (Jun. 2018); Technical Specification; 3rd Generation Partnership Project; Technical Specification Group Radio Access Network; NR;Physical layer procedures for data (Release 15).

3GPP TS 38.300 V15.2.0 (Jun. 2018); Technical Specification; 3rd Generation Partnership Project; Technical Specification Group Radio Access Network; Nr; Nr and NG-RAN Overall Description; Stage 2; (Release 15).

3GPP TS 38.321 V15.2.0 (Jun. 2018); Technical Specification; 3rd Generation Partnership Project; Technical Specification Group Radio Access Network; NR; Medium Access Control (MAC) protocol specification; (Release 15).

3GPP TS 38.331 V15.2.1 (Jun. 2018); Technical Specification; 3rd Generation Partnership Project; Technical Specification Group Radio Access Network; NR; Radio Resource Control (RRC) protocol specification; (Release 15).

R1-1804680 (R15 NR WI AI 765—BWP for NR-U); 3GPP RAN WG1 Meeting #92bis; Sanya, China, Apr. 16-20, 2018; Agenda Item:7.6.5; Source:InterDigital Inc.; Title:BWP operation in unlicensed spectrum ; Document for: Discussion.

R1-1805923; 3GPP TSG RAN WG1 Meeting #93; Busan, Korea, May 21-May 25, 2018; Agenda Item:7.6.4.5; Source:Huawei, HiSilicon; Title:BWP operation in NR unlicensed band.

R1-1806086; 3GPP TSG RAN WG1 Meeting #93R1-1806086 Busan, Korea, May 21-25, 2018; ; Source:vivo; Title:Discussion on the channel access procedures; Agenda Item:7.6.4.1.

R1-1806106_DL Signals and Channels; 3GPP TSG RAN WG1 Meeting #93; Busan, Korea, May 21-25, 2018; ; Agenda item:7.6.3.1; Source:Nokia, Nokia Shanghai Bell; Title:On DL Signals and Channels for NR-U.

R1-1806112_NRU WB operation; 3GPP TSG RAN WG1 Meeting #93; Busan, Korea, May 21-25, 2018; ; Agenda item:7.6.4.5; Source:Nokia, Nokia Shanghai Bell; Title:On Wideband Operation for NR-U.

R1-1806250 Frame Structure for NR-U; 3GPP TSG-RAN WG1 Meeting #93Tdoc; Busan, Korea, May 21-25, 2018; Agenda Item:7.6.2; Source:Ericsson; Title: Frame structure for NR-U; Document for:Discussion, Decision.

R1-1806459 Discussion on frame structure for NR-U; 3GPP TSG RAN WG1 Meeting #93; Busan, Korea, May 21-25, 2018 ; Title: Discussion on frame structure for NR-U; Source: ZTE; Agenda Item:7.6.2; Document for:Discussion and Decision.

R1-1806462 Discussion on Channel access mechanism for NR-U; 3GPP TSG RAN WG1 Meeting #93; Busan, Korea, May 21-25, 2018; ; Title: Discussion on channel access mechanism for NR-U; Source: ZTE; Agenda Item:7.6.4.1.

R1-1806569 channel access for NR unlicensed operations; 3GPP TSG RAN WG1 Meeting #93; Busan, Korea, May 21-25, 2018; ; Agenda Item:7.6.4.1; Source:Sony; Title:Considerations on channel access for NR unlicensed operations.

R1-1806645; 3GPP TSG RAN WG1 Meeting #93; Busan, Korea, May 21-25, 2018; Agenda Item:7.6.4.1; Source: LG Electronics; Title: Channel access procedure for NR unlicensed operation.

R1-1806648; 3GPP TSG RAN WG1 Meeting #93; Busan, Korea, May 21-25, 2018; Agenda Item:7.6.4.4; Source: LG Electronics; Title: Discussion on configured grant for NR unlicensed operation;.

R1-1806761—Channel access; 3GPP TSG-RAN WG1 Meeting #93; Busan, Korea, May 21-25, 2018; Agenda item:7.6.4.1; Source: Samsung ; Title: Channel access procedures for NR-U; Document for:Discussion and Decision.

R1-1806797_NR-U_channel_access_final; 3GPP TSG RAN WG1 Meeting #93; Busan, Korea, May 21-25, 2018; Agenda item:7.6.4.1; Source: MediaTek Inc .; Title: Channel access to NR-based unlicensed spectrum.

R1-1806968 (R15 NR WI AI 7645-BWP for NR-U); 3GPP RAN WG1 Meeting #93; Busan, Korea, May 21-25, 2018(Update to R1-1804680); Agenda Item:7.6.4.5; Source:InterDigital Inc.; Title:BWP operation in unlicensed spectrum ; Document for Discussion.

R1-1807161.DOC3GPP TSG RAN WG1 Meeting #93 R1-1807161 Busan, Korea, May 21-25, 2018; Agenda Item:7.6.4.1; Source:ITRI; Title:Discussion on NR unlicensed band operation; Document for:Discussion and Decision.

R1-1807204; 3GPP TSG RAN WG1 Meeting #93; Busan, Korea, May 21-25, 2018 ; Source : CATR; Title : Frame structure design in NR-U; Agenda Item: 7.6.2; Document for: Discussion / Decision.

R2-1806836 (R15 NRU SI overview); 3GPP TSG-RAN WG2 Meeting #102; Busan, Korea, May 21-25, 2018 (Resubmission of R2-1804824); Agenda Item:11.2; Source:InterDigital Inc.; Title:Overview of NR-based access to unlicensed spectrum; Document for:Discussion, Decision.

R2-1806837 (R15 NRU SI AI 112 scheduling)—InterDigital; 3GPP TSG-RAN WG2 Meeting #102; Busan, Korea, May 21-25, 2018(Revision of R2-1804825); Agenda Item: 11.2; Source: InterDigital Inc.; Title:Scheduling enhancements for NR-based access to unlicensed spectrum; Document for: Discussion, Decision.

R2-1806886_Report_Email_Discussion_NRU; 3GPP TSG-RAN WG2 Meeting #102; Busan, Korea, May 21-25, 2018; ; Agenda item:11.2 (TBC); Source: Qualcomm Incorporated; Title: Report of Email Discussion [101bis#49][NR] NR unlicensed SI (Qualcomm).

R2-1806891_Channel_Access_NRU; 3GPP TSG-RAN WG2 Meeting #102; Busan, Korea, May 21-25, 2018 (resubmission of R2-1806038); ; ; Agenda item:11.2; Source: Qualcomm Incorporated.

R2-1809610 (R15 NRU SI AI 11.2 Scheduling); 3GPP TSG-RAN WG2 NR AH1807 Meeting; Montreal, Canada, Jul. 2-6, 2018 (Revision of R2-1806837); Agenda Item: 11.2; Source: InterDigital Inc.; Title:Scheduling enhancements for NR-based access to unlicensed spectrum; Document for: Discussion, Decision.

R2-1809840 considerations on configured grant for NR-UI; 3GPP TSG RAN WG2 NR AH1807 Meeting; Montreal, Canada, Jul. 2-6, 2018; Agenda Item: 11.2; Source: ZTE; Title: Considerations on configured grant for NR-U; Document for: Discussion and Decision.

R2-1810122 channel access for NR_U_1.0; 3GPP TSG RAN WG2 AH-1807 Meeting; Montreal, Canada, Jul. 2-6, 2018; ; Agenda Item:11.2; Source:Sony; Title:Considerations on channel access, LBT and mobility enhancements for NR unlicensed operations.

3GPP TSG RAN WG1 Meeting 91 R1-1720475; Reno, US, Nov. 27-Dec. 2, 2017.

3GPP RAN WG1 Meeting #93 R1-1806968; Busan, Korea, May 21-25, 2018 (Update to R1-1804680).

(56) References Cited

OTHER PUBLICATIONS

3GPP TSG RAN WG2 NR AH1807 Meeting R2-1809841; Montreal, Canada, Jul. 2-6, 2018.
ISR PCT/US2019/045288 mailed Jan. 8, 2020.
Ericsson, BWP Inactivity Timer and DRX, 3GPP TSG-RAN WG2 #100 Tdoc R2-1713941, Reno, Nevada, USA, Nov. 27-Dec. 1, 2017.
European Search Report dated Jul. 20, 2022, issued in European Application No. 22175066.4.
Chinese Office Action with English translation dated Sep. 28, 2023; Chinese Appln. No. 2023092802352810.
Indian Office Action dated Nov. 24, 2022, issued in Indian Application No. 202117003620.

* cited by examiner

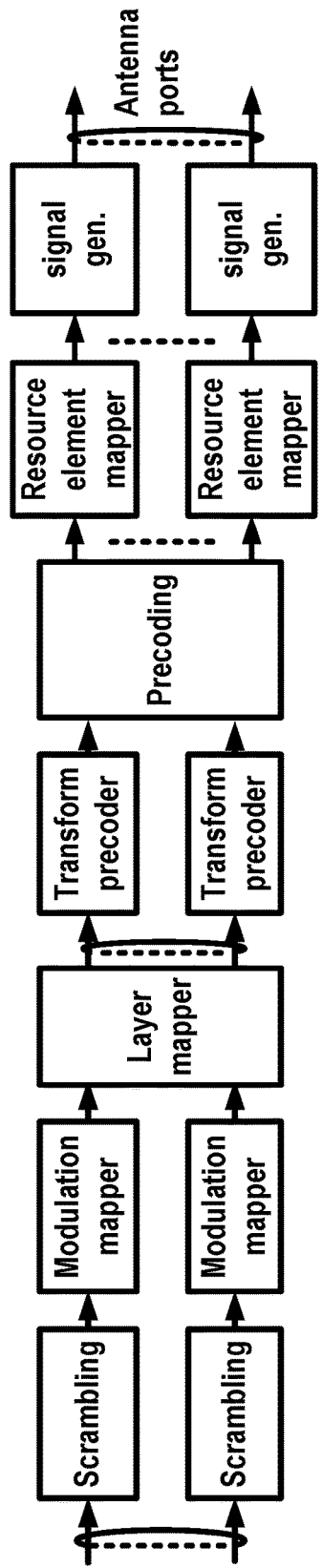
FIG. 4A
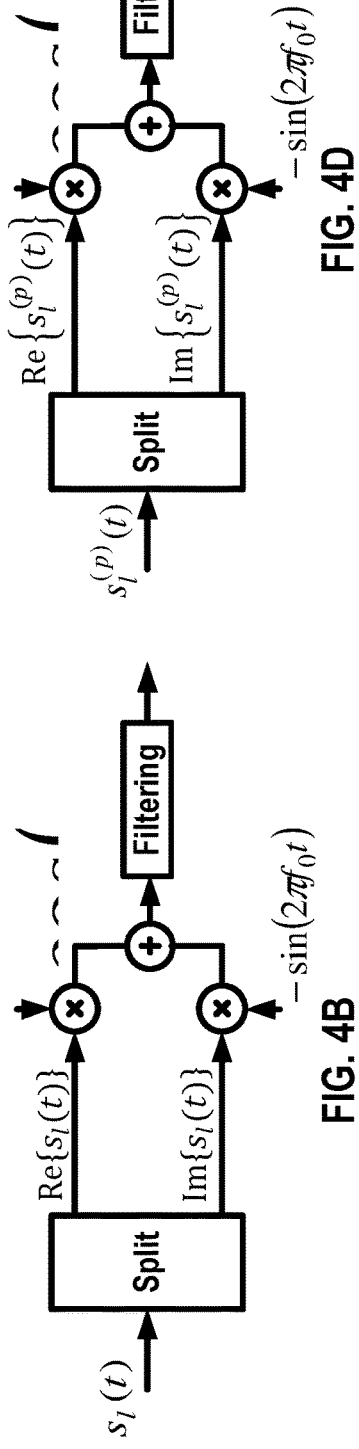
FIG. 4B
FIG. 4D
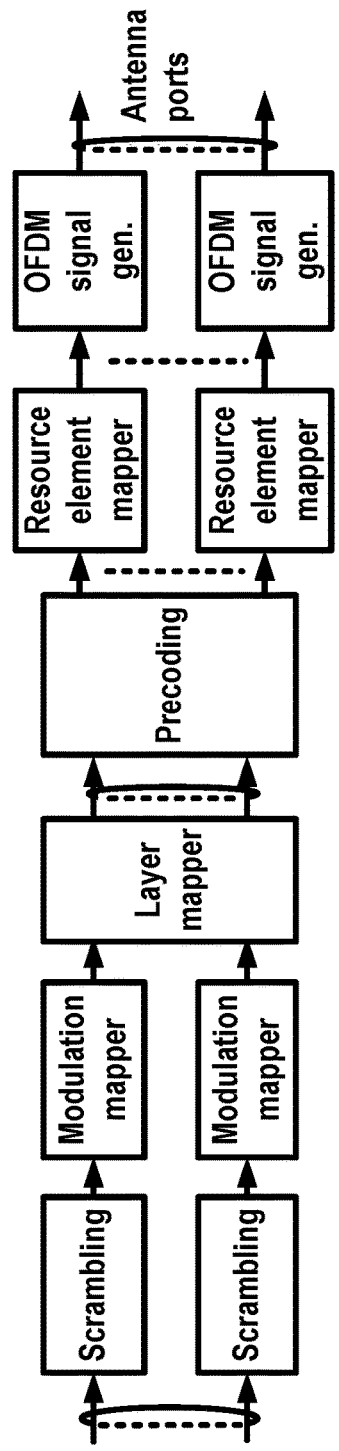
FIG. 4C

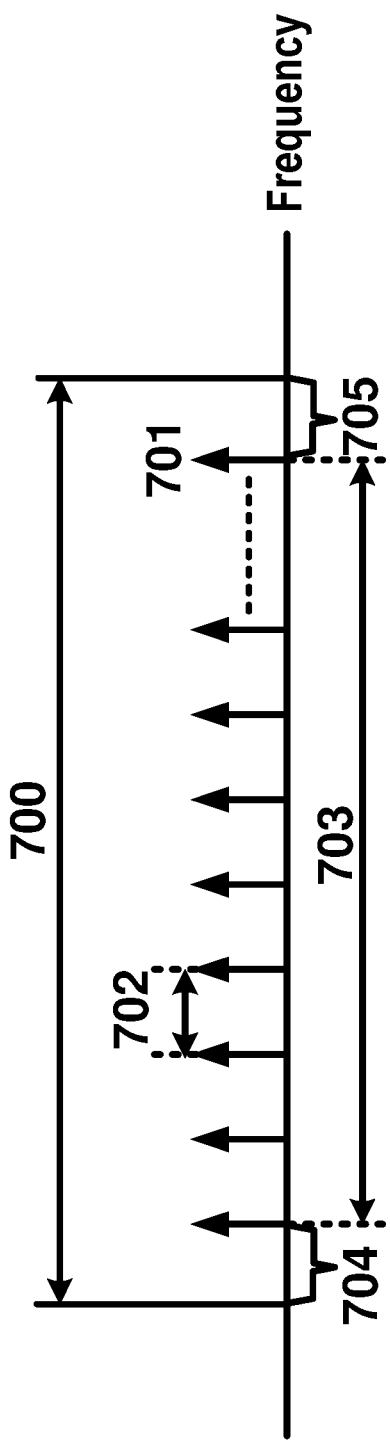
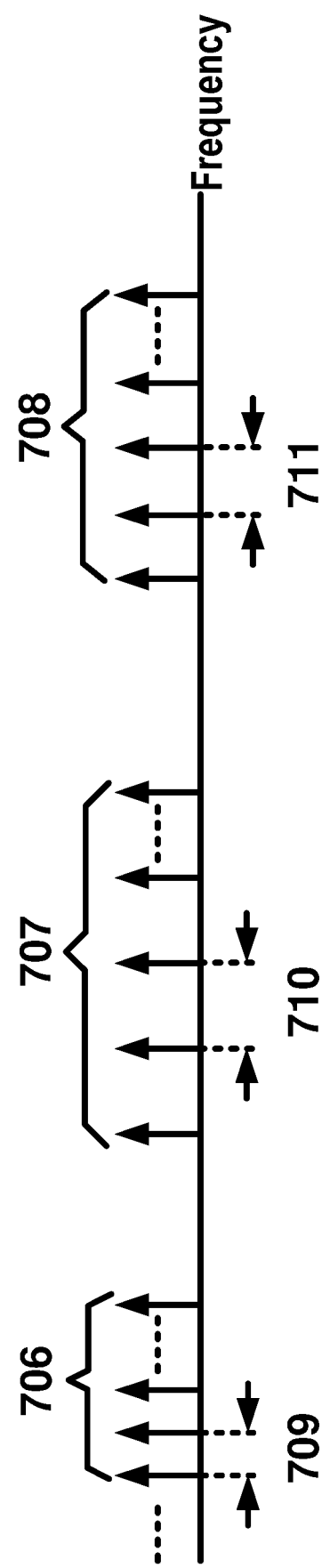

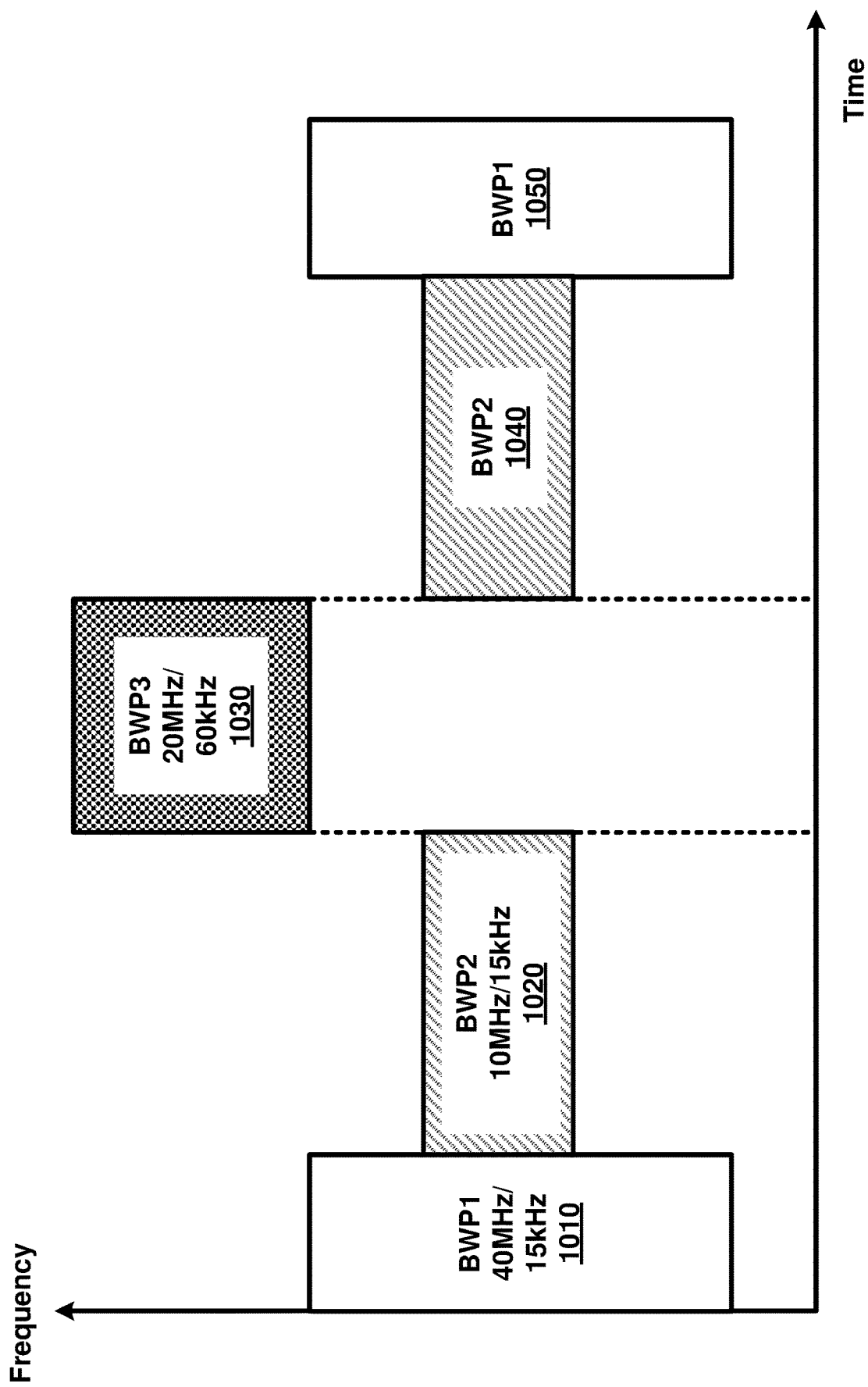

| Channel Access Priority Class ($p$) | QCI |
|---|---|
| 1 | 1, 3, 5, 65, 66, 69, 70 |
| 2 | 2, 7 |
| 3 | 4, 6, 8, 9 |
| 4 | - |

FIG. 16

CELL AND BANDWIDTH PART OPERATIONS IN UNLICENSED BANDS

CROSS-REFERENCE TO RELATED APPLICATIONS

This application is a continuation application of prior application Ser. No. 16/871,640, filed on May 11, 2020, which issued as U.S. Pat. No. 11,184,925 on Nov. 23, 2021, which is a continuation of an International Application No. PCT/US2019/45288, filed Aug. 6, 2019, and is based on and claims priority under 35 U.S.C. § 119(e) of a U.S. Provisional application Ser. No. 62/714,923, filed on Aug. 6, 2018, in the U.S. Patent and Trademark Office, the disclosure of which is incorporated by reference herein in its entirety.

BRIEF DESCRIPTION OF THE SEVERAL VIEWS OF THE DRAWINGS

Examples of several of the various embodiments of the present disclosure are described herein with reference to the drawings.

FIG. 4A, FIG. 4B, FIG. 4C and FIG. 4D are example diagrams for uplink and downlink signal transmission as per an aspect of an embodiment of the present disclosure.

FIG. 7A and FIG. 7B are diagrams depicting example sets of OFDM subcarriers as per an aspect of an embodiment of the present disclosure.

FIG. 10 is an example diagram of configured BWPs as per an aspect of an embodiment of the present disclosure.

FIG. 16 is an example Channel Access Priority to QCI mapping as per an aspect of an embodiment of the present disclosure.

DETAILED DESCRIPTION OF EMBODIMENTS

Figure 1:
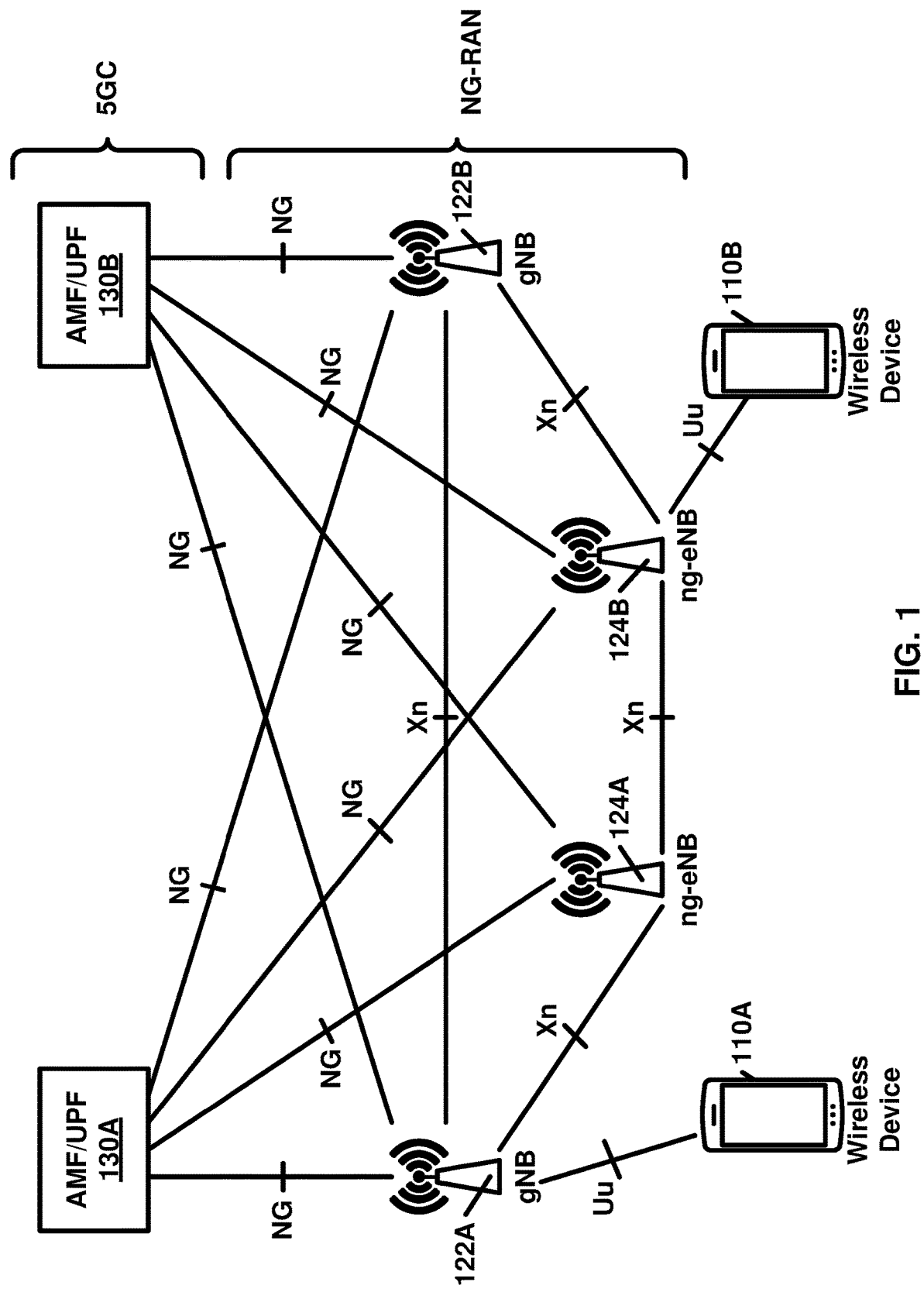
FIG. 1 is a diagram of an example RAN architecture as per an aspect of an embodiment of the present disclosure.

Example embodiments of the present disclosure enable operation of bandwidth parts and carrier aggregation. Embodiments of the technology disclosed herein may be employed in the technical field of multicarrier communication systems. More particularly, the embodiments of the technology disclosed herein may relate to cell and bandwidth part activation/deactivation and/or bandwidth part switching in multicarrier communication systems.

The following Acronyms are used throughout the present disclosure:

| | |
|---|---|
| 3GPP | 3rd Generation Partnership Project |
| 5GC | 5 G Core Network |

| | |
|---|---|
| ACK | Acknowledgement |
| AMF | Access and Mobility Management Function |
| ARQ | Automatic Repeat Request |
| AS | Access Stratum |
| ASIC | Application-Specific Integrated Circuit |
| BA | Bandwidth Adaptation |
| BCCH | Broadcast Control Channel |
| BCH | Broadcast Channel |
| BPSK | Binary Phase Shift Keying |
| BWP | Bandwidth Part |
| CA | Carrier Aggregation |
| CC | Component Carrier |
| CCCH | Common Control CHannel |
| CDMA | Code Division Multiple Access |
| CN | Core Network |
| CP | Cyclic Prefix |
| CP-OFDM | Cyclic Prefix- Orthogonal Frequency Division Multiplex |
| C-RNTI | Cell-Radio Network Temporary Identifier |
| CS | Configured Scheduling |
| CSI | Channel State Information |
| CSI-RS | Channel State Information-Reference Signal |
| CQI | Channel Quality Indicator |
| CSS | Common Search Space |
| CU | Central Unit |
| DC | Dual Connectivity |
| DCCH | Dedicated Control CHannel |
| DCI | Downlink Control Information |
| DL | Downlink |
| DL-SCH | Downlink Shared CHannel |
| DM-RS | DeModulation Reference Signal |
| DRB | Data Radio Bearer |
| DRX | Discontinuous Reception |
| DTCH | Dedicated Traffic CHannel |
| DU | Distributed Unit |
| EPC | Evolved Packet Core |
| E-UTRA | Evolved UMTS Terrestrial Radio Access |
| E-UTRAN | Evolved-Universal Terrestrial Radio Access Network |
| FDD | Frequency Division Duplex |
| FPGA | Field Programmable Gate Arrays |
| F1-C | F1-Control plane |
| F1-U | F1-User plane |
| gNB | next generation Node B |
| HARQ | Hybrid Automatic Repeat reQuest |
| HDL | Hardware Description Languages |
| IE | Information Element |
| IP | Internet Protocol |
| LCID | Logical Channel IDentifier |
| LTE | Long Term Evolution |
| MAC | Media Access Control |
| MCG | Master Cell Group |
| MCS | Modulation and Coding Scheme |
| MeNB | Master evolved Node B |
| MIB | Master Information Block |
| MME | Mobility Management Entity |
| MN | Master Node |
| NACK | Negative Acknowledgement |
| NAS | Non-Access Stratum |
| NG CP | Next Generation Control Plane |
| NGC | Next Generation Core |
| NG-C | NG-Control plane |
| ng-eNB | next generation evolved Node B |
| NG-U | NG-User plane |
| NR | New Radio |
| NR MAC | New Radio MAC |
| NR PDCP | New Radio PDCP |
| NR PHY | New Radio PHYsical |
| NR RLC | New Radio RLC |
| NR RRC | New Radio RRC |
| NSSAI | Network Slice Selection Assistance Information |
| O&M | Operation and Maintenance |
| OFDM | Orthogonal Frequency Division Multiplexing |
| PBCH | Physical Broadcast CHannel |
| PCC | Primary Component Carrier |
| PCCH | Paging Control CHannel |
| PCell | Primary Cell |
| PCH | Paging CHannel |
| PDCCH | Physical Downlink Control CHannel |
| PDCP | Packet Data Convergence Protocol |
| PDSCH | Physical Downlink Shared CHannel |
| PDU | Protocol Data Unit |
| PHICH | Physical HARQ Indicator CHannel |
| PHY | PHYsical |
| PLMN | Public Land Mobile Network |
| PMI | Precoding Matrix Indicator |
| PRACH | Physical Random Access CHannel |
| PRB | Physical Resource Block |
| PSCell | Primary Secondary Cell |
| PSS | Primary Synchronization Signal |
| pTAG | primary Timing Advance Group |
| PT-RS | Phase Tracking Reference Signal |
| PUCCH | Physical Uplink Control CHannel |
| PUSCH | Physical Uplink Shared CHannel |
| QAM | Quadrature Amplitude Modulation |
| QFI | Quality of Service Indicator |
| QoS | Quality of Service |
| QPSK | Quadrature Phase Shift Keying |
| RA | Random Access |
| RACH | Random Access CHannel |
| RAN | Radio Access Network |
| RAT | Radio Access Technology |
| RA-RNTI | Random Access-Radio Network Temporary |
| RB | Resource Blocks |
| RBG | Resource Block Groups |
| RI | Rank Indicator |
| RLC | Radio Link Control |
| RRC | Radio Resource Control |
| RS | Reference Signal |
| RSRP | Reference Signal Received Power |
| SCC | Secondary Component Carrier |
| SCell | Secondary Cell |
| SCG | Secondary Cell Group |
| SC-FDMA | Single Carrier-Frequency Division Multiple Access |
| SDAP | Service Data Adaptation Protocol |
| SDU | Service Data Unit |
| SeNB | Secondary evolved Node B |
| SFN | System Frame Number |
| S-GW | Serving GateWay |
| SI | System Information |
| SIB | System Information Block |
| SMF | Session Management Function |
| SN | Secondary Node |
| SpCell | Special Cell |
| SRB | Signaling Radio Bearer |
| SRS | Sounding Reference Signal |
| SS | Synchronization Signal |
| SSS | Secondary Synchronization Signal |
| sTAG | secondary Timing Advance Group |
| TA | Timing Advance |
| TAG | Timing Advance Group |
| TAI | Tracking Area Identifier |
| TAT | Time Alignment Timer |
| TB | Transport Block |
| TC-RNTI | Temporary Cell-Radio Network Temporary Identifier |
| TDD | Time Division Duplex |
| TDMA | Time Division Multiple Access |
| TTI | Transmission Time Interval |
| UCI | Uplink Control Information |
| UE | User Equipment |
| UL | Uplink |
| UL-SCH | Uplink Shared CHannel |
| UPF | User Plane Function |
| UPGW | User Plane Gateway |
| VHDL | VHSIC Hardware Description Language |
| Xn-C | Xn-Control plane |
| Xn-U | Xn-User plane |

Example embodiments of the disclosure may be implemented using various physical layer modulation and transmission mechanisms. Example transmission mechanisms may include, but are not limited to: Code Division Multiple Access (CDMA), Orthogonal Frequency Division Multiple Access (OFDMA), Time Division Multiple Access (TDMA), Wavelet technologies, and/or the like. Hybrid transmission mechanisms such as TDMA/CDMA, and OFDM/CDMA may also be employed. Various modulation schemes may be applied for signal transmission in the physical layer. Examples of modulation schemes include, but are not limited to: phase, amplitude, code, a combination of these, and/or the like. An example radio transmission method may implement Quadrature Amplitude Modulation (QAM) using Binary Phase Shift Keying (BPSK), Quadrature Phase Shift Keying (QPSK), 16-QAM, 64-QAM, 256-QAM, and/or the like. Physical radio transmission may be enhanced by dynamically or semi-dynamically changing the modulation and coding scheme depending on transmission requirements and radio conditions.

FIG. 1 is an example Radio Access Network (RAN) architecture as per an aspect of an embodiment of the present disclosure. As illustrated in this example, a RAN node may be a next generation Node B (gNB) (e.g. 120A, 120B) providing New Radio (NR) user plane and control plane protocol terminations towards a first wireless device (e.g. 110A). In an example, a RAN node may be a next generation evolved Node B (ng-eNB) (e.g. 124A, 124B), providing Evolved UMTS Terrestrial Radio Access (E-UTRA) user plane and control plane protocol terminations towards a second wireless device (e.g. 110B). The first wireless device may communicate with a gNB over a Uu interface. The second wireless device may communicate with a ng-eNB over a Uu interface. In this disclosure, wireless device 110A and 110B are structurally similar to wireless device 110. Base stations 120A and/or 120B may be structurally similarly to base station 120. Base station 120 may comprise at least one of a gNB (e.g. 122A and/or 122B), ng-eNB (e.g. 124A and/or 124B), and or the like.

A gNB or an ng-eNB may host functions such as: radio resource management and scheduling, IP header compression, encryption and integrity protection of data, selection of Access and Mobility Management Function (AMF) at User Equipment (UE) attachment, routing of user plane and control plane data, connection setup and release, scheduling and transmission of paging messages (originated from the AMF), scheduling and transmission of system broadcast information (originated from the AMF or Operation and Maintenance (O&M)), measurement and measurement reporting configuration, transport level packet marking in the uplink, session management, support of network slicing, Quality of Service (QoS) flow management and mapping to data radio bearers, support of UEs in RRC_INACTIVE state, distribution function for Non-Access Stratum (NAS) messages, RAN sharing, and dual connectivity or tight interworking between NR and E-UTRA.

In an example, one or more gNBs and/or one or more ng-eNBs may be interconnected with each other by means of Xn interface. A gNB or an ng-eNB may be connected by means of NG interfaces to 5G Core Network (5GC). In an example, 5GC may comprise one or more AMF/User Plan Function (UPF) functions (e.g. 130A or 130B). A gNB or an ng-eNB may be connected to a UPF by means of an NG-User plane (NG-U) interface. The NG-U interface may provide delivery (e.g. non-guaranteed delivery) of user plane Protocol Data Units (PDUs) between a RAN node and the UPF. A gNB or an ng-eNB may be connected to an AMF by means of an NG-Control plane (NG-C) interface. The NG-C interface may provide, for example, NG interface management, UE context management, UE mobility management, transport of NAS messages, paging, PDU session management, configuration transfer and/or warning message transmission, combinations thereof, and/or the like.

In an example, a UPF may host functions such as anchor point for intra-/inter-Radio Access Technology (RAT) mobility (when applicable), external PDU session point of interconnect to data network, packet routing and forwarding, packet inspection and user plane part of policy rule enforcement, traffic usage reporting, uplink classifier to support routing traffic flows to a data network, branching point to support multi-homed PDU session, QoS handling for user plane, e.g. packet filtering, gating, Uplink (UL)/Downlink (DL) rate enforcement, uplink traffic verification (e.g. Service Data Flow (SDF) to QoS flow mapping), downlink packet buffering and/or downlink data notification triggering.

In an example, an AMF may host functions such as NAS signaling termination, NAS signaling security, Access Stratum (AS) security control, inter Core Network (CN) node signaling for mobility between $3^{rd}$ Generation Partnership Project (3GPP) access networks, idle mode UE reachability (e.g., control and execution of paging retransmission), registration area management, support of intra-system and inter-system mobility, access authentication, access authorization including check of roaming rights, mobility management control (subscription and policies), support of network slicing and/or Session Management Function (SMF) selection.

Figure 2A:
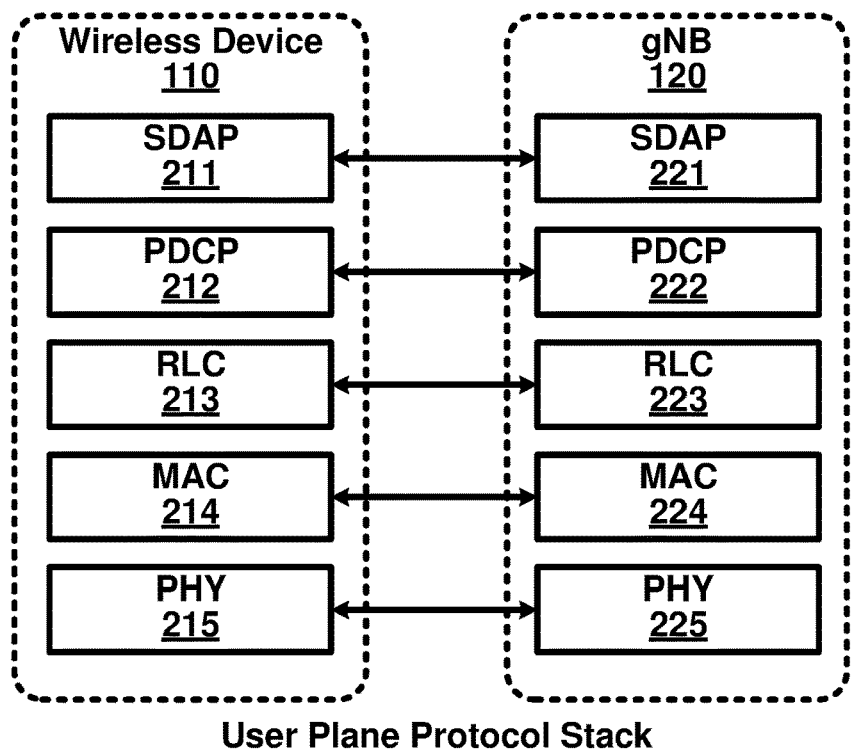
FIG. 2A is a diagram of an example user plane protocol stack as per an aspect of an embodiment of the present disclosure.

FIG. 2A is an example user plane protocol stack, where Service Data Adaptation Protocol (SDAP) (e.g. 211 and 221), Packet Data Convergence Protocol (PDCP) (e.g. 212 and 222), Radio Link Control (RLC) (e.g. 213 and 223) and Media Access Control (MAC) (e.g. 214 and 224) sublayers and Physical (PHY) (e.g. 215 and 225) layer may be terminated in wireless device (e.g. 110) and gNB (e.g. 120) on the network side. In an example, a PHY layer provides transport services to higher layers (e.g. MAC, RRC, etc.). In an example, services and functions of a MAC sublayer may comprise mapping between logical channels and transport channels, multiplexing/demultiplexing of MAC Service Data Units (SDUs) belonging to one or different logical channels into/from Transport Blocks (TBs) delivered to/from the PHY layer, scheduling information reporting, error correction through Hybrid Automatic Repeat request (HARQ) (e.g. one HARQ entity per carrier in case of Carrier Aggregation (CA)), priority handling between UEs by means of dynamic scheduling, priority handling between logical channels of one UE by means of logical channel prioritization, and/or padding. A MAC entity may support one or multiple numerologies and/or transmission timings. In an example, mapping restrictions in a logical channel prioritization may control which numerology and/or transmission timing a logical channel may use. In an example, an RLC sublayer may supports transparent mode (TM), unacknowledged mode (UM) and acknowledged mode (AM) transmission modes. The RLC configuration may be per logical channel with no dependency on numerologies and/or Transmission Time Interval (TTI) durations. In an example, Automatic Repeat Request (ARQ) may operate on any of the numerologies and/or TTI durations the logical channel is configured with. In an example, services and functions of the PDCP layer for the user plane may comprise sequence numbering, header compression and decompression, transfer of user data, reordering and duplicate detection, PDCP PDU routing (e.g. in case of split bearers), retransmission of PDCP SDUs, ciphering, deciphering and integrity protection, PDCP SDU discard, PDCP re-establishment and data recovery for RLC AM, and/or duplication of PDCP PDUs. In an example, services and functions of SDAP may comprise mapping between a QoS flow and a data radio bearer. In an example, services and functions of SDAP may comprise mapping Quality of Service Indicator (QFI) in DL and UL packets. In an example, a protocol entity of SDAP may be configured for an individual PDU session.

Figure 2B:
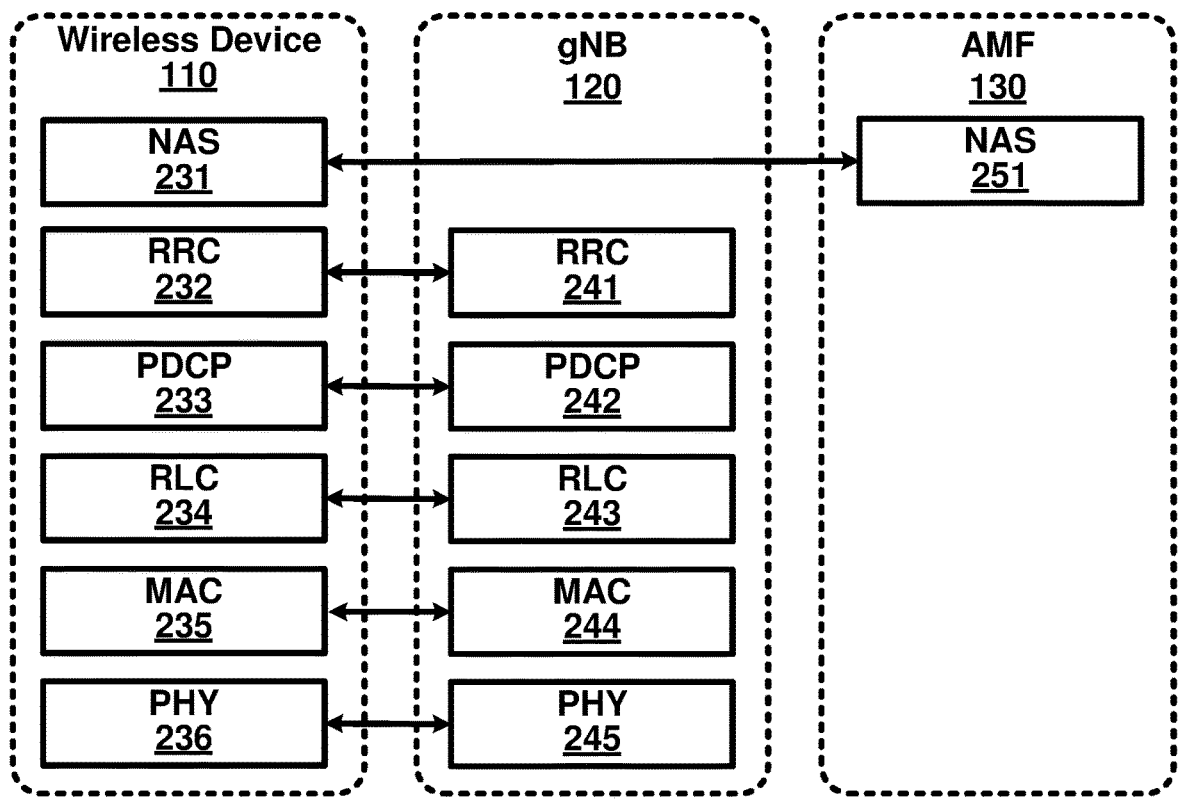
FIG. 2B is a diagram of an example control plane protocol stack as per an aspect of an embodiment of the present disclosure.

FIG. 2B is an example control plane protocol stack where PDCP (e.g. 233 and 242), RLC (e.g. 234 and 243) and MAC (e.g. 235 and 244) sublayers and PHY (e.g. 236 and 245) layer may be terminated in wireless device (e.g. 110) and gNB (e.g. 120) on a network side and perform service and functions described above. In an example, RRC (e.g. 232 and 241) may be terminated in a wireless device and a gNB on a network side. In an example, services and functions of RRC may comprise broadcast of system information related to AS and NAS, paging initiated by 5GC or RAN, establishment, maintenance and release of an RRC connection between the UE and RAN, security functions including key management, establishment, configuration, maintenance and release of Signaling Radio Bearers (SRBs) and Data Radio Bearers (DRBs), mobility functions, QoS management functions, UE measurement reporting and control of the reporting, detection of and recovery from radio link failure, and/or NAS message transfer to/from NAS from/to a UE. In an example, NAS control protocol (e.g. 231 and 251) may be terminated in the wireless device and AMF (e.g. 130) on a network side and may perform functions such as authentication, mobility management between a UE and a AMF for 3GPP access and non-3GPP access, and session management between a UE and a SMF for 3GPP access and non-3GPP access.

In an example, a base station may configure a plurality of logical channels for a wireless device. A logical channel in the plurality of logical channels may correspond to a radio bearer and the radio bearer may be associated with a QoS requirement. In an example, a base station may configure a logical channel to be mapped to one or more TTIs/numerologies in a plurality of TTIs/numerologies. The wireless device may receive a Downlink Control Information (DCI) via Physical Downlink Control CHannel (PDCCH) indicating an uplink grant. In an example, the uplink grant may be for a first TTI/numerology and may indicate uplink resources for transmission of a transport block. The base station may configure each logical channel in the plurality of logical channels with one or more parameters to be used by a logical channel prioritization procedure at the MAC layer of the wireless device. The one or more parameters may comprise priority, prioritized bit rate, etc. A logical channel in the plurality of logical channels may correspond to one or more buffers comprising data associated with the logical channel. The logical channel prioritization procedure may allocate the uplink resources to one or more first logical channels in the plurality of logical channels and/or one or more MAC Control Elements (CEs). The one or more first logical channels may be mapped to the first TTI/numerology. The MAC layer at the wireless device may multiplex one or more MAC CEs and/or one or more MAC SDUs (e.g., logical channel) in a MAC PDU (e.g., transport block). In an example, the MAC PDU may comprise a MAC header comprising a plurality of MAC sub-headers. A MAC sub-header in the plurality of MAC sub-headers may correspond to a MAC CE or a MAC SUD (logical channel) in the one or more MAC CEs and/or one or more MAC SDUs. In an example, a MAC CE or a logical channel may be configured with a Logical Channel IDentifier (LCID). In an example, LCID for a logical channel or a MAC CE may be fixed/pre-configured. In an example, LCID for a logical channel or MAC CE may be configured for the wireless device by the base station. The MAC sub-header corresponding to a MAC CE or a MAC SDU may comprise LCID associated with the MAC CE or the MAC SDU.

In an example, a base station may activate and/or deactivate and/or impact one or more processes (e.g., set values of one or more parameters of the one or more processes or start and/or stop one or more timers of the one or more processes) at the wireless device by employing one or more MAC commands. The one or more MAC commands may comprise one or more MAC control elements. In an example, the one or more processes may comprise activation and/or deactivation of PDCP packet duplication for one or more radio bearers. The base station may transmit a MAC CE comprising one or more fields, the values of the fields indicating activation and/or deactivation of PDCP duplication for the one or more radio bearers. In an example, the one or more processes may comprise Channel State Information (CSI) transmission of on one or more cells. The base station may transmit one or more MAC CEs indicating activation and/or deactivation of the CSI transmission on the one or more cells. In an example, the one or more processes may comprise activation or deactivation of one or more secondary cells. In an example, the base station may transmit a MA CE indicating activation or deactivation of one or more secondary cells. In an example, the base station may transmit one or more MAC CEs indicating starting and/or stopping one or more Discontinuous Reception (DRX) timers at the wireless device. In an example, the base station may transmit one or more MAC CEs indicating one or more timing advance values for one or more Timing Advance Groups (TAGs).

Figure 3:
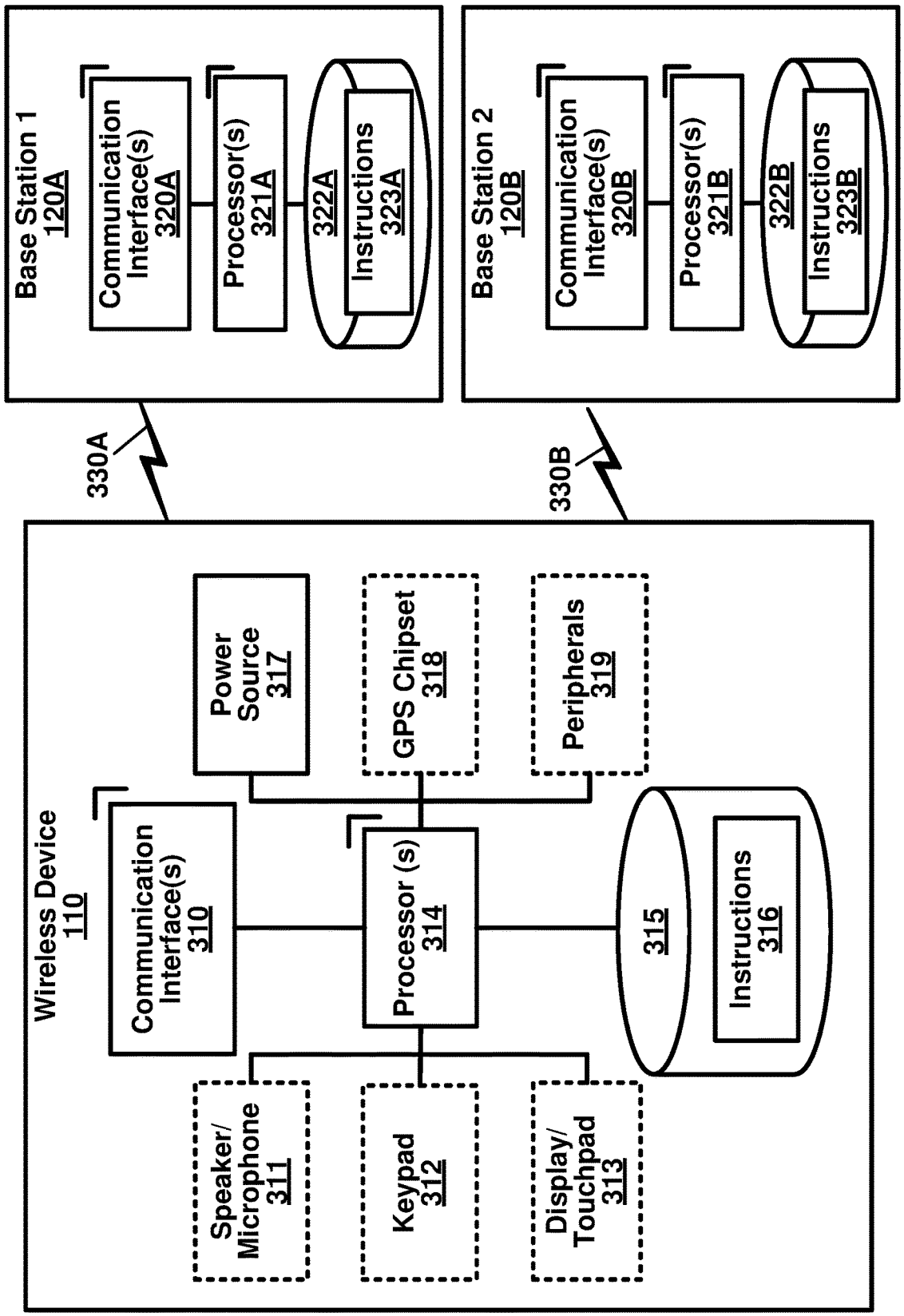
FIG. 3 is a diagram of an example wireless device and two base stations as per an aspect of an embodiment of the present disclosure.

FIG. 3 is a block diagram of base stations (base station 1, 120A, and base station 2, 120B) and a wireless device 110. A wireless device may be called an UE. A base station may be called a NB, eNB, gNB, and/or ng-eNB. In an example, a wireless device and/or a base station may act as a relay node. The base station 1, 120A, may comprise at least one communication interface 320A (e.g. a wireless modem, an antenna, a wired modem, and/or the like), at least one processor 321A, and at least one set of program code instructions 323A stored in non-transitory memory 322A and executable by the at least one processor 321A. The base station 2, 120B, may comprise at least one communication interface 320B, at least one processor 321B, and at least one set of program code instructions 323B stored in non-transitory memory 322B and executable by the at least one processor 321B.

A base station may comprise many sectors for example: 1, 2, 3, 4, or 6 sectors. A base station may comprise many cells, for example, ranging from 1 to 50 cells or more. A cell may be categorized, for example, as a primary cell or secondary cell. At Radio Resource Control (RRC) connection establishment/re-establishment/handover, one serving cell may provide the NAS (non-access stratum) mobility information (e.g. Tracking Area Identifier (TAI)). At RRC connection re-establishment/handover, one serving cell may provide the security input. This cell may be referred to as the Primary Cell (PCell). In the downlink, a carrier corresponding to the PCell may be a DL Primary Component Carrier (PCC), while in the uplink, a carrier may be an UL PCC. Depending on wireless device capabilities, Secondary Cells (SCells) may be configured to form together with a PCell a set of serving cells. In a downlink, a carrier corresponding to an SCell may be a downlink secondary component carrier (DL SCC), while in an uplink, a carrier may be an uplink secondary component carrier (UL SCC). An SCell may or may not have an uplink carrier.

A cell, comprising a downlink carrier and optionally an uplink carrier, may be assigned a physical cell ID and a cell index. A carrier (downlink or uplink) may belong to one cell. The cell ID or cell index may also identify the downlink carrier or uplink carrier of the cell (depending on the context it is used). In the disclosure, a cell ID may be equally referred to a carrier ID, and a cell index may be referred to a carrier index. In an implementation, a physical cell ID or a cell index may be assigned to a cell. A cell ID may be determined using a synchronization signal transmitted on a downlink carrier. A cell index may be determined using RRC messages. For example, when the disclosure refers to a first physical cell ID for a first downlink carrier, the disclosure may mean the first physical cell ID is for a cell comprising the first downlink carrier. The same concept may apply to, for example, carrier activation. When the disclosure indicates that a first carrier is activated, the specification may equally mean that a cell comprising the first carrier is activated.

A base station may transmit to a wireless device one or more messages (e.g. RRC messages) comprising a plurality of configuration parameters for one or more cells. One or more cells may comprise at least one primary cell and at least one secondary cell. In an example, an RRC message may be broadcasted or unicasted to the wireless device. In an example, configuration parameters may comprise common parameters and dedicated parameters.

Services and/or functions of an RRC sublayer may comprise at least one of: broadcast of system information related to AS and NAS; paging initiated by 5GC and/or NG-RAN; establishment, maintenance, and/or release of an RRC connection between a wireless device and NG-RAN, which may comprise at least one of addition, modification and release of carrier aggregation; or addition, modification, and/or release of dual connectivity in NR or between E-UTRA and NR. Services and/or functions of an RRC sublayer may further comprise at least one of security functions comprising key management; establishment, configuration, maintenance, and/or release of Signaling Radio Bearers (SRBs) and/or Data Radio Bearers (DRBs); mobility functions which may comprise at least one of a handover (e.g. intra NR mobility or inter-RAT mobility) and a context transfer; or a wireless device cell selection and reselection and control of cell selection and reselection. Services and/or functions of an RRC sublayer may further comprise at least one of QoS management functions; a wireless device measurement configuration/reporting; detection of and/or recovery from radio link failure; or NAS message transfer to/from a core network entity (e.g. AMF, Mobility Management Entity (MME)) from/to the wireless device.

An RRC sublayer may support an RRC_Idle state, an RRC_Inactive state and/or an RRC_Connected state for a wireless device. In an RRC_Idle state, a wireless device may perform at least one of: Public Land Mobile Network (PLMN) selection; receiving broadcasted system information; cell selection/re-selection; monitoring/receiving a paging for mobile terminated data initiated by 5GC; paging for mobile terminated data area managed by 5GC; or DRX for CN paging configured via NAS. In an RRC_Inactive state, a wireless device may perform at least one of: receiving broadcasted system information; cell selection/re-selection; monitoring/receiving a RAN/CN paging initiated by NG-RAN/5GC; RAN-based notification area (RNA) managed by NG-RAN; or DRX for RAN/CN paging configured by NG-RAN/NAS. In an RRC_Idle state of a wireless device, a base station (e.g. NG-RAN) may keep a 5GC-NG-RAN connection (both C/U-planes) for the wireless device; and/or store a UE AS context for the wireless device. In an RRC_Connected state of a wireless device, a base station (e.g. NG-RAN) may perform at least one of: establishment of 5GC-NG-RAN connection (both C/U-planes) for the wireless device; storing a UE AS context for the wireless device; transmit/receive of unicast data to/from the wireless device; or network-controlled mobility based on measurement results received from the wireless device. In an RRC_Connected state of a wireless device, an NG-RAN may know a cell that the wireless device belongs to.

System information (SI) may be divided into minimum SI and other SI. The minimum SI may be periodically broadcast. The minimum SI may comprise basic information required for initial access and information for acquiring any other SI broadcast periodically or provisioned on-demand, i.e. scheduling information. The other SI may either be broadcast, or be provisioned in a dedicated manner, either triggered by a network or upon request from a wireless device. A minimum SI may be transmitted via two different downlink channels using different messages (e.g. MasterInformationBlock and SystemInformationBlockType1). Another SI may be transmitted via SystemInformationBlockType2. For a wireless device in an RRC_Connected state, dedicated RRC signaling may be employed for the request and delivery of the other SI. For the wireless device in the RRC_Idle state and/or the RRC_Inactive state, the request may trigger a random-access procedure.

A wireless device may report its radio access capability information which may be static. A base station may request what capabilities for a wireless device to report based on band information. When allowed by a network, a temporary capability restriction request may be sent by the wireless device to signal the limited availability of some capabilities (e.g. due to hardware sharing, interference or overheating) to the base station. The base station may confirm or reject the request. The temporary capability restriction may be transparent to 5GC (e.g., static capabilities may be stored in 5GC).

When CA is configured, a wireless device may have an RRC connection with a network. At RRC connection establishment/re-establishment/handover procedure, one serving cell may provide NAS mobility information, and at RRC connection re-establishment/handover, one serving cell may provide a security input. This cell may be referred to as the PCell. Depending on the capabilities of the wireless device, SCells may be configured to form together with the PCell a set of serving cells. The configured set of serving cells for the wireless device may comprise one PCell and one or more SCells.

The reconfiguration, addition and removal of SCells may be performed by RRC. At intra-NR handover, RRC may also add, remove, or reconfigure SCells for usage with the target PCell. When adding a new SCell, dedicated RRC signaling may be employed to send all required system information of the SCell i.e. while in connected mode, wireless devices may not need to acquire broadcasted system information directly from the SCells.

The purpose of an RRC connection reconfiguration procedure may be to modify an RRC connection, (e.g. to establish, modify and/or release RBs, to perform handover, to setup, modify, and/or release measurements, to add, modify, and/or release SCells and cell groups). As part of the RRC connection reconfiguration procedure, NAS dedicated information may be transferred from the network to the wireless device. The RRCConnectionReconfiguration message may be a command to modify an RRC connection. It may convey information for measurement configuration, mobility control, radio resource configuration (e.g. RBs, MAC main configuration and physical channel configuration) comprising any associated dedicated NAS information and security configuration. If the received RRC Connection Reconfiguration message includes the sCellToReleaseList, the wireless device may perform an SCell release. If the received RRC Connection Reconfiguration message includes the sCellToAddModList, the wireless device may perform SCell additions or modification.

An RRC connection establishment (or reestablishment, resume) procedure may be to establish (or reestablish, resume) an RRC connection, an RRC connection establishment procedure may comprise SRB1 establishment. The RRC connection establishment procedure may be used to transfer the initial NAS dedicated information/message from a wireless device to E-UTRAN. The RRCConnectionReestablishment message may be used to re-establish SRB1.

A measurement report procedure may be to transfer measurement results from a wireless device to NG-RAN. The wireless device may initiate a measurement report procedure after successful security activation. A measurement report message may be employed to transmit measurement results.

The wireless device 110 may comprise at least one communication interface 310 (e.g. a wireless modem, an antenna, and/or the like), at least one processor 314, and at least one set of program code instructions 316 stored in non-transitory memory 315 and executable by the at least one processor 314. The wireless device 110 may further comprise at least one of at least one speaker/microphone 311, at least one keypad 312, at least one display/touchpad 313, at least one power source 317, at least one global positioning system (GPS) chipset 318, and other peripherals 319.

The processor 314 of the wireless device 110, the processor 321A of the base station 1 120A, and/or the processor 321B of the base station 2 120B may comprise at least one of a general-purpose processor, a digital signal processor (DSP), a controller, a microcontroller, an application specific integrated circuit (ASIC), a field programmable gate array (FPGA) and/or other programmable logic device, discrete gate and/or transistor logic, discrete hardware components, and the like. The processor 314 of the wireless device 110, the processor 321A in base station 1 120A, and/or the processor 321B in base station 2 120B may perform at least one of signal coding/processing, data processing, power control, input/output processing, and/or any other functionality that may enable the wireless device 110, the base station 1 120A and/or the base station 2 120B to operate in a wireless environment.

The processor 314 of the wireless device 110 may be connected to the speaker/microphone 311, the keypad 312, and/or the display/touchpad 313. The processor 314 may receive user input data from and/or provide user output data to the speaker/microphone 311, the keypad 312, and/or the display/touchpad 313. The processor 314 in the wireless device 110 may receive power from the power source 317 and/or may be configured to distribute the power to the other components in the wireless device 110. The power source 317 may comprise at least one of one or more dry cell batteries, solar cells, fuel cells, and the like. The processor 314 may be connected to the GPS chipset 318. The GPS chipset 318 may be configured to provide geographic location information of the wireless device 110.

The processor 314 of the wireless device 110 may further be connected to other peripherals 319, which may comprise one or more software and/or hardware modules that provide additional features and/or functionalities. For example, the peripherals 319 may comprise at least one of an accelerometer, a satellite transceiver, a digital camera, a universal serial bus (USB) port, a hands-free headset, a frequency modulated (FM) radio unit, a media player, an Internet browser, and the like.

The communication interface 320A of the base station 1, 120A, and/or the communication interface 320B of the base station 2, 120B, may be configured to communicate with the communication interface 310 of the wireless device 110 via a wireless link 330A and/or a wireless link 330B respectively. In an example, the communication interface 320A of the base station 1, 120A, may communicate with the communication interface 320B of the base station 2 and other RAN and core network nodes.

The wireless link 330A and/or the wireless link 330B may comprise at least one of a bi-directional link and/or a directional link. The communication interface 310 of the wireless device 110 may be configured to communicate with the communication interface 320A of the base station 1 120A and/or with the communication interface 320B of the base station 2 120B. The base station 1 120A and the wireless device 110 and/or the base station 2 120B and the wireless device 110 may be configured to send and receive transport blocks via the wireless link 330A and/or via the wireless link 330B, respectively. The wireless link 330A and/or the wireless link 330B may employ at least one frequency carrier. According to some of various aspects of embodiments, transceiver(s) may be employed. A transceiver may be a device that comprises both a transmitter and a receiver. Transceivers may be employed in devices such as wireless devices, base stations, relay nodes, and/or the like. Example embodiments for radio technology implemented in the communication interface 310, 320A, 320B and the wireless link 330A, 330B are illustrated in FIG. 4A, FIG. 4B, FIG. 4C, FIG. 4D, FIG. 6, FIG. 7A, FIG. 7B, FIG. 8, and associated text.

In an example, other nodes in a wireless network (e.g. AMF, UPF, SMF, etc.) may comprise one or more communication interfaces, one or more processors, and memory storing instructions.

A node (e.g. wireless device, base station, AMF, SMF, UPF, servers, switches, antennas, and/or the like) may comprise one or more processors, and memory storing instructions that when executed by the one or more processors causes the node to perform certain processes and/or functions. Example embodiments may enable operation of single-carrier and/or multi-carrier communications. Other example embodiments may comprise a non-transitory tangible computer readable media comprising instructions executable by one or more processors to cause operation of single-carrier and/or multi-carrier communications. Yet other example embodiments may comprise an article of manufacture that comprises a non-transitory tangible computer readable machine-accessible medium having instructions encoded thereon for enabling programmable hardware to cause a node to enable operation of single-carrier and/or multi-carrier communications. The node may include processors, memory, interfaces, and/or the like.

An interface may comprise at least one of a hardware interface, a firmware interface, a software interface, and/or a combination thereof. The hardware interface may comprise connectors, wires, electronic devices such as drivers, amplifiers, and/or the like. The software interface may comprise code stored in a memory device to implement protocol(s), protocol layers, communication drivers, device drivers, combinations thereof, and/or the like. The firmware interface may comprise a combination of embedded hardware and code stored in and/or in communication with a memory device to implement connections, electronic device operations, protocol(s), protocol layers, communication drivers, device drivers, hardware operations, combinations thereof, and/or the like.

FIG. 4A, FIG. 4B, FIG. 4C and FIG. 4D are example diagrams for uplink and downlink signal transmission as per an aspect of an embodiment of the present disclosure. FIG. 4A shows an example uplink transmitter for at least one physical channel. A baseband signal representing a physical uplink shared channel may perform one or more functions. The one or more functions may comprise at least one of: scrambling; modulation of scrambled bits to generate complex-valued symbols; mapping of the complex-valued modulation symbols onto one or several transmission layers; transform precoding to generate complex-valued symbols; precoding of the complex-valued symbols; mapping of precoded complex-valued symbols to resource elements; generation of complex-valued time-domain Single Carrier-Frequency Division Multiple Access (SC-FDMA) or CP-OFDM signal for an antenna port; and/or the like. In an example, when transform precoding is enabled, a SC-FDMA signal for uplink transmission may be generated. In an example, when transform precoding is not enabled, an CP-OFDM signal for uplink transmission may be generated by FIG. 4A. These functions are illustrated as examples and it is anticipated that other mechanisms may be implemented in various embodiments.

An example structure for modulation and up-conversion to the carrier frequency of the complex-valued SC-FDMA or CP-OFDM baseband signal for an antenna port and/or the complex-valued Physical Random Access CHannel (PRACH) baseband signal is shown in FIG. 4B. Filtering may be employed prior to transmission.

An example structure for downlink transmissions is shown in FIG. 4C. The baseband signal representing a downlink physical channel may perform one or more functions. The one or more functions may comprise: scrambling of coded bits in a codeword to be transmitted on a physical channel; modulation of scrambled bits to generate complex-valued modulation symbols; mapping of the complex-valued modulation symbols onto one or several transmission layers; precoding of the complex-valued modulation symbols on a layer for transmission on the antenna ports; mapping of complex-valued modulation symbols for an antenna port to resource elements; generation of complex-valued time-domain OFDM signal for an antenna port; and/or the like. These functions are illustrated as examples and it is anticipated that other mechanisms may be implemented in various embodiments.

In an example, a gNB may transmit a first symbol and a second symbol on an antenna port, to a wireless device. The wireless device may infer the channel (e.g., fading gain, multipath delay, etc.) for conveying the second symbol on the antenna port, from the channel for conveying the first symbol on the antenna port. In an example, a first antenna port and a second antenna port may be quasi co-located if one or more large-scale properties of the channel over which a first symbol on the first antenna port is conveyed may be inferred from the channel over which a second symbol on a second antenna port is conveyed. The one or more large-scale properties may comprise at least one of: delay spread; doppler spread; doppler shift; average gain; average delay; and/or spatial Receiving (Rx) parameters.

An example modulation and up-conversion to the carrier frequency of the complex-valued OFDM baseband signal for an antenna port is shown in FIG. 4D. Filtering may be employed prior to transmission.

Figure 5A:
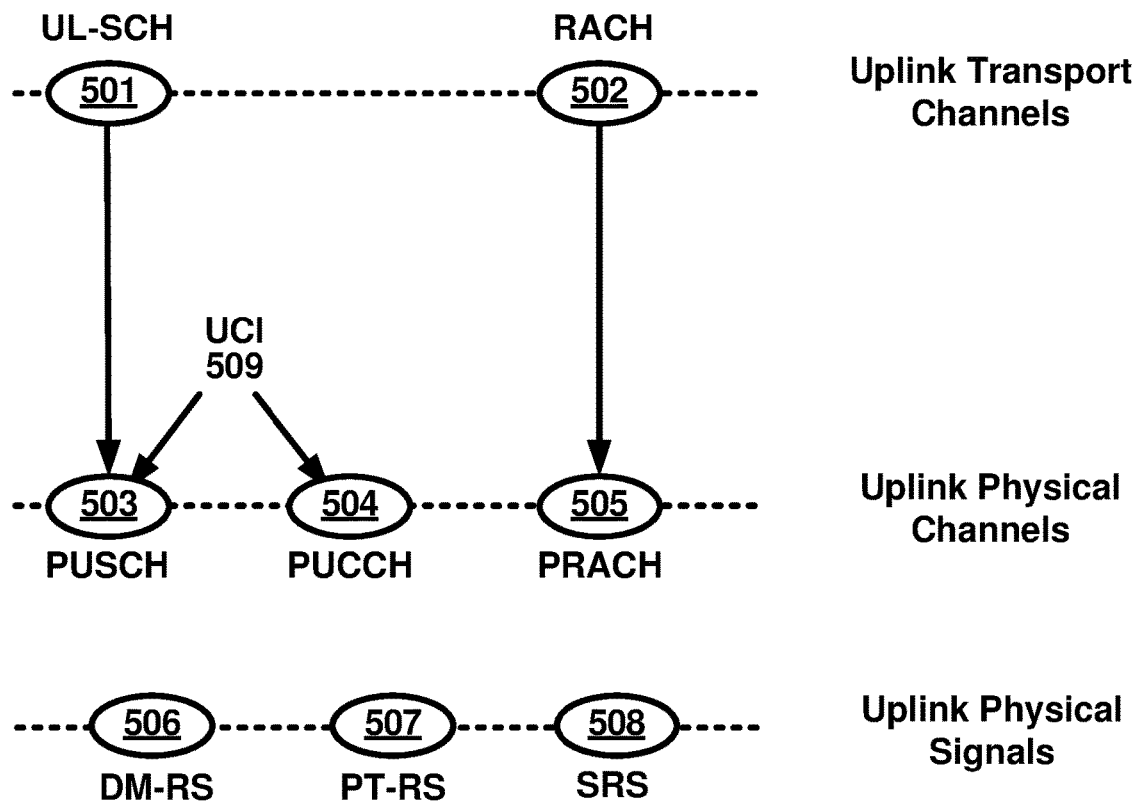
FIG. 5A is a diagram of an example uplink channel mapping and example uplink physical signals as per an aspect of an embodiment of the present disclosure.
Figure 5B:
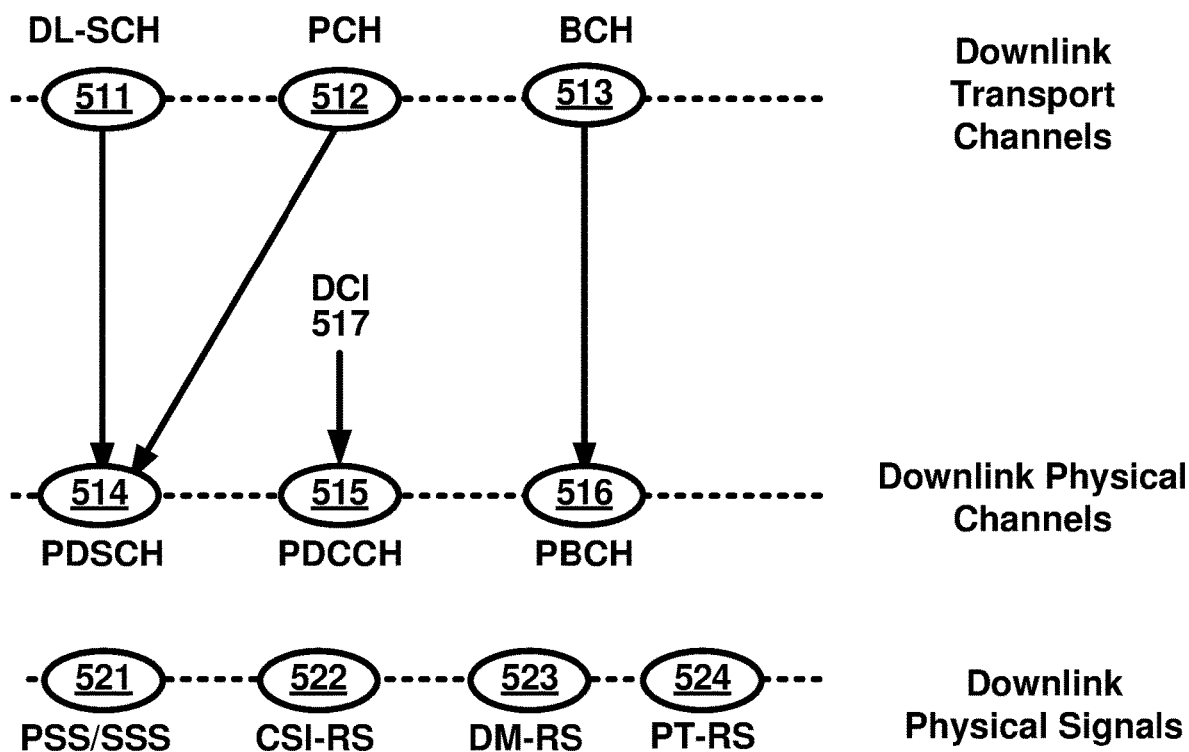
FIG. 5B is a diagram of an example downlink channel mapping and example downlink physical signals as per an aspect of an embodiment of the present disclosure.

FIG. 5A is a diagram of an example uplink channel mapping and example uplink physical signals. FIG. 5B is a diagram of an example downlink channel mapping and a downlink physical signals. In an example, a physical layer may provide one or more information transfer services to a MAC and/or one or more higher layers. For example, the physical layer may provide the one or more information transfer services to the MAC via one or more transport channels. An information transfer service may indicate how and with what characteristics data are transferred over the radio interface.

In an example embodiment, a radio network may comprise one or more downlink and/or uplink transport channels. For example, a diagram in FIG. 5A shows example uplink transport channels comprising Uplink-Shared CHannel (UL-SCH) 501 and Random Access CHannel (RACH) 502. A diagram in FIG. 5B shows example downlink transport channels comprising Downlink-Shared CHannel (DL-SCH) 511, Paging CHannel (PCH) 512, and Broadcast CHannel (BCH) 513. A transport channel may be mapped to one or more corresponding physical channels. For example, UL-SCH 501 may be mapped to Physical Uplink Shared CHannel (PUSCH) 503. RACH 502 may be mapped to PRACH 505. DL-SCH 511 and PCH 512 may be mapped to Physical Downlink Shared CHannel (PDSCH) 514. BCH 513 may be mapped to Physical Broadcast CHannel (PBCH) 516.

There may be one or more physical channels without a corresponding transport channel. The one or more physical channels may be employed for Uplink Control Information (UCI) 509 and/or Downlink Control Information (DCI) 517. For example, Physical Uplink Control CHannel (PUCCH) 504 may carry UCI 509 from a UE to a base station. For example, Physical Downlink Control CHannel (PDCCH) 515 may carry DCI 517 from a base station to a UE. NR may support UCI 509 multiplexing in PUSCH 503 when UCI 509 and PUSCH 503 transmissions may coincide in a slot at least in part. The UCI 509 may comprise at least one of CSI, Acknowledgement (ACK)/Negative Acknowledgement (NACK), and/or scheduling request. The DCI 517 on PDCCH 515 may indicate at least one of following: one or more downlink assignments and/or one or more uplink scheduling grants In uplink, a UE may transmit one or more Reference Signals (RSs) to a base station. For example, the one or more RSs may be at least one of Demodulation-RS (DM-RS) 506, Phase Tracking-RS (PT-RS) 507, and/or Sounding RS (SRS) 508. In downlink, a base station may transmit (e.g., unicast, multicast, and/or broadcast) one or more RSs to a UE. For example, the one or more RSs may be at least one of Primary Synchronization Signal (PSS)/Secondary Synchronization Signal (SSS) 521, CSI-RS 522, DM-RS 523, and/or PT-RS 524.

In an example, a UE may transmit one or more uplink DM-RSs 506 to a base station for channel estimation, for example, for coherent demodulation of one or more uplink physical channels (e.g., PUSCH 503 and/or PUCCH 504). For example, a UE may transmit a base station at least one uplink DM-RS 506 with PUSCH 503 and/or PUCCH 504, wherein the at least one uplink DM-RS 506 may be spanning a same frequency range as a corresponding physical channel. In an example, a base station may configure a UE with one or more uplink DM-RS configurations. At least one DM-RS configuration may support a front-loaded DM-RS pattern. A front-loaded DM-RS may be mapped over one or more OFDM symbols (e.g., 1 or 2 adjacent OFDM symbols). One or more additional uplink DM-RS may be configured to transmit at one or more symbols of a PUSCH and/or PUCCH. A base station may semi-statistically configure a UE with a maximum number of front-loaded DM-RS symbols for PUSCH and/or PUCCH. For example, a UE may schedule a single-symbol DM-RS and/or double symbol DM-RS based on a maximum number of front-loaded DM-RS symbols, wherein a base station may configure the UE with one or more additional uplink DM-RS for PUSCH and/or PUCCH. A new radio network may support, e.g., at least for CP-OFDM, a common DM-RS structure for DL and UL, wherein a DM-RS location, DM-RS pattern, and/or scrambling sequence may be same or different.

In an example, whether uplink PT-RS 507 is present or not may depend on a RRC configuration. For example, a presence of uplink PT-RS may be UE-specifically configured. For example, a presence and/or a pattern of uplink PT-RS 507 in a scheduled resource may be UE-specifically configured by a combination of RRC signaling and/or association with one or more parameters employed for other purposes (e.g., Modulation and Coding Scheme (MCS)) which may be indicated by DCI. When configured, a dynamic presence of uplink PT-RS 507 may be associated with one or more DCI parameters comprising at least MCS. A radio network may support plurality of uplink PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, uplink PT-RS 507 may be confined in the scheduled time/frequency duration for a UE.

In an example, a UE may transmit SRS 508 to a base station for channel state estimation to support uplink channel dependent scheduling and/or link adaptation. For example, SRS 508 transmitted by a UE may allow for a base station to estimate an uplink channel state at one or more different frequencies. A base station scheduler may employ an uplink channel state to assign one or more resource blocks of good quality for an uplink PUSCH transmission from a UE. A base station may semi-statistically configure a UE with one or more SRS resource sets. For an SRS resource set, a base station may configure a UE with one or more SRS resources. An SRS resource set applicability may be configured by a higher layer (e.g., RRC) parameter. For example, when a higher layer parameter indicates beam management, a SRS resource in each of one or more SRS resource sets may be transmitted at a time instant. A UE may transmit one or more SRS resources in different SRS resource sets simultaneously. A new radio network may support aperiodic, periodic and/or semi-persistent SRS transmissions. A UE may transmit SRS resources based on one or more trigger types, wherein the one or more trigger types may comprise higher layer signaling (e.g., RRC) and/or one or more DCI formats (e.g., at least one DCI format may be employed for a UE to select at least one of one or more configured SRS resource sets. An SRS trigger type 0 may refer to an SRS triggered based on a higher layer signaling. An SRS trigger type 1 may refer to an SRS triggered based on one or more DCI formats. In an example, when PUSCH 503 and SRS 508 are transmitted in a same slot, a UE may be configured to transmit SRS 508 after a transmission of PUSCH 503 and corresponding uplink DM-RS 506.

In an example, a base station may semi-statistically configure a UE with one or more SRS configuration parameters indicating at least one of following: a SRS resource configuration identifier, a number of SRS ports, time domain behavior of SRS resource configuration (e.g., an indication of periodic, semi-persistent, or aperiodic SRS), slot (mini-slot, and/or subframe) level periodicity and/or offset for a periodic and/or aperiodic SRS resource, a number of OFDM symbols in a SRS resource, starting OFDM symbol of a SRS resource, a SRS bandwidth, a frequency hopping bandwidth, a cyclic shift, and/or a SRS sequence ID.

In an example, in a time domain, an SS/PBCH block may comprise one or more OFDM symbols (e.g., 4 OFDM symbols numbered in increasing order from 0 to 3) within the SS/PBCH block. An SS/PBCH block may comprise PSS/SSS 521 and PBCH 516. In an example, in the frequency domain, an SS/PBCH block may comprise one or more contiguous subcarriers (e.g., 240 contiguous subcarriers with the subcarriers numbered in increasing order from 0 to 239) within the SS/PBCH block. For example, a PSS/SSS 521 may occupy 1 OFDM symbol and 127 subcarriers. For example, PBCH 516 may span across 3 OFDM symbols and 240 subcarriers. A UE may assume that one or more SS/PBCH blocks transmitted with a same block index may be quasi co-located, e.g., with respect to Doppler spread, Doppler shift, average gain, average delay, and spatial Rx parameters. A UE may not assume quasi co-location for other SS/PBCH block transmissions. A periodicity of an SS/PBCH block may be configured by a radio network (e.g., by an RRC signaling) and one or more time locations where the SS/PBCH block may be sent may be determined by sub-carrier spacing. In an example, a UE may assume a band-specific sub-carrier spacing for an SS/PBCH block unless a radio network has configured a UE to assume a different sub-carrier spacing.

In an example, downlink CSI-RS 522 may be employed for a UE to acquire channel state information. A radio network may support periodic, aperiodic, and/or semi-persistent transmission of downlink CSI-RS 522. For example, a base station may semi-statistically configure and/or reconfigure a UE with periodic transmission of downlink CSI-RS 522. A configured CSI-RS resources may be activated ad/or deactivated. For semi-persistent transmission, an activation and/or deactivation of CSI-RS resource may be triggered dynamically. In an example, CSI-RS configuration may comprise one or more parameters indicating at least a number of antenna ports. For example, a base station may configure a UE with 32 ports. A base station may semi-statistically configure a UE with one or more CSI-RS resource sets. One or more CSI-RS resources may be allocated from one or more CSI-RS resource sets to one or more UEs. For example, a base station may semi-statistically configure one or more parameters indicating CSI RS resource mapping, for example, time-domain location of one or more CSI-RS resources, a bandwidth of a CSI-RS resource, and/or a periodicity. In an example, a UE may be configured to employ a same OFDM symbols for downlink CSI-RS 522 and control resource set (coreset) when the downlink CSI-RS 522 and coreset are spatially quasi co-located and resource elements associated with the downlink CSI-RS 522 are the outside of PRBs configured for coreset. In an example, a UE may be configured to employ a same OFDM symbols for downlink CSI-RS 522 and SSB/PBCH when the downlink CSI-RS 522 and SSB/PBCH are spatially quasi co-located and resource elements associated with the downlink CSI-RS 522 are the outside of PRBs configured for SSB/PBCH.

In an example, a UE may transmit one or more downlink DM-RSs 523 to a base station for channel estimation, for example, for coherent demodulation of one or more downlink physical channels (e.g., PDSCH 514). For example, a radio network may support one or more variable and/or configurable DM-RS patterns for data demodulation. At least one downlink DM-RS configuration may support a front-loaded DM-RS pattern. A front-loaded DM-RS may be mapped over one or more OFDM symbols (e.g., 1 or 2 adjacent OFDM symbols). A base station may semi-statically configure a UE with a maximum number of front-loaded DM-RS symbols for PDSCH 514. For example, a DM-RS configuration may support one or more DM-RS ports. For example, for single user-MIMO, a DM-RS configuration may support at least 8 orthogonal downlink DM-RS ports. For example, for multiuser-MIMO, a DM-RS configuration may support 12 orthogonal downlink DM-RS ports. A radio network may support, e.g., at least for CP-OFDM, a common DM-RS structure for DL and UL, wherein a DM-RS location, DM-RS pattern, and/or scrambling sequence may be same or different.

In an example, whether downlink PT-RS 524 is present or not may depend on a RRC configuration. For example, a presence of downlink PT-RS 524 may be UE-specifically configured. For example, a presence and/or a pattern of downlink PT-RS 524 in a scheduled resource may be UE-specifically configured by a combination of RRC signaling and/or association with one or more parameters employed for other purposes (e.g., MCS) which may be indicated by DCI. When configured, a dynamic presence of downlink PT-RS 524 may be associated with one or more DCI parameters comprising at least MCS. A radio network may support plurality of PT-RS densities defined in time/frequency domain. When present, a frequency domain density may be associated with at least one configuration of a scheduled bandwidth. A UE may assume a same precoding for a DMRS port and a PT-RS port. A number of PT-RS ports may be fewer than a number of DM-RS ports in a scheduled resource. For example, downlink PT-RS 524 may be confined in the scheduled time/frequency duration for a UE.

Figure 6:
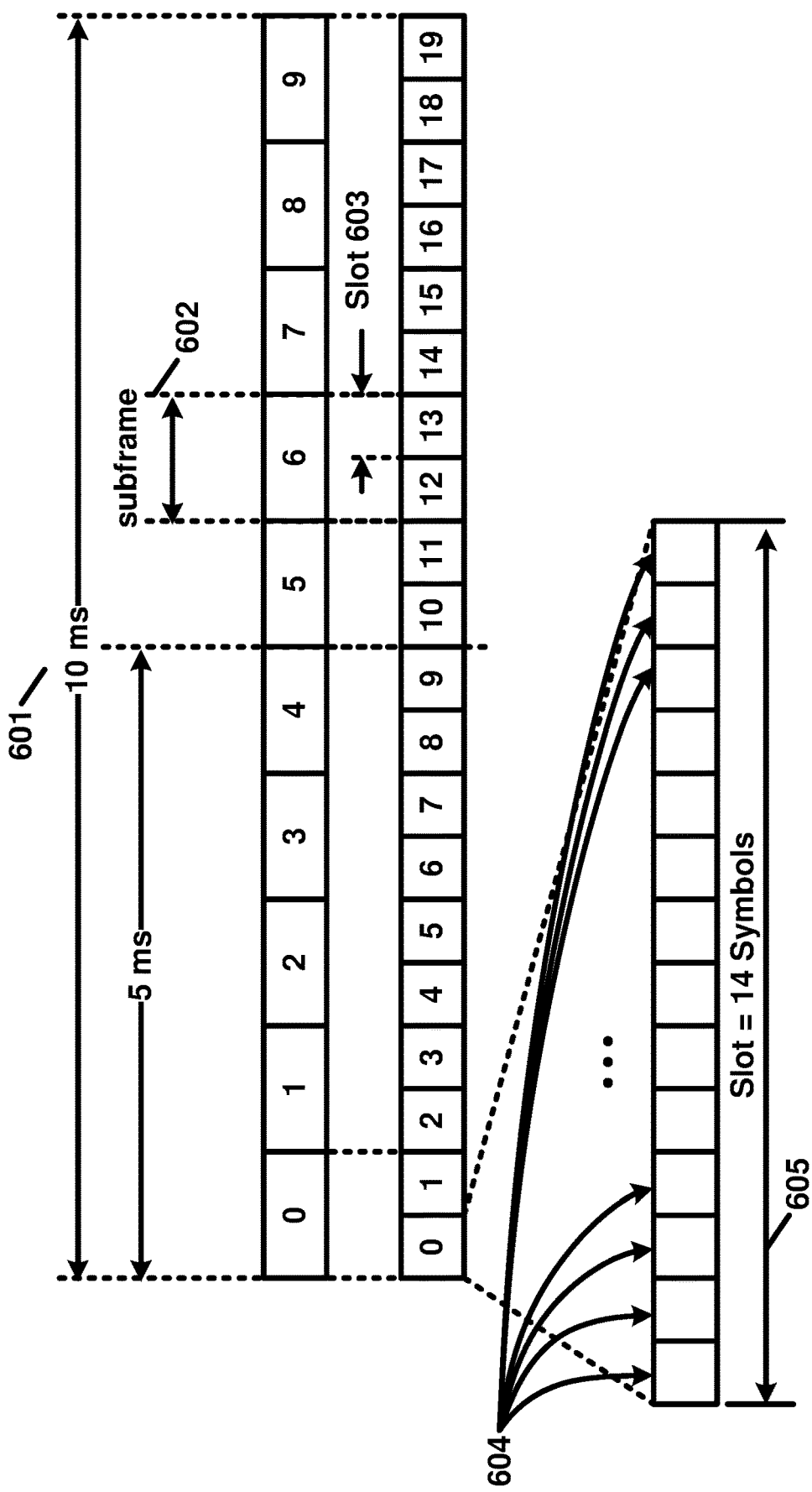
FIG. 6 is a diagram depicting an example frame structure as per an aspect of an embodiment of the present disclosure.

FIG. 6 is a diagram depicting an example frame structure for a carrier as per an aspect of an embodiment of the present disclosure. A multicarrier OFDM communication system may include one or more carriers, for example, ranging from 1 to 32 carriers, in case of carrier aggregation, or ranging from 1 to 64 carriers, in case of dual connectivity. Different radio frame structures may be supported (e.g., for FDD and for TDD duplex mechanisms). FIG. 6 shows an example frame structure. Downlink and uplink transmissions may be organized into radio frames 601. In this example, radio frame duration is 10 ms. In this example, a 10 ms radio frame 601 may be divided into ten equally sized subframes 602 with 1 ms duration. Subframe(s) may comprise one or more slots (e.g. slots 603 and 605) depending on subcarrier spacing and/or CP length. For example, a subframe with 15 kHz, 30 kHz, 60 kHz, 120 kHz, 240 kHz and 480 kHz subcarrier spacing may comprise one, two, four, eight, sixteen and thirty-two slots, respectively. In FIG. 6, a subframe may be divided into two equally sized slots 603 with 0.5 ms duration. For example, 10 subframes may be available for downlink transmission and 10 subframes may be available for uplink transmissions in a 10 ms interval. Uplink and downlink transmissions may be separated in the frequency domain. Slot(s) may include a plurality of OFDM symbols 604. The number of OFDM symbols 604 in a slot 605 may depend on the cyclic prefix length. For example, a slot may be 14 OFDM symbols for the same subcarrier spacing of up to 480 kHz with normal CP. A slot may be 12 OFDM symbols for the same subcarrier spacing of 60 kHz with extended CP. A slot may contain downlink, uplink, or a downlink part and an uplink part and/or alike.

FIG. 7A is a diagram depicting example sets of OFDM subcarriers as per an aspect of an embodiment of the present disclosure. In the example, a gNB may communicate with a wireless device with a carrier with an example channel bandwidth 700. Arrow(s) in the diagram may depict a subcarrier in a multicarrier OFDM system. The OFDM system may use technology such as OFDM technology, SC-FDMA technology, and/or the like. In an example, an arrow 701 shows a subcarrier transmitting information symbols. In an example, a subcarrier spacing 702, between two contiguous subcarriers in a carrier, may be any one of 15 KHz, 30 KHz, 60 KHz, 120 KHz, 240 KHz etc. In an example, different subcarrier spacing may correspond to different transmission numerologies. In an example, a transmission numerology may comprise at least: a numerology index; a value of subcarrier spacing; a type of cyclic prefix (CP). In an example, a gNB may transmit to/receive from a UE on a number of subcarriers 703 in a carrier. In an example, a bandwidth occupied by a number of subcarriers 703 (transmission bandwidth) may be smaller than the channel bandwidth 700 of a carrier, due to guard band 704 and 705. In an example, a guard band 704 and 705 may be used to reduce interference to and from one or more neighbor carriers. A number of subcarriers (transmission bandwidth) in a carrier may depend on the channel bandwidth of the carrier and the subcarrier spacing. For example, a transmission bandwidth, for a carrier with 20 MHz channel bandwidth and 15 KHz subcarrier spacing, may be in number of 1024 subcarriers.

In an example, a gNB and a wireless device may communicate with multiple CCs when configured with CA. In an example, different component carriers may have different bandwidth and/or subcarrier spacing, if CA is supported. In an example, a gNB may transmit a first type of service to a UE on a first component carrier. The gNB may transmit a second type of service to the UE on a second component carrier. Different type of services may have different service requirement (e.g., data rate, latency, reliability), which may be suitable for transmission via different component carrier having different subcarrier spacing and/or bandwidth. FIG. 7B shows an example embodiment. A first component carrier may comprise a first number of subcarriers 706 with a first subcarrier spacing 709. A second component carrier may comprise a second number of subcarriers 707 with a second subcarrier spacing 710. A third component carrier may comprise a third number of subcarriers 708 with a third subcarrier spacing 711. Carriers in a multicarrier OFDM communication system may be contiguous carriers, non-contiguous carriers, or a combination of both contiguous and non-contiguous carriers.

Figure 8:
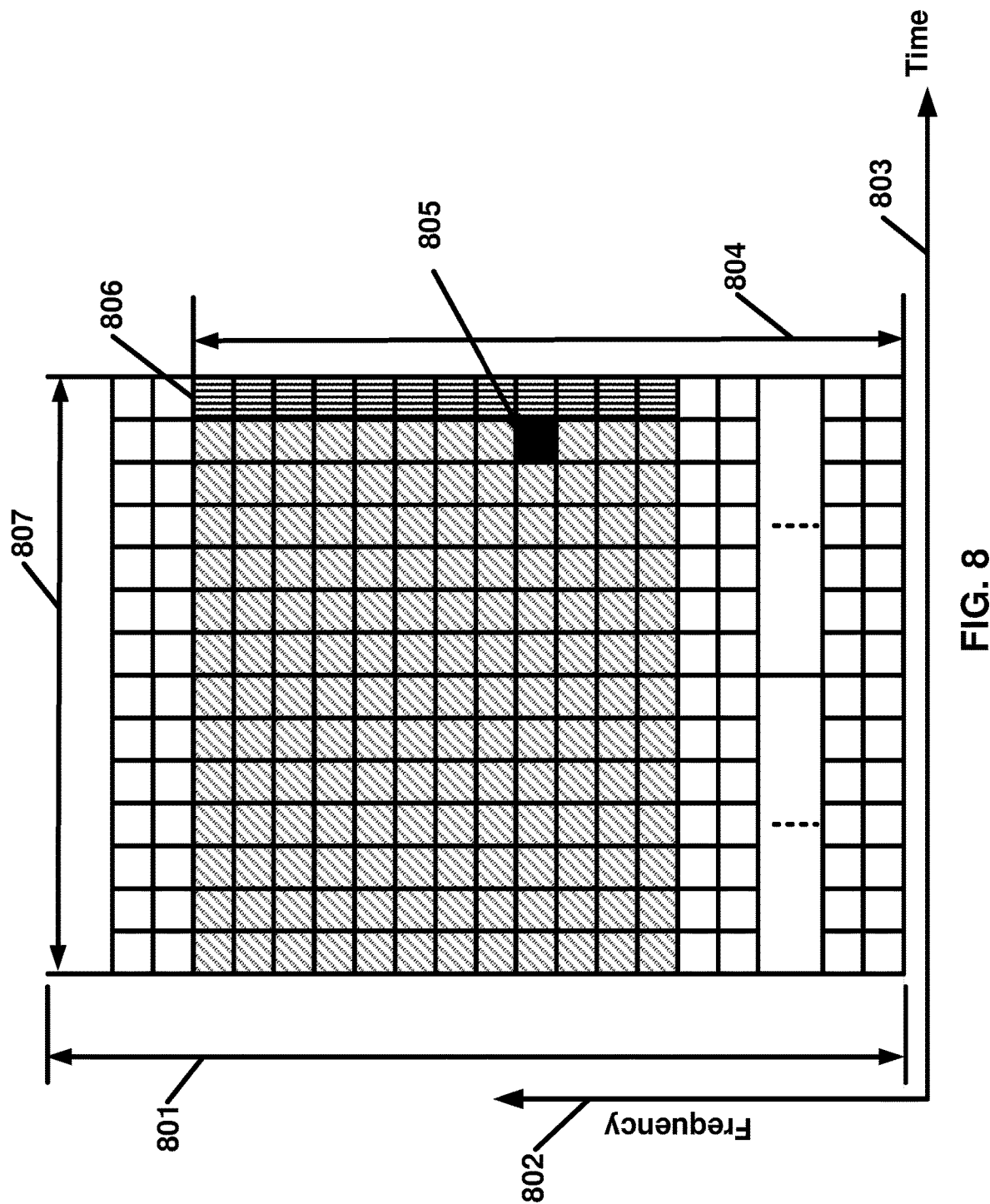
FIG. 8 is a diagram depicting example OFDM radio resources as per an aspect of an embodiment of the present disclosure.

FIG. 8 is a diagram depicting OFDM radio resources as per an aspect of an embodiment of the present disclosure. In an example, a carrier may have a transmission bandwidth 801. In an example, a resource grid may be in a structure of frequency domain 802 and time domain 803. In an example, a resource grid may comprise a first number of OFDM symbols in a subframe and a second number of resource blocks, starting from a common resource block indicated by higher-layer signaling (e.g. RRC signaling), for a transmission numerology and a carrier. In an example, in a resource grid, a resource unit identified by a subcarrier index and a symbol index may be a resource element 805. In an example, a subframe may comprise a first number of OFDM symbols 807 depending on a numerology associated with a carrier. For example, when a subcarrier spacing of a numerology of a carrier is 15 KHz, a subframe may have 14 OFDM symbols for a carrier. When a subcarrier spacing of a numerology is 30 KHz, a subframe may have 28 OFDM symbols. When a subcarrier spacing of a numerology is 60 Khz, a subframe may have 56 OFDM symbols, etc. In an example, a second number of resource blocks comprised in a resource grid of a carrier may depend on a bandwidth and a numerology of the carrier.

As shown in FIG. 8, a resource block 806 may comprise 12 subcarriers. In an example, multiple resource blocks may be grouped into a Resource Block Group (RBG) 804. In an example, a size of a RBG may depend on at least one of: a RRC message indicating a RBG size configuration; a size of a carrier bandwidth; or a size of a bandwidth part of a carrier. In an example, a carrier may comprise multiple bandwidth parts. A first bandwidth part of a carrier may have different frequency location and/or bandwidth from a second bandwidth part of the carrier.

In an example, a gNB may transmit a downlink control information comprising a downlink or uplink resource block assignment to a wireless device. A base station may transmit to or receive from, a wireless device, data packets (e.g. transport blocks) scheduled and transmitted via one or more resource blocks and one or more slots according to parameters in a downlink control information and/or RRC message (s). In an example, a starting symbol relative to a first slot of the one or more slots may be indicated to the wireless device. In an example, a gNB may transmit to or receive from, a wireless device, data packets scheduled on one or more RBGs and one or more slots.

In an example, a gNB may transmit a downlink control information comprising a downlink assignment to a wireless device via one or more PDCCHs. The downlink assignment may comprise parameters indicating at least modulation and coding format; resource allocation; and/or HARQ information related to DL-SCH. In an example, a resource allocation may comprise parameters of resource block allocation; and/or slot allocation. In an example, a gNB may dynamically allocate resources to a wireless device via a Cell-Radio Network Temporary Identifier (C-RNTI) on one or more PDCCHs. The wireless device may monitor the one or more PDCCHs in order to find possible allocation when its downlink reception is enabled. The wireless device may receive one or more downlink data package on one or more PDSCH scheduled by the one or more PDCCHs, when successfully detecting the one or more PDCCHs.

In an example, a gNB may allocate Configured Scheduling (CS) resources for down link transmission to a wireless device. The gNB may transmit one or more RRC messages indicating a periodicity of the CS grant. The gNB may transmit a DCI via a PDCCH addressed to a Configured Scheduling-RNTI (CS-RNTI) activating the CS resources. The DCI may comprise parameters indicating that the downlink grant is a CS grant. The CS grant may be implicitly reused according to the periodicity defined by the one or more RRC messages, until deactivated.

In an example, a gNB may transmit a downlink control information comprising an uplink grant to a wireless device via one or more PDCCHs. The uplink grant may comprise parameters indicating at least modulation and coding format; resource allocation; and/or HARQ information related to UL-SCH. In an example, a resource allocation may comprise parameters of resource block allocation; and/or slot allocation. In an example, a gNB may dynamically allocate resources to a wireless device via a C-RNTI on one or more PDCCHs. The wireless device may monitor the one or more PDCCHs in order to find possible resource allocation. The wireless device may transmit one or more uplink data package via one or more PUSCH scheduled by the one or more PDCCHs, when successfully detecting the one or more PDCCHs.

In an example, a gNB may allocate CS resources for uplink data transmission to a wireless device. The gNB may transmit one or more RRC messages indicating a periodicity of the CS grant. The gNB may transmit a DCI via a PDCCH addressed to a CS-RNTI activating the CS resources. The DCI may comprise parameters indicating that the uplink grant is a CS grant. The CS grant may be implicitly reused according to the periodicity defined by the one or more RRC message, until deactivated.

In an example, a base station may transmit DCI/control signaling via PDCCH. The DCI may take a format in a plurality of formats. A DCI may comprise downlink and/or uplink scheduling information (e.g., resource allocation information, HARQ related parameters, MCS), request for CSI (e.g., aperiodic CQI reports), request for SRS, uplink power control commands for one or more cells, one or more timing information (e.g., TB transmission/reception timing, HARQ feedback timing, etc.), etc. In an example, a DCI may indicate an uplink grant comprising transmission parameters for one or more transport blocks. In an example, a DCI may indicate downlink assignment indicating parameters for receiving one or more transport blocks. In an example, a DCI may be used by base station to initiate a contention-free random access at the wireless device. In an example, the base station may transmit a DCI comprising slot format indicator (SFI) notifying a slot format. In an example, the base station may transmit a DCI comprising pre-emption indication notifying the PRB(s) and/or OFDM symbol(s) where a UE may assume no transmission is intended for the UE. In an example, the base station may transmit a DCI for group power control of PUCCH or PUSCH or SRS. In an example, a DCI may correspond to an RNTI. In an example, the wireless device may obtain an RNTI in response to completing the initial access (e.g., C-RNTI). In an example, the base station may configure an RNTI for the wireless (e.g., CS-RNTI, TPC-CS-RNTI, TPC-PUCCH-RNTI, TPC-PUSCH-RNTI, TPC-SRS-RNTI). In an example, the wireless device may compute an RNTI (e.g., the wireless device may compute RA-RNTI based on resources used for transmission of a preamble). In an example, an RNTI may have a pre-configured value (e.g., P-RNTI or SI-RNTI). In an example, a wireless device may monitor a group common search space which may be used by base station for transmitting DCIs that are intended for a group of UEs. In an example, a group common DCI may correspond to an RNTI which is commonly configured for a group of UEs. In an example, a wireless device may monitor a UE-specific search space. In an example, a UE specific DCI may correspond to an RNTI configured for the wireless device.

A NR system may support a single beam operation and/or a multi-beam operation. In a multi-beam operation, a base station may perform a downlink beam sweeping to provide coverage for common control channels and/or downlink SS blocks, which may comprise at least a PSS, a SSS, and/or PBCH. A wireless device may measure quality of a beam pair link using one or more RSs. One or more SS blocks, or one or more CSI-RS resources, associated with a CSI-RS resource index (CRI), or one or more DM-RSs of PBCH, may be used as RS for measuring quality of a beam pair link. Quality of a beam pair link may be defined as a reference signal received power (RSRP) value, or a reference signal received quality (RSRQ) value, and/or a CSI value measured on RS resources. The base station may indicate whether an RS resource, used for measuring a beam pair link quality, is quasi-co-located (QCLed) with DM-RSs of a control channel. A RS resource and DM-RSs of a control channel may be called QCLed when a channel characteristics from a transmission on an RS to a wireless device, and that from a transmission on a control channel to a wireless device, are similar or same under a configured criterion. In a multi-beam operation, a wireless device may perform an uplink beam sweeping to access a cell.

In an example, a wireless device may be configured to monitor PDCCH on one or more beam pair links simultaneously depending on a capability of a wireless device. This may increase robustness against beam pair link blocking. A base station may transmit one or more messages to configure a wireless device to monitor PDCCH on one or more beam pair links in different PDCCH OFDM symbols. For example, a base station may transmit higher layer signaling (e.g. RRC signaling) or MAC CE comprising parameters related to the Rx beam setting of a wireless device for monitoring PDCCH on one or more beam pair links. A base station may transmit indication of spatial QCL assumption between an DL RS antenna port(s) (for example, cell-specific CSI-RS, or wireless device-specific CSI-RS, or SS block, or PBCH with or without DM-RSs of PBCH), and DL RS antenna port(s) for demodulation of DL control channel. Signaling for beam indication for a PDCCH may be MAC CE signaling, or RRC signaling, or DCI signaling, or specification-transparent and/or implicit method, and combination of these signaling methods.

For reception of unicast DL data channel, a base station may indicate spatial QCL parameters between DL RS antenna port(s) and DM-RS antenna port(s) of DL data channel. The base station may transmit DCI (e.g. downlink grants) comprising information indicating the RS antenna port(s). The information may indicate RS antenna port(s) which may be QCL-ed with the DM-RS antenna port(s). Different set of DM-RS antenna port(s) for a DL data channel may be indicated as QCL with different set of the RS antenna port(s).

Figure 9A:
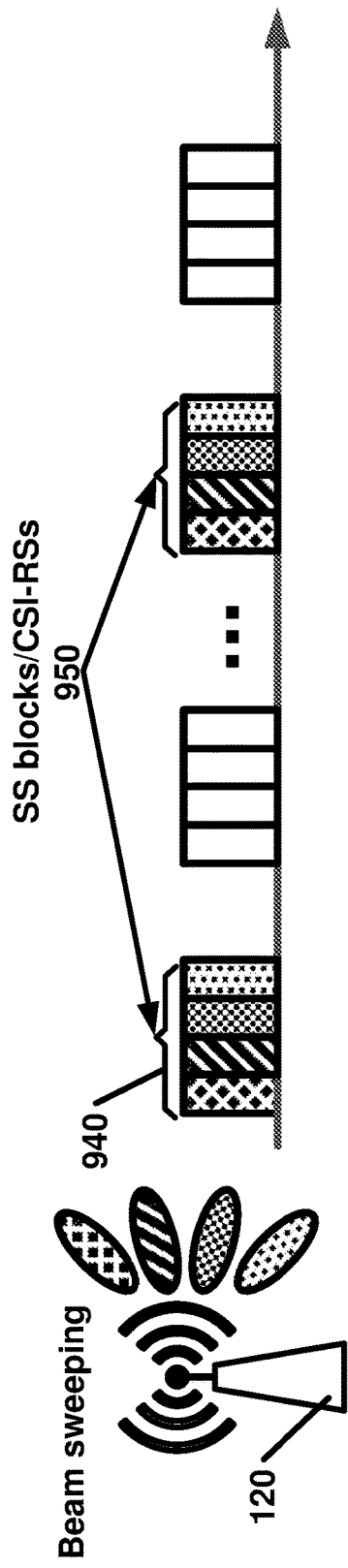
FIG. 9A is a diagram depicting an example CSI-RS and/or SS block transmission in a multi-beam system.

FIG. 9A is an example of beam sweeping in a DL channel. In an RRC_INACTIVE state or RRC_IDLE state, a wireless device may assume that SS blocks form an SS burst 940, and an SS burst set 950. The SS burst set 950 may have a given periodicity. For example, in a multi-beam operation, a base station 120 may transmit SS blocks in multiple beams, together forming a SS burst 940. One or more SS blocks may be transmitted on one beam. If multiple SS bursts 940 are transmitted with multiple beams, SS bursts together may form SS burst set 950.

A wireless device may further use CSI-RS in the multi-beam operation for estimating a beam quality of a links between a wireless device and a base station. A beam may be associated with a CSI-RS. For example, a wireless device may, based on a RSRP measurement on CSI-RS, report a beam index, as indicated in a CRI for downlink beam selection, and associated with a RSRP value of a beam. A CSI-RS may be transmitted on a CSI-RS resource including at least one of one or more antenna ports, one or more time or frequency radio resources. A CSI-RS resource may be configured in a cell-specific way by common RRC signaling, or in a wireless device-specific way by dedicated RRC signaling, and/or L1/L2 signaling. Multiple wireless devices covered by a cell may measure a cell-specific CSI-RS resource. A dedicated subset of wireless devices covered by a cell may measure a wireless device-specific CSI-RS resource.

A CSI-RS resource may be transmitted periodically, or using aperiodic transmission, or using a multi-shot or semi-persistent transmission. For example, in a periodic transmission in FIG. 9A, a base station 120 may transmit configured CSI-RS resources 940 periodically using a configured periodicity in a time domain. In an aperiodic transmission, a configured CSI-RS resource may be transmitted in a dedicated time slot. In a multi-shot or semi-persistent transmission, a configured CSI-RS resource may be transmitted within a configured period. Beams used for CSI-RS transmission may have different beam width than beams used for SS-blocks transmission.

Figure 9B:
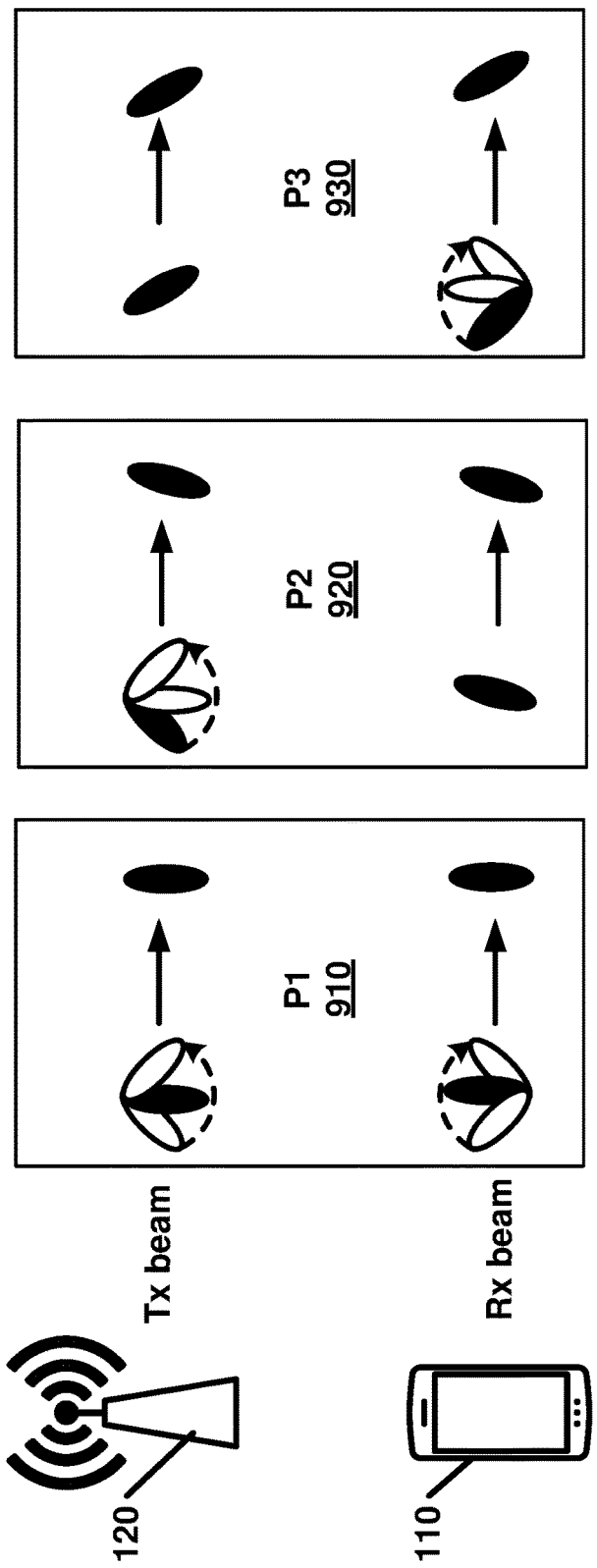
FIG. 9B is a diagram depicting an example downlink beam management procedure as per an aspect of an embodiment of the present disclosure.

FIG. 9B is an example of a beam management procedure in an example new radio network. A base station 120 and/or a wireless device 110 may perform a downlink L1/L2 beam management procedure. One or more of the following downlink L1/L2 beam management procedures may be performed within one or more wireless devices 110 and one or more base stations 120. In an example, a P-1 procedure 910 may be used to enable the wireless device 110 to measure one or more Transmission (Tx) beams associated with the base station 120 to support a selection of a first set of Tx beams associated with the base station 120 and a first set of Rx beam(s) associated with a wireless device 110. For beamforming at a base station 120, a base station 120 may sweep a set of different TX beams. For beamforming at a wireless device 110, a wireless device 110 may sweep a set of different Rx beams. In an example, a P-2 procedure 920 may be used to enable a wireless device 110 to measure one or more Tx beams associated with a base station 120 to possibly change a first set of Tx beams associated with a base station 120. A P-2 procedure 920 may be performed on a possibly smaller set of beams for beam refinement than in the P-1 procedure 910. A P-2 procedure 920 may be a special case of a P-1 procedure 910. In an example, a P-3 procedure 930 may be used to enable a wireless device 110 to measure at least one Tx beam associated with a base station 120 to change a first set of Rx beams associated with a wireless device 110.

A wireless device 110 may transmit one or more beam management reports to a base station 120. In one or more beam management reports, a wireless device 110 may indicate some beam pair quality parameters, comprising at least, one or more beam identifications; RSRP; Precoding Matrix Indicator (PMI)/Channel Quality Indicator (CQI)/Rank Indicator (RI) of a subset of configured beams. Based on one or more beam management reports, a base station 120 may transmit to a wireless device 110 a signal indicating that one or more beam pair links are one or more serving beams. A base station 120 may transmit PDCCH and PDSCH for a wireless device 110 using one or more serving beams.

In an example embodiment, new radio network may support a Bandwidth Adaptation (BA). In an example, receive and/or transmit bandwidths configured by an UE employing a BA may not be large. For example, a receive and/or transmit bandwidths may not be as large as a bandwidth of a cell. Receive and/or transmit bandwidths may be adjustable. For example, a UE may change receive and/or transmit bandwidths, e.g., to shrink during period of low activity to save power. For example, a UE may change a location of receive and/or transmit bandwidths in a frequency domain, e.g. to increase scheduling flexibility. For example, a UE may change a subcarrier spacing, e.g. to allow different services.

In an example embodiment, a subset of a total cell bandwidth of a cell may be referred to as a Bandwidth Part (BWP). A base station may configure a UE with one or more BWPs to achieve a BA. For example, a base station may indicate, to a UE, which of the one or more (configured) BWPs is an active BWP.

FIG. 10 is an example diagram of 3 BWPs configured: BWP1 (1010 and 1050) with a width of 40 MHz and subcarrier spacing of 15 kHz; BWP2 (1020 and 1040) with a width of 10 MHz and subcarrier spacing of 15 kHz; BWP3 1030 with a width of 20 MHz and subcarrier spacing of 60 kHz.

In an example, a UE, configured for operation in one or more BWPs of a cell, may be configured by one or more higher layers (e.g. RRC layer) for a cell a set of one or more BWPs (e.g., at most four BWPs) for receptions by the UE (DL BWP set) in a DL bandwidth by at least one parameter DL-BWP and a set of one or more BWPs (e.g., at most four BWPs) for transmissions by a UE (UL BWP set) in an UL bandwidth by at least one parameter UL-BWP for a cell.

To enable BA on the PCell, a base station may configure a UE with one or more UL and DL BWP pairs. To enable BA on SCells (e.g., in case of CA), a base station may configure a UE at least with one or more DL BWPs (e.g., there may be none in an UL).

In an example, an initial active DL BWP may be defined by at least one of a location and number of contiguous PRBs, a subcarrier spacing, or a cyclic prefix, for a control resource set for at least one common search space. For operation on the PCell, one or more higher layer parameters may indicate at least one initial UL BWP for a random access procedure. If a UE is configured with a secondary carrier on a primary cell, the UE may be configured with an initial BWP for random access procedure on a secondary carrier.

In an example, for unpaired spectrum operation, a UE may expect that a center frequency for a DL BWP may be same as a center frequency for a UL BWP.

For example, for a DL BWP or an UL BWP in a set of one or more DL BWPs or one or more UL BWPs, respectively, a base statin may semi-statistically configure a UE for a cell with one or more parameters indicating at least one of following: a subcarrier spacing; a cyclic prefix; a number of contiguous PRBs; an index in the set of one or more DL BWPs and/or one or more UL BWPs; a link between a DL BWP and an UL BWP from a set of configured DL BWPs and UL BWPs; a DCI detection to a PDSCH reception timing; a PDSCH reception to a HARQ-ACK transmission timing value; a DCI detection to a PUSCH transmission timing value; an offset of a first PRB of a DL bandwidth or an UL bandwidth, respectively, relative to a first PRB of a bandwidth.

In an example, for a DL BWP in a set of one or more DL BWPs on a PCell, a base station may configure a UE with one or more control resource sets for at least one type of common search space and/or one UE-specific search space. For example, a base station may not configure a UE without a common search space on a PCell, or on a PSCell, in an active DL BWP.

For an UL BWP in a set of one or more UL BWPs, a base station may configure a UE with one or more resource sets for one or more PUCCH transmissions.

In an example, if a DCI comprises a BWP indicator field, a BWP indicator field value may indicate an active DL BWP, from a configured DL BWP set, for one or more DL receptions. If a DCI comprises a BWP indicator field, a BWP indicator field value may indicate an active UL BWP, from a configured UL BWP set, for one or more UL transmissions.

In an example, for a PCell, a base station may semi-statistically configure a UE with a default DL BWP among configured DL BWPs. If a UE is not provided a default DL BWP, a default BWP may be an initial active DL BWP.

In an example, a base station may configure a UE with a timer value for a PCell. For example, a UE may start a timer, referred to as BWP inactivity timer, when a UE detects a DCI indicating an active DL BWP, other than a default DL BWP, for a paired spectrum operation or when a UE detects a DCI indicating an active DL BWP or UL BWP, other than a default DL BWP or UL BWP, for an unpaired spectrum operation. The UE may increment the timer by an interval of a first value (e.g., the first value may be 1 millisecond or 0.5 milliseconds) if the UE does not detect a DCI during the interval for a paired spectrum operation or for an unpaired spectrum operation. In an example, the timer may expire when the timer is equal to the timer value. A UE may switch to the default DL BWP from an active DL BWP when the timer expires.

In an example, a base station may semi-statistically configure a UE with one or more BWPs. A UE may switch an active BWP from a first BWP to a second BWP in response to receiving a DCI indicating the second BWP as an active BWP and/or in response to an expiry of BWP inactivity timer (for example, the second BWP may be a default BWP). For example, FIG. 10 is an example diagram of 3 BWPs configured, BWP1 (1010 and 1050), BWP2 (1020 and 1040), and BWP3 (1030). BWP2 (1020 and 1040) may be a default BWP. BWP1 (1010) may be an initial active BWP. In an example, a UE may switch an active BWP from BWP1 1010 to BWP2 1020 in response to an expiry of BWP inactivity timer. For example, a UE may switch an active BWP from BWP2 1020 to BWP3 1030 in response to receiving a DCI indicating BWP3 1030 as an active BWP. Switching an active BWP from BWP3 1030 to BWP2 1040 and/or from BWP2 1040 to BWP1 1050 may be in response to receiving a DCI indicating an active BWP and/or in response to an expiry of BWP inactivity timer.

In an example, if a UE is configured for a secondary cell with a default DL BWP among configured DL BWPs and a timer value, UE procedures on a secondary cell may be same as on a primary cell using the timer value for the secondary cell and the default DL BWP for the secondary cell.

In an example, if a base station configures a UE with a first active DL BWP and a first active UL BWP on a secondary cell or carrier, a UE may employ an indicated DL BWP and an indicated UL BWP on a secondary cell as a respective first active DL BWP and first active UL BWP on a secondary cell or carrier.

Figure 11A:
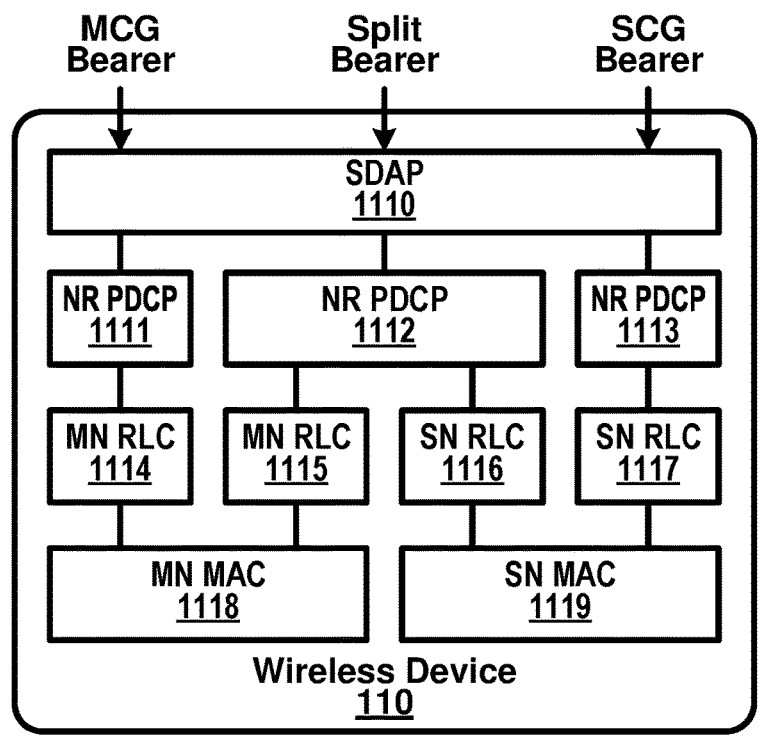
FIG. 11A, and FIG. 11B are diagrams of an example multi connectivity as per an aspect of an embodiment of the present disclosure.
Figure 11B:
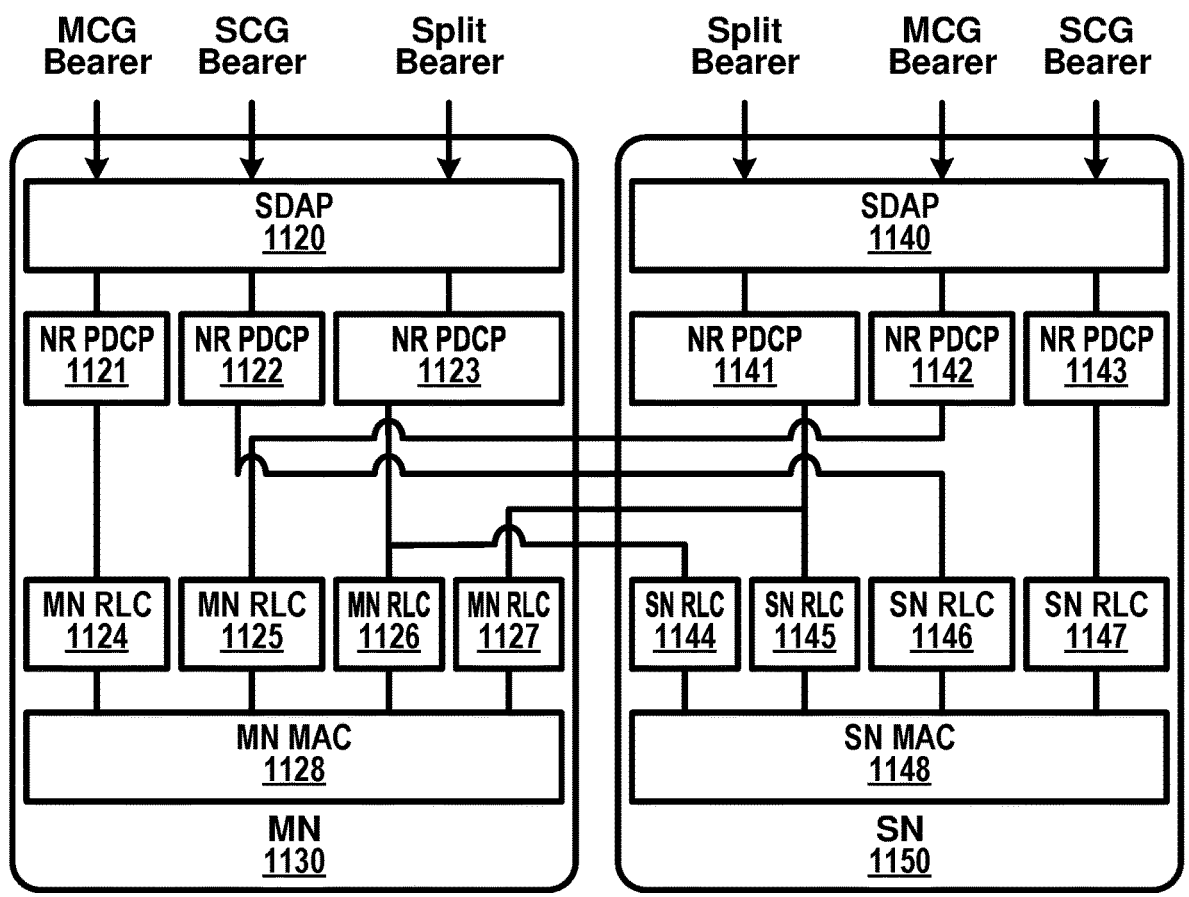

FIG. 11A and FIG. 11B show packet flows employing a multi connectivity (e.g. dual connectivity, multi connectivity, tight interworking, and/or the like). FIG. 11A is an example diagram of a protocol structure of a wireless device 110 (e.g. UE) with CA and/or multi connectivity as per an aspect of an embodiment. FIG. 11B is an example diagram of a protocol structure of multiple base stations with CA and/or multi connectivity as per an aspect of an embodiment. The multiple base stations may comprise a master node, MN 1130 (e.g. a master node, a master base station, a master gNB, a master eNB, and/or the like) and a secondary node, SN 1150 (e.g. a secondary node, a secondary base station, a secondary gNB, a secondary eNB, and/or the like). A master node 1130 and a secondary node 1150 may co-work to communicate with a wireless device 110.

When multi connectivity is configured for a wireless device 110, the wireless device 110, which may support multiple reception/transmission functions in an RRC connected state, may be configured to utilize radio resources provided by multiple schedulers of a multiple base stations.

Multiple base stations may be inter-connected via a non-ideal or ideal backhaul (e.g. Xn interface, X2 interface, and/or the like). A base station involved in multi connectivity for a certain wireless device may perform at least one of two different roles: a base station may either act as a master base station or as a secondary base station. In multi connectivity, a wireless device may be connected to one master base station and one or more secondary base stations. In an example, a master base station (e.g. the MN 1130) may provide a master cell group (MCG) comprising a primary cell and/or one or more secondary cells for a wireless device (e.g. the wireless device 110). A secondary base station (e.g. the SN 1150) may provide a secondary cell group (SCG) comprising a primary secondary cell (PSCell) and/or one or more secondary cells for a wireless device (e.g. the wireless device 110).

In multi connectivity, a radio protocol architecture that a bearer employs may depend on how a bearer is setup. In an example, three different type of bearer setup options may be supported: an MCG bearer, an SCG bearer, and/or a split bearer. A wireless device may receive/transmit packets of an MCG bearer via one or more cells of the MCG, and/or may receive/transmits packets of an SCG bearer via one or more cells of an SCG. Multi-connectivity may also be described as having at least one bearer configured to use radio resources provided by the secondary base station. Multi-connectivity may or may not be configured/implemented in some of the example embodiments.

In an example, a wireless device (e.g. Wireless Device 110) may transmit and/or receive: packets of an MCG bearer via an SDAP layer (e.g. SDAP 1110), a PDCP layer (e.g. NR PDCP 1111), an RLC layer (e.g. MN RLC 1114), and a MAC layer (e.g. MN MAC 1118); packets of a split bearer via an SDAP layer (e.g. SDAP 1110), a PDCP layer (e.g. NR PDCP 1112), one of a master or secondary RLC layer (e.g. MN RLC 1115, SN RLC 1116), and one of a master or secondary MAC layer (e.g. MN MAC 1118, SN MAC 1119); and/or packets of an SCG bearer via an SDAP layer (e.g. SDAP 1110), a PDCP layer (e.g. NR PDCP 1113), an RLC layer (e.g. SN RLC 1117), and a MAC layer (e.g. MN MAC 1119).

In an example, a master base station (e.g. MN 1130) and/or a secondary base station (e.g. SN 1150) may transmit/receive: packets of an MCG bearer via a master or secondary node SDAP layer (e.g. SDAP 1120, SDAP 1140), a master or secondary node PDCP layer (e.g. NR PDCP 1121, NR PDCP 1142), a master node RLC layer (e.g. MN RLC 1124, MN RLC 1125), and a master node MAC layer (e.g. MN MAC 1128); packets of an SCG bearer via a master or secondary node SDAP layer (e.g. SDAP 1120, SDAP 1140), a master or secondary node PDCP layer (e.g. NR PDCP 1122, NR PDCP 1143), a secondary node RLC layer (e.g. SN RLC 1146, SN RLC 1147), and a secondary node MAC layer (e.g. SN MAC 1148); packets of a split bearer via a master or secondary node SDAP layer (e.g. SDAP 1120, SDAP 1140), a master or secondary node PDCP layer (e.g. NR PDCP 1123, NR PDCP 1141), a master or secondary node RLC layer (e.g. MN RLC 1126, SN RLC 1144, SN RLC 1145, MN RLC 1127), and a master or secondary node MAC layer (e.g. MN MAC 1128, SN MAC 1148).

In multi connectivity, a wireless device may configure multiple MAC entities: one MAC entity (e.g. MN MAC 1118) for a master base station, and other MAC entities (e.g. SN MAC 1119) for a secondary base station. In multi-connectivity, a configured set of serving cells for a wireless device may comprise two subsets: an MCG comprising serving cells of a master base station, and SCGs comprising serving cells of a secondary base station. For an SCG, one or more of following configurations may be applied: at least one cell of an SCG has a configured UL CC and at least one cell of a SCG, named as primary secondary cell (PSCell, PCell of SCG, or sometimes called PCell), is configured with PUCCH resources; when an SCG is configured, there may be at least one SCG bearer or one Split bearer; upon detection of a physical layer problem or a random access problem on a PSCell, or a number of NR RLC retransmissions has been reached associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a wireless device of a SCG failure type, for split bearer, a DL data transfer over a master base station may be maintained; an NR RLC acknowledged mode (AM) bearer may be configured for a split bearer; PCell and/or PSCell may not be de-activated; PSCell may be changed with a SCG change procedure (e.g. with security key change and a RACH procedure); and/or a bearer type change between a split bearer and a SCG bearer or simultaneous configuration of a SCG and a split bearer may or may not supported.

With respect to interaction between a master base station and a secondary base stations for multi-connectivity, one or more of the following may be applied: a master base station and/or a secondary base station may maintain RRM measurement configurations of a wireless device; a master base station may (e.g. based on received measurement reports, traffic conditions, and/or bearer types) may decide to request a secondary base station to provide additional resources (e.g. serving cells) for a wireless device; upon receiving a request from a master base station, a secondary base station may create/modify a container that may result in configuration of additional serving cells for a wireless device (or decide that the secondary base station has no resource available to do so); for a UE capability coordination, a master base station may provide (a part of) an AS configuration and UE capabilities to a secondary base station; a master base station and a secondary base station may exchange information about a UE configuration by employing of RRC containers (inter-node messages) carried via Xn messages; a secondary base station may initiate a reconfiguration of the secondary base station existing serving cells (e.g. PUCCH towards the secondary base station); a secondary base station may decide which cell is a PSCell within a SCG; a master base station may or may not change content of RRC configurations provided by a secondary base station; in case of a SCG addition and/or a SCG SCell addition, a master base station may provide recent (or the latest) measurement results for SCG cell(s); a master base station and secondary base stations may receive information of SFN and/or subframe offset of each other from OAM and/or via an Xn interface, (e.g. for a purpose of DRX alignment and/or identification of a measurement gap). In an example, when adding a new SCG SCell, dedicated RRC signaling may be used for sending required system information of a cell as for CA, except for a SFN acquired from a MIB of a PSCell of a SCG.

Figure 12:
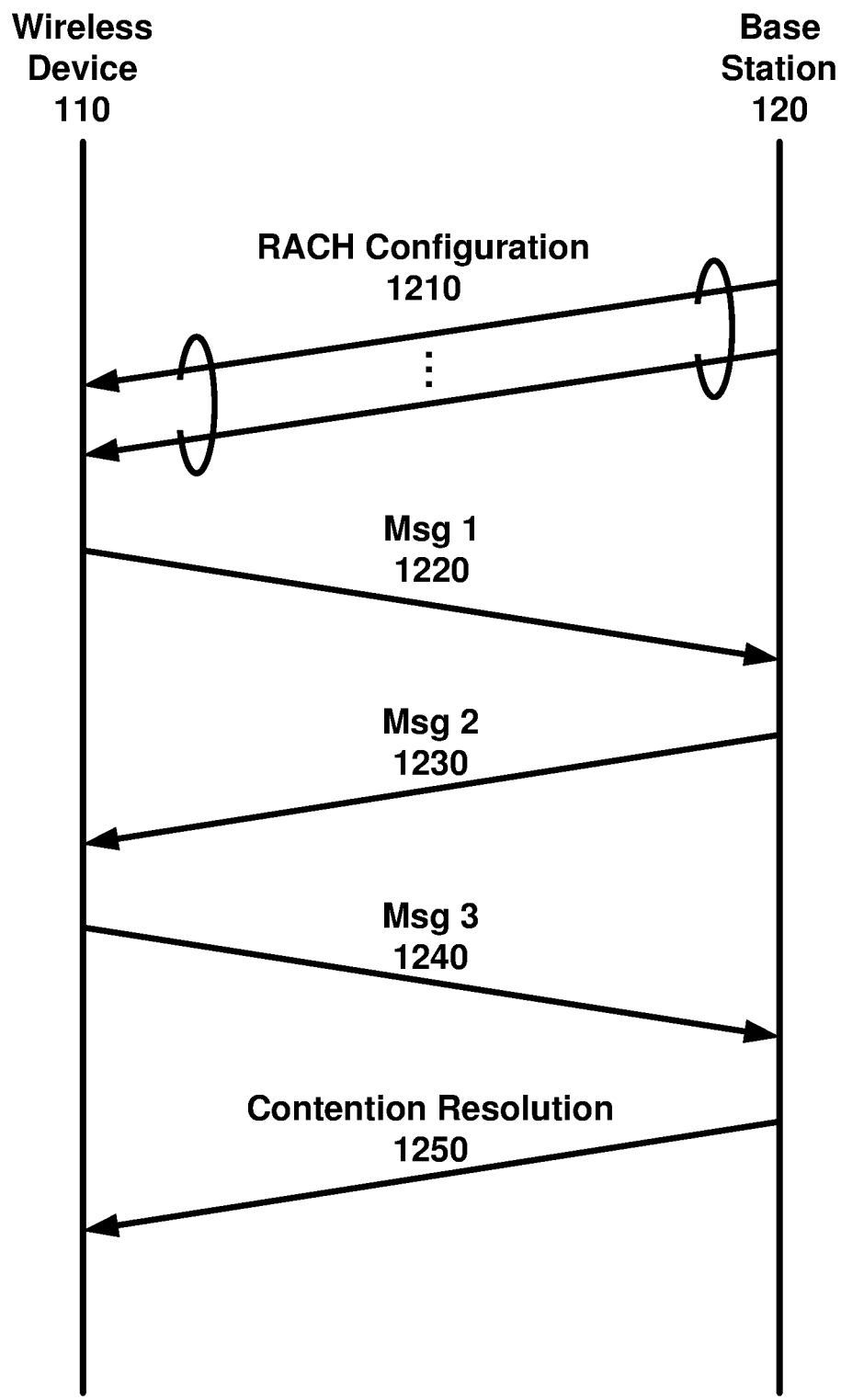
FIG. 12 is a diagram of an example random access procedure as per an aspect of an embodiment of the present disclosure.

FIG. 12 is an example diagram of a random access procedure. One or more events may trigger a random access procedure. For example, one or more events may be at least one of following: initial access from RRC_IDLE, RRC connection re-establishment procedure, handover, DL or UL data arrival during RRC_CONNECTED when UL synchronization status is non-synchronized, transition from RRC_Inactive, and/or request for other system information. For example, a PDCCH order, a MAC entity, and/or a beam failure indication may initiate a random access procedure.

In an example embodiment, a random access procedure may be at least one of a contention based random access procedure and a contention free random access procedure. For example, a contention based random access procedure may comprise, one or more Msg 1 1220 transmissions, one or more Msg2 1230 transmissions, one or more Msg3 1240 transmissions, and contention resolution 1250. For example, a contention free random access procedure may comprise one or more Msg 1 1220 transmissions and one or more Msg2 1230 transmissions.

In an example, a base station may transmit (e.g., unicast, multicast, or broadcast), to a UE, a RACH configuration 1210 via one or more beams. The RACH configuration 1210 may comprise one or more parameters indicating at least one of following: available set of PRACH resources for a transmission of a random access preamble, initial preamble power (e.g., random access preamble initial received target power), an RSRP threshold for a selection of a SS block and corresponding PRACH resource, a power-ramping factor (e.g., random access preamble power ramping step), random access preamble index, a maximum number of preamble transmission, preamble group A and group B, a threshold (e.g., message size) to determine the groups of random access preambles, a set of one or more random access preambles for system information request and corresponding PRACH resource(s), if any, a set of one or more random access preambles for beam failure recovery request and corresponding PRACH resource(s), if any, a time window to monitor RA response(s), a time window to monitor response(s) on beam failure recovery request, and/or a contention resolution timer.

In an example, the Msg1 1220 may be one or more transmissions of a random access preamble. For a contention based random access procedure, a UE may select a SS block with a RSRP above the RSRP threshold. If random access preambles group B exists, a UE may select one or more random access preambles from a group A or a group B depending on a potential Msg3 1240 size. If a random access preambles group B does not exist, a UE may select the one or more random access preambles from a group A. A UE may select a random access preamble index randomly (e.g. with equal probability or a normal distribution) from one or more random access preambles associated with a selected group. If a base station semi-statistically configures a UE with an association between random access preambles and SS blocks, the UE may select a random access preamble index randomly with equal probability from one or more random access preambles associated with a selected SS block and a selected group.

For example, a UE may initiate a contention free random access procedure based on a beam failure indication from a lower layer. For example, a base station may semi-statistically configure a UE with one or more contention free PRACH resources for beam failure recovery request associated with at least one of SS blocks and/or CSI-RSs. If at least one of SS blocks with a RSRP above a first RSRP threshold amongst associated SS blocks or at least one of CSI-RSs with a RSRP above a second RSRP threshold amongst associated CSI-RSs is available, a UE may select a random access preamble index corresponding to a selected SS block or CSI-RS from a set of one or more random access preambles for beam failure recovery request.

For example, a UE may receive, from a base station, a random access preamble index via PDCCH or RRC for a contention free random access procedure. If a base station does not configure a UE with at least one contention free PRACH resource associated with SS blocks or CSI-RS, the UE may select a random access preamble index. If a base station configures a UE with one or more contention free PRACH resources associated with SS blocks and at least one SS block with a RSRP above a first RSRP threshold amongst associated SS blocks is available, the UE may select the at least one SS block and select a random access preamble corresponding to the at least one SS block. If a base station configures a UE with one or more contention free PRACH resources associated with CSI-RSs and at least one CSI-RS with a RSRP above a second RSPR threshold amongst the associated CSI-RSs is available, the UE may select the at least one CSI-RS and select a random access preamble corresponding to the at least one CSI-RS.

A UE may perform one or more Msg1 1220 transmissions by transmitting the selected random access preamble. For example, if a UE selects an SS block and is configured with an association between one or more PRACH occasions and one or more SS blocks, the UE may determine an PRACH occasion from one or more PRACH occasions corresponding to a selected SS block. For example, if a UE selects a CSI-RS and is configured with an association between one or more PRACH occasions and one or more CSI-RSs, the UE may determine a PRACH occasion from one or more PRACH occasions corresponding to a selected CSI-RS. A UE may transmit, to a base station, a selected random access preamble via a selected PRACH occasions. A UE may determine a transmit power for a transmission of a selected random access preamble at least based on an initial preamble power and a power-ramping factor. A UE may determine a RA-RNTI associated with a selected PRACH occasions in which a selected random access preamble is transmitted. For example, a UE may not determine a RA-RNTI for a beam failure recovery request. A UE may determine an RA-RNTI at least based on an index of a first OFDM symbol and an index of a first slot of a selected PRACH occasions, and/or an uplink carrier index for a transmission of Msg1 1220.

In an example, a UE may receive, from a base station, a random access response, Msg 2 1230. A UE may start a time window (e.g., ra-ResponseWindow) to monitor a random access response. For beam failure recovery request, a base station may configure a UE with a different time window (e.g., bfr-ResponseWindow) to monitor response on beam failure recovery request. For example, a UE may start a time window (e.g., ra-Response Window or bfr-ResponseWindow) at a start of a first PDCCH occasion after a fixed duration of one or more symbols from an end of a preamble transmission. If a UE transmits multiple preambles, the UE may start a time window at a start of a first PDCCH occasion after a fixed duration of one or more symbols from an end of a first preamble transmission. A UE may monitor a PDCCH of a cell for at least one random access response identified by a RA-RNTI or for at least one response to beam failure recovery request identified by a C-RNTI while a timer for a time window is running.

In an example, a UE may consider a reception of random access response successful if at least one random access response comprises a random access preamble identifier corresponding to a random access preamble transmitted by the UE. A UE may consider the contention free random access procedure successfully completed if a reception of random access response is successful. If a contention free random access procedure is triggered for a beam failure recovery request, a UE may consider a contention free random access procedure successfully complete if a PDCCH transmission is addressed to a C-RNTI. In an example, if at least one random access response comprises a random access preamble identifier, a UE may consider the random access procedure successfully completed and may indicate a reception of an acknowledgement for a system information request to upper layers. If a UE has signaled multiple preamble transmissions, the UE may stop transmitting remaining preambles (if any) in response to a successful reception of a corresponding random access response.

In an example, a UE may perform one or more Msg 3 1240 transmissions in response to a successful reception of random access response (e.g., for a contention based random access procedure). A UE may adjust an uplink transmission timing based on a timing advanced command indicated by a random access response and may transmit one or more transport blocks based on an uplink grant indicated by a random access response. Subcarrier spacing for PUSCH transmission for Msg3 1240 may be provided by at least one higher layer (e.g. RRC) parameter. A UE may transmit a random access preamble via PRACH and Msg3 1240 via PUSCH on a same cell. A base station may indicate an UL BWP for a PUSCH transmission of Msg3 1240 via system information block. A UE may employ HARQ for a retransmission of Msg 3 1240.

In an example, multiple UEs may perform Msg 1 1220 by transmitting a same preamble to a base station and receive, from the base station, a same random access response comprising an identity (e.g., TC-RNTI). Contention resolution 1250 may ensure that a UE does not incorrectly use an identity of another UE. For example, contention resolution 1250 may be based on C-RNTI on PDCCH or a UE contention resolution identity on DL-SCH. For example, if a base station assigns a C-RNTI to a UE, the UE may perform contention resolution 1250 based on a reception of a PDCCH transmission that is addressed to the C-RNTI. In response to detection of a C-RNTI on a PDCCH, a UE may consider contention resolution 1250 successful and may consider a random access procedure successfully completed. If a UE has no valid C-RNTI, a contention resolution may be addressed by employing a TC-RNTI. For example, if a MAC PDU is successfully decoded and a MAC PDU comprises a UE contention resolution identity MAC CE that matches the CCCH SDU transmitted in Msg3 1250, a UE may consider the contention resolution 1250 successful and may consider the random access procedure successfully completed.

Figure 13:
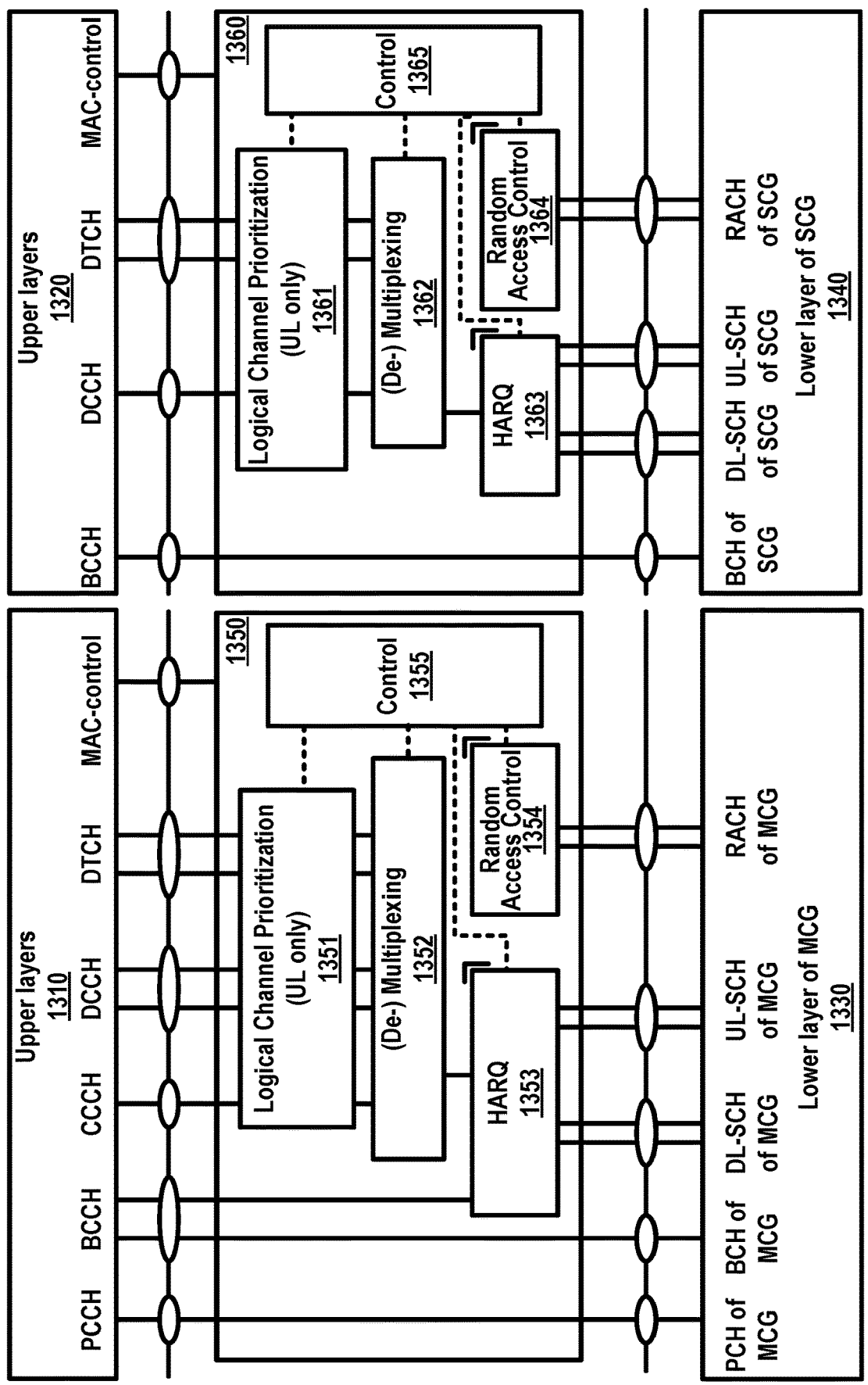
FIG. 13 is a structure of example MAC entities as per an aspect of an embodiment of the present disclosure.

FIG. 13 is an example structure for MAC entities as per an aspect of an embodiment. In an example, a wireless device may be configured to operate in a multi-connectivity mode. A wireless device in RRC_CONNECTED with multiple RX/TX may be configured to utilize radio resources provided by multiple schedulers located in a plurality of base stations. The plurality of base stations may be connected via a non-ideal or ideal backhaul over the Xn interface. In an example, a base station in a plurality of base stations may act as a master base station or as a secondary base station. A wireless device may be connected to one master base station and one or more secondary base stations. A wireless device may be configured with multiple MAC entities, e.g. one MAC entity for master base station, and one or more other MAC entities for secondary base station(s). In an example, a configured set of serving cells for a wireless device may comprise two subsets: an MCG comprising serving cells of a master base station, and one or more SCGs comprising serving cells of a secondary base station(s). FIG. 13 illustrates an example structure for MAC entities when MCG and SCG are configured for a wireless device.

In an example, at least one cell in a SCG may have a configured UL CC, wherein a cell of at least one cell may be called PSCell or PCell of SCG, or sometimes may be simply called PCell. A PSCell may be configured with PUCCH resources. In an example, when a SCG is configured, there may be at least one SCG bearer or one split bearer. In an example, upon detection of a physical layer problem or a random access problem on a PSCell, or upon reaching a number of RLC retransmissions associated with the SCG, or upon detection of an access problem on a PSCell during a SCG addition or a SCG change: an RRC connection re-establishment procedure may not be triggered, UL transmissions towards cells of an SCG may be stopped, a master base station may be informed by a UE of a SCG failure type and DL data transfer over a master base station may be maintained.

In an example, a MAC sublayer may provide services such as data transfer and radio resource allocation to upper layers (e.g. 1310 or 1320). A MAC sublayer may comprise a plurality of MAC entities (e.g. 1350 and 1360). A MAC sublayer may provide data transfer services on logical channels. To accommodate different kinds of data transfer services, multiple types of logical channels may be defined. A logical channel may support transfer of a particular type of information. A logical channel type may be defined by what type of information (e.g., control or data) is transferred. For example, BCCH, PCCH, CCCH and DCCH may be control channels and DTCH may be a traffic channel. In an example, a first MAC entity (e.g. 1310) may provide services on PCCH, BCCH, CCCH, DCCH, DTCH and MAC control elements. In an example, a second MAC entity (e.g. 1320) may provide services on BCCH, DCCH, DTCH and MAC control elements.

A MAC sublayer may expect from a physical layer (e.g. 1330 or 1340) services such as data transfer services, signaling of HARQ feedback, signaling of scheduling request or measurements (e.g. CQI). In an example, in dual connectivity, two MAC entities may be configured for a wireless device: one for MCG and one for SCG. A MAC entity of wireless device may handle a plurality of transport channels. In an example, a first MAC entity may handle first transport channels comprising a PCCH of MCG, a first BCH of MCG, one or more first DL-SCHs of MCG, one or more first UL-SCHs of MCG and one or more first RACHs of MCG. In an example, a second MAC entity may handle second transport channels comprising a second BCH of SCG, one or more second DL-SCHs of SCG, one or more second UL-SCHs of SCG and one or more second RACHs of SCG.

In an example, if a MAC entity is configured with one or more SCells, there may be multiple DL-SCHs and there may be multiple UL-SCHs as well as multiple RACHs per MAC entity. In an example, there may be one DL-SCH and UL-SCH on a SpCell. In an example, there may be one DL-SCH, zero or one UL-SCH and zero or one RACH for an SCell. A DL-SCH may support receptions using different numerologies and/or TTI duration within a MAC entity. A UL-SCH may also support transmissions using different numerologies and/or TTI duration within the MAC entity.

In an example, a MAC sublayer may support different functions and may control these functions with a control (e.g. 1355 or 1365) element. Functions performed by a MAC entity may comprise mapping between logical channels and transport channels (e.g., in uplink or downlink), multiplexing (e.g. 1352 or 1362) of MAC SDUs from one or different logical channels onto transport blocks (TB) to be delivered to the physical layer on transport channels (e.g., in uplink), demultiplexing (e.g. 1352 or 1362) of MAC SDUs to one or different logical channels from transport blocks (TB) delivered from the physical layer on transport channels (e.g., in downlink), scheduling information reporting (e.g., in uplink), error correction through HARQ in uplink or downlink (e.g. 1363), and logical channel prioritization in uplink (e.g. 1351 or 1361). A MAC entity may handle a random access process (e.g. 1354 or 1364).

Figure 14:
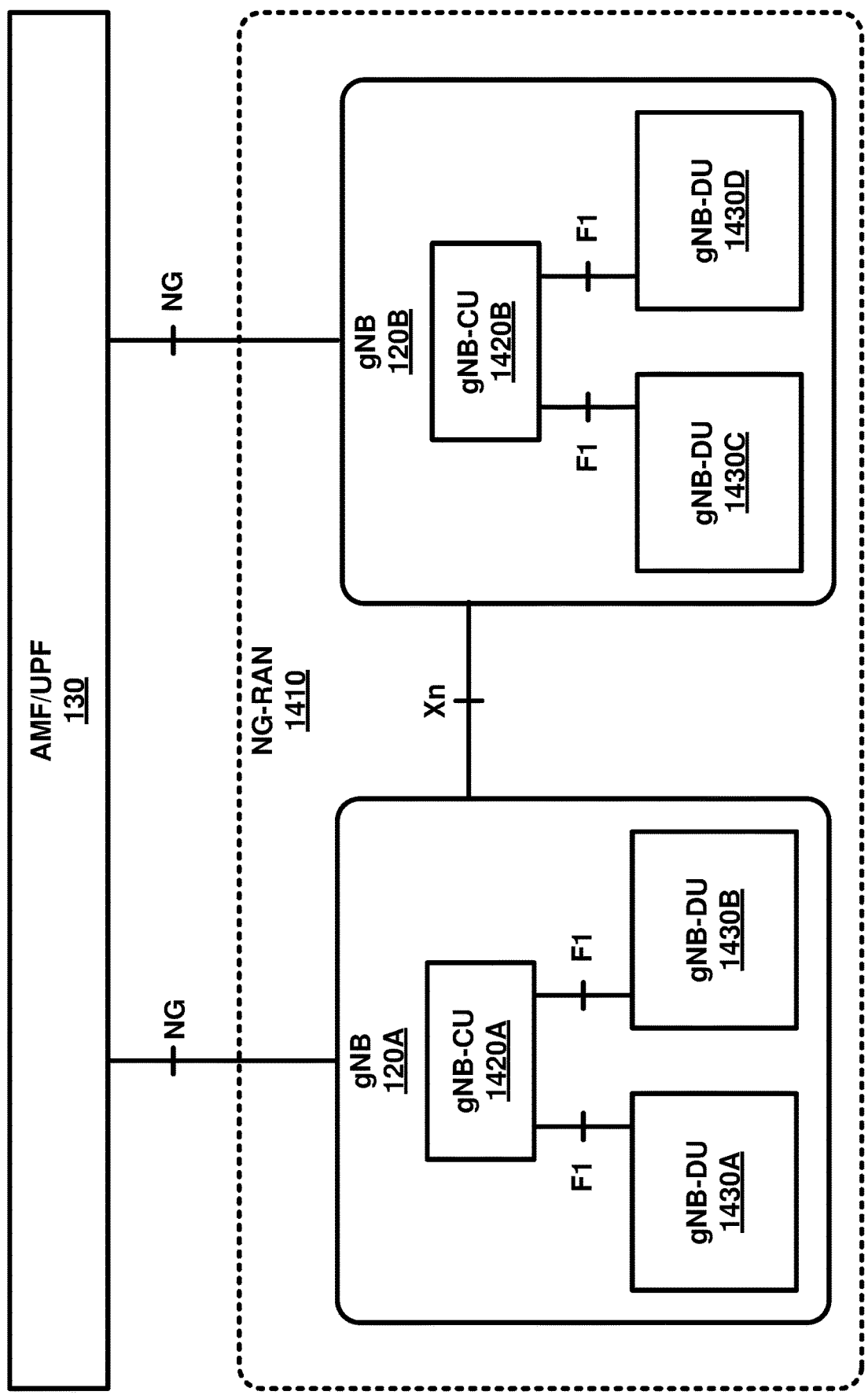
FIG. 14 is a diagram of an example RAN architecture as per an aspect of an embodiment of the present disclosure.

FIG. 14 is an example diagram of a RAN architecture comprising one or more base stations. In an example, a protocol stack (e.g. RRC, SDAP, PDCP, RLC, MAC, and PHY) may be supported at a node. A base station (e.g. 120A or 120B) may comprise a base station central unit (CU) (e.g. gNB-CU 1420A or 1420B) and at least one base station distributed unit (DU) (e.g. gNB-DU 1430A, 1430B, 1430C, or 1430D) if a functional split is configured. Upper protocol layers of a base station may be located in a base station CU, and lower layers of the base station may be located in the base station DUs. An F1 interface (e.g. CU-DU interface) connecting a base station CU and base station DUs may be an ideal or non-ideal backhaul. F1-C may provide a control plane connection over an F1 interface, and F1-U may provide a user plane connection over the F1 interface. In an example, an Xn interface may be configured between base station CUs.

In an example, a base station CU may comprise an RRC function, an SDAP layer, and a PDCP layer, and base station DUs may comprise an RLC layer, a MAC layer, and a PHY layer. In an example, various functional split options between a base station CU and base station DUs may be possible by locating different combinations of upper protocol layers (RAN functions) in a base station CU and different combinations of lower protocol layers (RAN functions) in base station DUs. A functional split may support flexibility to move protocol layers between a base station CU and base station DUs depending on service requirements and/or network environments.

In an example, functional split options may be configured per base station, per base station CU, per base station DU, per UE, per bearer, per slice, or with other granularities. In per base station CU split, a base station CU may have a fixed split option, and base station DUs may be configured to match a split option of a base station CU. In per base station DU split, a base station DU may be configured with a different split option, and a base station CU may provide different split options for different base station DUs. In per UE split, a base station (base station CU and at least one base station DUs) may provide different split options for different wireless devices. In per bearer split, different split options may be utilized for different bearers. In per slice splice, different split options may be applied for different slices.

Figure 15:
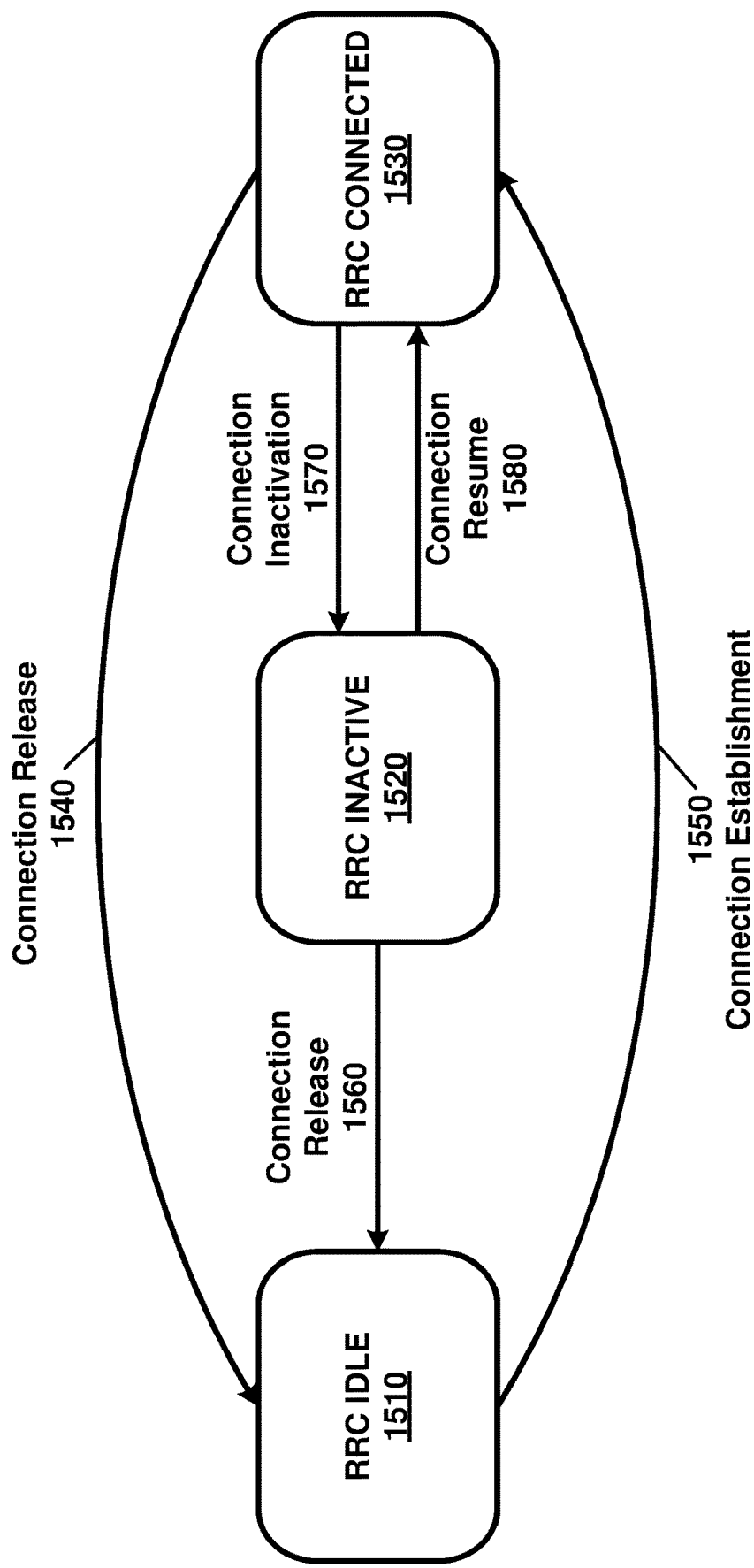
FIG. 15 is a diagram of example RRC states as per an aspect of an embodiment of the present disclosure.

FIG. 15 is an example diagram showing RRC state transitions of a wireless device. In an example, a wireless device may be in at least one RRC state among an RRC connected state (e.g. RRC Connected 1530, RRC_Connected), an RRC idle state (e.g. RRC Idle 1510, RRC_Idle), and/or an RRC inactive state (e.g. RRC Inactive 1520, RRC_Inactive). In an example, in an RRC connected state, a wireless device may have at least one RRC connection with at least one base station (e.g. gNB and/or eNB), which may have a UE context of the wireless device. A UE context (e.g. a wireless device context) may comprise at least one of an access stratum context, one or more radio link configuration parameters, bearer (e.g. data radio bearer (DRB), signaling radio bearer (SRB), logical channel, QoS flow, PDU session, and/or the like) configuration information, security information, PHY/MAC/RLC/PDCP/SDAP layer configuration information, and/or the like configuration information for a wireless device. In an example, in an RRC idle state, a wireless device may not have an RRC connection with a base station, and a UE context of a wireless device may not be stored in a base station. In an example, in an RRC inactive state, a wireless device may not have an RRC connection with a base station. A UE context of a wireless device may be stored in a base station, which may be called as an anchor base station (e.g. last serving base station).

In an example, a wireless device may transition a UE RRC state between an RRC idle state and an RRC connected state in both ways (e.g. connection release 1540 or connection establishment 1550; or connection reestablishment) and/or between an RRC inactive state and an RRC connected state in both ways (e.g. connection inactivation 1570 or connection resume 1580). In an example, a wireless device may transition its RRC state from an RRC inactive state to an RRC idle state (e.g. connection release 1560).

In an example, an anchor base station may be a base station that may keep a UE context (a wireless device context) of a wireless device at least during a time period that a wireless device stays in a RAN notification area (RNA) of an anchor base station, and/or that a wireless device stays in an RRC inactive state. In an example, an anchor base station may be a base station that a wireless device in an RRC inactive state was lastly connected to in a latest RRC connected state or that a wireless device lastly performed an RNA update procedure in. In an example, an RNA may comprise one or more cells operated by one or more base stations. In an example, a base station may belong to one or more RNAs. In an example, a cell may belong to one or more RNAs.

In an example, a wireless device may transition a UE RRC state from an RRC connected state to an RRC inactive state in a base station. A wireless device may receive RNA information from the base station. RNA information may comprise at least one of an RNA identifier, one or more cell identifiers of one or more cells of an RNA, a base station identifier, an IP address of the base station, an AS context identifier of the wireless device, a resume identifier, and/or the like.

In an example, an anchor base station may broadcast a message (e.g. RAN paging message) to base stations of an RNA to reach to a wireless device in an RRC inactive state, and/or the base stations receiving the message from the anchor base station may broadcast and/or multicast another message (e.g. paging message) to wireless devices in their coverage area, cell coverage area, and/or beam coverage area associated with the RNA through an air interface.

In an example, when a wireless device in an RRC inactive state moves into a new RNA, the wireless device may perform an RNA update (RNAU) procedure, which may comprise a random access procedure by the wireless device and/or a UE context retrieve procedure. A UE context retrieve may comprise: receiving, by a base station from a wireless device, a random access preamble; and fetching, by a base station, a UE context of the wireless device from an old anchor base station. Fetching may comprise: sending a retrieve UE context request message comprising a resume identifier to the old anchor base station and receiving a retrieve UE context response message comprising the UE context of the wireless device from the old anchor base station.

In an example embodiment, a wireless device in an RRC inactive state may select a cell to camp on based on at least a on measurement results for one or more cells, a cell where a wireless device may monitor an RNA paging message and/or a core network paging message from a base station. In an example, a wireless device in an RRC inactive state may select a cell to perform a random access procedure to resume an RRC connection and/or to transmit one or more packets to a base station (e.g. to a network). In an example, if a cell selected belongs to a different RNA from an RNA for a wireless device in an RRC inactive state, the wireless device may initiate a random access procedure to perform an RNA update procedure. In an example, if a wireless device in an RRC inactive state has one or more packets, in a buffer, to transmit to a network, the wireless device may initiate a random access procedure to transmit one or more packets to a base station of a cell that the wireless device selects. A random access procedure may be performed with two messages (e.g. 2 stage random access) and/or four messages (e.g. 4 stage random access) between the wireless device and the base station.

In an example embodiment, a base station receiving one or more uplink packets from a wireless device in an RRC inactive state may fetch a UE context of a wireless device by transmitting a retrieve UE context request message for the wireless device to an anchor base station of the wireless device based on at least one of an AS context identifier, an RNA identifier, a base station identifier, a resume identifier, and/or a cell identifier received from the wireless device. In response to fetching a UE context, a base station may transmit a path switch request for a wireless device to a core network entity (e.g. AMF, MME, and/or the like). A core network entity may update a downlink tunnel endpoint identifier for one or more bearers established for the wireless device between a user plane core network entity (e.g. UPF, S-GW, and/or the like) and a RAN node (e.g. the base station), e.g. changing a downlink tunnel endpoint identifier from an address of the anchor base station to an address of the base station.

A gNB may communicate with a wireless device via a wireless network employing one or more new radio technologies. The one or more radio technologies may comprise at least one of: multiple technologies related to physical layer; multiple technologies related to medium access control layer; and/or multiple technologies related to radio resource control layer. Example embodiments of enhancing the one or more radio technologies may improve performance of a wireless network. Example embodiments may increase the system throughput, or data rate of transmission. Example embodiments may reduce battery consumption of a wireless device. Example embodiments may improve latency of data transmission between a gNB and a wireless device. Example embodiments may improve network coverage of a wireless network. Example embodiments may improve transmission efficiency of a wireless network.

The amount of data traffic carried over cellular networks is expected to increase for many years to come. The number of users/devices is increasing and each user/device accesses an increasing number and variety of services, e.g. video delivery, large files, images. This requires not only high capacity in the network, but also provisioning very high data rates to meet customers' expectations on interactivity and responsiveness. More spectrum is therefore needed for cellular operators to meet the increasing demand. Considering user expectations of high data rates along with seamless mobility, it is beneficial that more spectrum be made available for deploying macro cells as well as small cells for cellular systems.

Striving to meet the market demands, there has been increasing interest from operators in deploying some complementary access utilizing unlicensed spectrum to meet the traffic growth. This is exemplified by the large number of operator-deployed Wi-Fi networks and the 3GPP standardization of LTE/WLAN interworking solutions. This interest indicates that unlicensed spectrum, when present, can be an effective complement to licensed spectrum for cellular operators to help addressing the traffic explosion in some scenarios, such as hotspot areas. LAA offers an alternative for operators to make use of unlicensed spectrum while managing one radio network, thus offering new possibilities for optimizing the network's efficiency.

In an example embodiment, Listen-before-talk (clear channel assessment) may be implemented for transmission in an LAA cell. In a listen-before-talk (LBT) procedure, equipment may apply a clear channel assessment (CCA) check before using the channel. For example, the CCA utilizes at least energy detection to determine the presence or absence of other signals on a channel in order to determine if a channel is occupied or clear, respectively. For example, European and Japanese regulations mandate the usage of LBT in the unlicensed bands. Apart from regulatory requirements, carrier sensing via LBT may be one way for fair sharing of the unlicensed spectrum.

In an example embodiment, discontinuous transmission on an unlicensed carrier with limited maximum transmission duration may be enabled. Some of these functions may be supported by one or more signals to be transmitted from the beginning of a discontinuous LAA downlink transmission. Channel reservation may be enabled by the transmission of signals, by an LAA node, after gaining channel access via a successful LBT operation, so that other nodes that receive the transmitted signal with energy above a certain threshold sense the channel to be occupied. Functions that may need to be supported by one or more signals for LAA operation with discontinuous downlink transmission may include one or more of the following: detection of the LAA downlink transmission (including cell identification) by UEs; time & frequency synchronization of UEs.

In an example embodiment, DL LAA design may employ subframe boundary alignment according to LTE-A carrier aggregation timing relationships across serving cells aggregated by CA. This may not imply that the eNB transmissions can start only at the subframe boundary. LAA may support transmitting PDSCH when not all OFDM symbols are available for transmission in a subframe according to LBT. Delivery of necessary control information for the PDSCH may also be supported.

LBT procedure may be employed for fair and friendly coexistence of LAA with other operators and technologies operating in unlicensed spectrum. LBT procedures on a node attempting to transmit on a carrier in unlicensed spectrum require the node to perform a clear channel assessment to determine if the channel is free for use. An LBT procedure may involve at least energy detection to determine if the channel is being used. For example, regulatory requirements in some regions, e.g., in Europe, specify an energy detection threshold such that if a node receives energy greater than this threshold, the node assumes that the channel is not free. While nodes may follow such regulatory requirements, a node may optionally use a lower threshold for energy detection than that specified by regulatory requirements. In an example, LAA may employ a mechanism to adaptively change the energy detection threshold, e.g., LAA may employ a mechanism to adaptively lower the energy detection threshold from an upper bound. Adaptation mechanism may not preclude static or semi-static setting of the threshold. In an example Category 4 LBT mechanism or other type of LBT mechanisms may be implemented.

Various example LBT mechanisms may be implemented. In an example, for some signals, in some implementation scenarios, in some situations, and/or in some frequencies no LBT procedure may performed by the transmitting entity. In an example, Category 2 (e.g. LBT without random back-off) may be implemented. The duration of time that the channel is sensed to be idle before the transmitting entity transmits may be deterministic. In an example, Category 3 (e.g. LBT with random back-off with a contention window of fixed size) may be implemented. The LBT procedure may have the following procedure as one of its components. The transmitting entity may draw a random number N within a contention window. The size of the contention window may be specified by the minimum and maximum value of N. The size of the contention window may be fixed. The random number N may be employed in the LBT procedure to determine the duration of time that the channel is sensed to be idle before the transmitting entity transmits on the channel. In an example, Category 4 (e.g. LBT with random back-off with a contention window of variable size) may be implemented. The transmitting entity may draw a random number N within a contention window. The size of contention window may be specified by the minimum and maximum value of N. The transmitting entity may vary the size of the contention window when drawing the random number N. The random number N is used in the LBT procedure to determine the duration of time that the channel is sensed to be idle before the transmitting entity transmits on the channel.

LAA may employ uplink LBT at the UE. The UL LBT scheme may be different from the DL LBT scheme (e.g. by using different LBT mechanisms or parameters) for example, since the LAA UL is based on scheduled access which affects a UE's channel contention opportunities. Other considerations motivating a different UL LBT scheme include, but are not limited to, multiplexing of multiple UEs in a single subframe.

In an example, a DL transmission burst may be a continuous transmission from a DL transmitting node with no transmission immediately before or after from the same node on the same CC. An UL transmission burst from a UE perspective may be a continuous transmission from a UE with no transmission immediately before or after from the same UE on the same CC. In an example, UL transmission burst is defined from a UE perspective. In an example, an UL transmission burst may be defined from an eNB perspective. In an example, in case of an eNB operating DL+UL LAA over the same unlicensed carrier, DL transmission burst(s) and UL transmission burst(s) on LAA may be scheduled in a TDM manner over the same unlicensed carrier. For example, an instant in time may be part of a DL transmission burst or an UL transmission burst.

In an example, single and multiple DL to UL and UL to DL switching within a shared gNB COT may be supported. Example LBT requirements to support single or multiple switching points, may include: for gap of less than 16 us: no-LBT may be used; for gap of above 16 us but does not exceed 25 us: one-shot LBT may be used; for single switching point, for the gap from DL transmission to UL transmission exceeds 25 us: one-shot LBT may be used; for multiple switching points, for the gap from DL transmission to UL transmission exceeds 25 us, one-shot LBT may be used.

In an example, a signal that facilitates its detection with low complexity may be useful for UE power saving; Improved coexistence; Spatial reuse at least within the same operator network, Serving cell transmission burst acquisition, etc.

In an example, operation of new radio on unlicensed bands (NR-U) may employ a signal that contains at least SS/PBCH block burst set transmission. In an example, other channels and signals may be transmitted together as part of the signal. The design of this signal may consider there are no gaps within the time span the signal is transmitted at least within a beam. In an example, gaps may be needed for beam switching. In an example, the occupied channel bandwidth may be satisfied.

In an example, a block-interlaced based PUSCH may be employed. In an example, the same interlace structure for PUCCH and PUSCH may be used. In an example, interlaced based PRACH may be used.

In an example, initial active DL/UL BWP may be approximately 20 MHz for 5 GHz band. In an example, initial active DL/UL BWP may be approximately 20 MHz for 6 GHz band if similar channelization as 5 GHz band is used for 6 GHz band.

In an example, HARQ A/N for the corresponding data may be transmitted in the same shared COT. In some examples, the HARQ A/N may be transmitted in a separate COT from the one the corresponding data was transmitted.

In an example, when UL HARQ feedback is transmitted on unlicensed band, NR-U may consider mechanisms to support flexible triggering and multiplexing of HARQ feedback for one or more DL HARQ processes.

In an example, the dependencies of HARQ process information to the timing may be removed. In an example, UCI on PUSCH may carry HARQ process ID, NDI, RVID. In an example, Downlink Feedback Information (DFI) may be used for transmission of HARQ feedback for configured grant.

In an example, both CBRA and CFRA may be supported on NR-U SpCell and CFRA may be supported on NR-U SCells. In an example, RAR may be transmitted via SpCell. In an example, a predefined HARQ process ID for RAR.

In an example, carrier aggregation between licensed band NR (PCell) and NR-U (SCell) may be supported. In an example, NR-U SCell may have both DL and UL, or DL-only. In an example, dual connectivity between licensed band LTE (PCell) and NR-U (PSCell) may be supported. In an example, Stand-alone NR-U where all carriers are in unlicensed spectrum may be supported. In an example, an NR cell with DL in unlicensed band and UL in licensed band may be supported. In an example, dual connectivity between licensed band NR (PCell) and NR-U (PSCell) may be supported.

In an example, if absence of Wi-Fi cannot be guaranteed (e.g. by regulation) in a band (e.g., sub-7 GHz) where NR-U is operating, the NR-U operating bandwidth may be an integer multiple of 20 MHz. In an example, at least for band where absence of Wi-Fi cannot be guaranteed (e.g. by regulation), LBT can be performed in units of 20 MHz. In an example, receiver assisted LBT (e.g., RTS/CTS type mechanism) and/or on-demand receiver assisted LBT (e.g., for example receiver assisted LBT enabled only when needed) may be employed. In an example, techniques to enhance spatial reuse may be used. In an example, preamble detection may be used.

In an example, with scheduled PUSCH transmissions on an unlicensed carrier, the network first needs to gain access to the channel to transmit PDCCH and then the UE needs to perform LBT again prior to transmitting on the resource. Such procedure tends to increase latency especially when the channel is loaded. In an example, a mechanism of autonomous uplink transmission may be used. In an example, a UE may be pre-allocated a resource for transmission similar to UL SPS and performs LBT prior to using the resource. In an example, autonomous uplink may be based on the Configured Grant functionality (e.g., Type 1 and/or Type 2).

In an example, the HARQ process identity may be transmitted by the UE (e.g., as UCI). This may enable a UE to use the first available transmission opportunity irrespective of the HARQ process. In an example, UCI on PUSCH may be used to carry HARQ process ID, NDI and RVID.

For unlicensed band, UL dynamic grant scheduled transmission may increase the delay and transmission failure possibility due to at least two LBTs of UE and gNB. Pre-configured grant such as configured grant in NR may be used for NR-U, which may decrease the number of LBTs performed and control signaling overhead.

In an example, in a Type 1 configured grant, an uplink grant is provided by RRC, and stored as configured uplink grant. In an example, in Type 2 configured grant, an uplink grant is provided by PDCCH, and stored or cleared as configured uplink grant based on L1 signaling indicating configured grant activation or deactivation.

In an example, there may not be a dependency between HARQ process information to the timing. In an example, UCI on PUSCH may carry HARQ process ID, NDI, RVID, etc. In an example, UE may autonomously select one HARQ process ID which is informed to gNB by UCI.

In an example, a UE may perform non-adaptive retransmission with the configured uplink grant. When dynamic grant for configured grant retransmission is blocked due to LBT, UE may try to transmit in the next available resource with configured grant.

In an example, Downlink Feedback Information (DFI) may be transmitted (e.g., using DCI) may include HARQ feedback for configured grant transmission. The UE may perform transmission/retransmission using configured grant according to DFI including HARQ feedback. In an example, wideband carrier with more than one channels is supported on NR-based unlicensed cell.

In an example, there may be one active BWP in a carrier. In an example, a BWP with multiple channels may be activated. In an example, when absence of Wi-Fi cannot be guaranteed (e.g. by regulation), LBT may be performed in units of 20 MHz. In this case, there may be multiple parallel LBT procedures for this BWP. The actual transmission bandwidth may be subject to subband with LBT success, which may result in dynamic bandwidth transmission within this active wideband BWP.

In an example, multiple active BWPs may be supported. To maximize the BWP utilization efficiency, the BWP bandwidth may be the same as the bandwidth of subband for LBT, e.g., LBT is carried out on each BWP. The network may activate/deactivate the BWPs based on data volume to be transmitted.

In an example, multiple non overlapped BWPs may be activated for a UE within a wide component carrier, which may be similar as carrier aggregation in LTE LAA. To maximize the BWP utilization efficiency, the BWP bandwidth may be the same as the bandwidth of subband for LBT, i.e. LBT is carrier out on each BWP. When more than one subband LBT success, it requires UE to have the capability to support multiple narrow RF or a wide RF which includes these multiple activated BWPs.

In an example, a single wideband BWP may be activated for a UE within a component carrier. The bandwidth of wideband BWP may be in the unit of subband for LBT. For example, if the subband for LBT is 20 MHz in 5 GHz band, the wideband BWP bandwidth may consist of multiple 20 MHz. The actual transmission bandwidth may be subject to subband with LBT success, which may result in dynamic bandwidth transmission within this active wideband BWP.

In an example, active BWP switching may be achieved by use of scheduling DCI. In an example, the network may indicate to the UE a new active BWP to use for an upcoming, and any subsequent, data transmission/reception. In an example, a UE may monitor multiple, configured BWPs to determine which has been acquired for DL transmissions by the gNB. For example, a UE may be configured with monitoring occasion periodicity and offset for each configured BWP. The UE may attempt to determine if a BWP has been acquired by the gNB during those monitoring occasions. In an example, upon successfully determining that the channel is acquired, the UE may continue with that BWP as its active BWP, at least until indicated otherwise or MCOT has been reached. In an example, when a UE has determined that a BWP is active, it may attempt blind detection of PDCCH in configured CORESETs and it might also perform measurements on aperiodic or SPS resources.

In an example, for UL transmissions, a UE may be configured with multiple UL resources, possibly in different BWPs. The UE may have multiple LBT configurations, each tied to a BWP and possibly a beam pair link. The UE may be granted UL resources tied to one or more LBT configurations. Similarly, the UE may be provided with multiple AUL/grant-free resources each requiring the use of different LBT configurations. Providing a UE with multiple AUL resources over multiple BWPs may ensure that if LBT fails using a first LBT configuration for one AUL resource in one BWP a UE can attempt transmission in another AUL resource in another BWP. This may reduce the channel access latency and make better use of the over-all unlicensed carrier.

Carrier aggregation with at least one SCell operating in the unlicensed spectrum may be referred to as Licensed-Assisted Access (LAA). In LAA, the configured set of serving cells for a UE may include at least one SCell operating in the unlicensed spectrum according to a first frame structure (e.g., frame structure Type 3). The SCell may be referred to as an LAA SCell.

In an example, if the absence of IEEE802.11n/11ac devices (or other similar short-range wireless devices) sharing the carrier cannot be guaranteed on a long term basis (e.g., by level of regulation), and if the maximum number of unlicensed channels that the network may simultaneously transmit on is equal to or less than 4, the maximum frequency separation between any two carrier center frequencies on which an LAA SCell transmissions are performed may be less than or equal to 62 MHz. In an example, the UE may be required to support frequency separation. It should be noted that values of 4 channels and 62 MHz used above are exemplary and different values can be used in other embodiments as would be appreciated by a person of ordinary skill in the art.

In an example, a base station and a UE may apply Listen-Before-Talk (LBT) before performing a transmission on an LAA SCell. When LBT is performed, the transmitter may listen to/sense the channel to determine whether the channel is free or busy. If the channel is determined to be free/clear, the transmitter may perform the transmission; otherwise, it may not perform the transmission. In an example, if the base station uses channel access signals of other technologies for the purpose of channel access, it may continue to meet the LAA maximum energy detection threshold requirement.

In an example, the combined time of transmissions compliant with the channel access procedure by a base station may not exceed 50 ms in any contiguous 1 second period on an LAA SCell.

In an example, which LBT type (e.g., type 1 or type 2 uplink channel access) the UE applies may be signaled via an uplink grant for an uplink PUSCH transmission on LAA SCells. In an example, for Autonomous Uplink (AUL) transmissions the LBT may not be signaled in the uplink grant.

In an example, for type 1 uplink channel access on AUL, a base station may signal the Channel Access Priority Class for a logical channel and a UE may select the highest Channel Access Priority Class (e.g., with a lower number in FIG. 16) of the logical channel(s) with MAC SDU multiplexed into the MAC PDU. In an example, the MAC CEs except padding BSR may use the lowest Channel Access Priority Class.

In an example, for type 2 uplink channel access on AUL, the UE may select logical channels corresponding to any Channel Access Priority Class for UL transmission in the subframes signaled by base station in common downlink control signaling.

In an example, for uplink LAA operation, the base station may not schedule the UE more subframes than the minimum necessary to transmit the traffic corresponding to the selected Channel Access Priority Class or lower (e.g., with a lower number in FIG. 16), than the channel Access Priority Class signaled in UL grant based on the latest BSR and received uplink traffic from the UE if type 1 uplink channel access procedure is signaled to the UE; and/or Channel Access Priority Class used by the base station based on the downlink traffic, the latest BSR and received UL traffic from the UE if type 2 uplink channel access procedure is signaled to the UE.

In an example, a first number (e.g., four) Channel Access Priority Classes may be used when performing uplink and downlink transmissions in LAA carriers. FIG. 16 shows which Channel Access Priority Class may be used by traffic belonging to the different standardized QCIs. A non-standardized QCI (e.g., Operator specific QCI) may use suitable Channel Access Priority Class based on the FIG. 16 for example, e.g., the Channel Access Priority Class used for a non-standardized QCI should be the Channel Access Priority Class of the standardized QCIs which best matches the traffic class of the non-standardized QCI.

In an example, for uplink, the base station may select the Channel Access Priority Class by taking into account the lowest priority QCI in a Logical Channel Group.

In an example, four Channel Access Priority Classes may be used. If a DL transmission burst with PDSCH is transmitted, for which channel access has been obtained using Channel Access Priority Class P (1 . . . 4), the base station may ensure the following where a DL transmission burst refers to the continuous transmission by base station after a successful LBT: the transmission duration of the DL transmission burst may not exceed the minimum duration needed to transmit all available buffered traffic corresponding to Channel Access Priority Class(es)≤P; the transmission duration of the DL transmission burst may not exceed the Maximum Channel Occupancy Time for Channel Access Priority Class P; and additional traffic corresponding to Channel Access Priority Class(s)>P may be included in the DL transmission burst once no more data corresponding to Channel Access Priority Class≤P is available for transmission. In such cases, the base station may maximize (or at least increase) occupancy of the remaining transmission resources in the DL transmission burst with this additional traffic.

When the PDCCH of an LAA SCell is configured and cross-carrier scheduling applies to uplink transmission, the LAA SCell may be scheduled for downlink transmission via a PDCCH received on the LAA SCell and for uplink transmission via a PDCCH of another serving cell. When the PDCCH of an LAA SCell is configured and self-scheduling applies to both uplink transmission and downlink transmission, the LAA SCell may be scheduled for uplink transmission and downlink transmission via a PDCCH received via the LAA SCell.

In an example, autonomous uplink may be supported on the SCells. In an example, one or more autonomous uplink configurations may be supported per SCell. In an example, multiple autonomous uplink configurations may be active simultaneously when there is more than one SCell.

In an example, when autonomous uplink is configured by RRC, the following information may be provided in an AUL configuration information element (e.g., AUL-Config): AUL C-RNTI; HARQ process IDs aul-harq-processes that may be configured for autonomous UL HARQ operation, the time period aul-retransmissionTimer before triggering a new transmission or a retransmission of the same HARQ process using autonomous uplink; the bitmap aul-subframes that indicates the subframes that are configured for autonomous UL HARQ operation.

In an example, when the autonomous uplink configuration is released by RRC, the corresponding configured grant may be cleared.

In an example, if AUL-Config is configured, the MAC entity may consider that a configured uplink grant occurs in those subframes for which aul-subframes is set to 1.

In an example, if AUL confirmation has been triggered and not cancelled, if the MAC entity has UL resources allocated for new transmission for this TTI, the MAC entity may instruct a Multiplexing and Assembly procedure to generate an AUL confirmation MAC Control Element; the MAC entity may cancel the triggered AUL confirmation.

In an example, the MAC entity may clear the configured uplink grant for the SCell in response first transmission of AUL confirmation MAC Control Element triggered by the AUL release for this SCell. In an example, retransmissions for uplink transmissions using autonomous uplink may continue after clearing the corresponding configured uplink grant.

In an example, a MAC entity may be configured with AUL-RNTI for AUL operation. In an example, an uplink grant may be received for a transmission time interval for a Serving Cell on the PDCCH for the MAC entity's AUL C-RNTI. In an example, if the NDI in the received HARQ information is 1, the MAC entity may consider the NDI for the corresponding HARQ process not to have been toggled. The MAC entity may deliver the uplink grant and the associated HARQ information to the HARQ entity for this transmission time interval. In an example, if the NDI in the received HARQ information is 0 and if PDCCH contents indicate AUL release, the MAC entity may trigger an AUL confirmation. If an uplink grant for this TTI has been configured, the MAC entity may consider the NDI bit for the corresponding HARQ process to have been toggled. The MAC entity may deliver the configured uplink grant and the associated HARQ information to the HARQ entity for this TTI. In an example, if the NDI in the received HARQ information is 0 and if PDCCH contents indicate AUL activation, the MAC entity may trigger an AUL confirmation.

In an example, if the aul-retransmissionTimer is not running and if there is no uplink grant previously delivered to the HARQ entity for the same HARQ process; or if the previous uplink grant delivered to the HARQ entity for the same HARQ process was not an uplink grant received for the MAC entity's C-RNTI; or if the HARQ_FEEDBACK is set to ACK for the corresponding HARQ process, the MAC entity may deliver the configured uplink grant, and the associated HARQ information to the HARQ entity for this TTI.

In an example, the NDI transmitted in the PDCCH for the MAC entity's AUL C-RNTI may be set to 0.

In an example, for configured uplink grants, if UL HARQ operation is autonomous, the HARQ Process ID associated with a TTI for transmission on a Serving Cell may be selected by the UE implementation from the HARQ process IDs that are configured for autonomous UL HARQ operation by upper layers for example, in aul-harq-processes.

In an example, for autonomous HARQ, a HARQ process may maintain a state variable e.g., HARQ_FEEDBACK, which may indicate the HARQ feedback for the MAC PDU currently in the buffer, and/or a timer aul-retransmission-Timer which may prohibit new transmission or retransmission for the same HARQ process when the timer is running.

In an example, when the HARQ feedback is received for a TB, the HARQ process may set HARQ_FEEDBACK to the received value; and may stop the aul-retransmission-Timer if running.

In an example, when PUSCH transmission is performed for a TB and if the uplink grant is a configured grant for the MAC entity's AUL C-RNTI, the HARQ process start the aul-retransmissionTimer.

In an example, if the HARQ entity requests a new transmission, the HARQ process may set HARQ_FEED-BACK to NACK if UL HARQ operation is autonomous asynchronous. if the uplink grant was addressed to the AUL C-RNTI, set CURRENT_IRV to 0.

In an example, if aperiodic CSI requested for a TTI, the MAC entity may not generate a MAC PDU for the HARQ entity in case the grant indicated to the HARQ entity is a configured uplink grant activated by the MAC entity's AUL C-RNTI.

In an example, if the UE detects on the scheduling cell for UL transmissions on an LAA SCell a transmission of DCI (e.g., Format 0A/4A) with the CRC scrambled by AUL C-RNTI carrying AUL-DFI, the UE may use the autonomous uplink feedback information according to the following procedures: for a HARQ process configured for autonomous uplink transmission, the corresponding HARQ-ACK feedback may be delivered to higher layers. For the HARQ processes not configured for autonomous uplink transmission, the corresponding HARQ-ACK feedback may not delivered to higher layers; for an uplink transmission in subframe/slot/TTI n, the UE may expect HARQ-ACK feedback in the AUL-DFI at earliest in subframe n+4; If the UE receives AUL-DFI in a subframe indicating ACK for a HARQ process, the UE may not be expected to receive AUL-DFI indicating ACK for the same HARQ process prior to 4 ms after the UE transmits another uplink transmission associated with that HARQ process;

In an example, a UE may validate an autonomous uplink assignment PDCCH/EPDCCH if all the following conditions are met: the CRC parity bits obtained for the PDCCH/EPDCCH payload are scrambled with the AUL C-RNTI; and the 'Flag for AUL differentiation' indicates activating/releasing AUL transmission. In an example, one or more fields in an activation DCI may be pre-configured values for validation.

In an example, if the MAC entity is configured with one or more SCells, the network may activate and deactivate the configured SCells. In an example, the SpCell is always activated. In an example, the network may activate and deactivate the SCell(s) by sending Activation/Deactivation and/or Hibernation MAC control element(s). The MAC entity may maintain a sCellDeactivationTimer timer per configured SCell (for example, except the SCell configured with PUCCH/SPUCCH, if any). In an example, the MAC entity may deactivate the associated SCell upon its expiry. In an example, in case the sCellHibernationTimer is configured, it may take priority over sCellDeactivationTimer. In an example, the same initial timer value may apply to each instance of the sCellDeactivationTimer and the initial value may be configured by RRC. In an example, the configured SCells may be initially deactivated upon addition and after a handover unless the parameter sCellState is set to activated or dormant for the SCell within RRC configuration. In an example, the configured SCG SCells may be initially deactivated after a SCG change unless the parameter sCellState is set to activated or dormant for the SCell within RRC configuration.

In an example, for each TTI and for each configured SCell, if the MAC entity is configured with an activated SCell upon SCell configuration or receives MAC control element(s) in this TTI activating the SCell, the MAC entity may, in a first TTI, activate the SCell and/or apply normal SCell operation including. SRS transmissions on the SCell; CQI/PMI/RI/PTI/CRI reporting for the SCell using the short period of the CSI (CQI/PMI/RI/PTI/CRI) reporting resource configured by cqi-ShortConfigSCell if cqi-ShortConfigS-Cell is configured, otherwise CQI/PMI/RI/PTI/CRI reporting for the SCell using the configuration in cqi-ReportConfigSCell; PDCCH monitoring on the SCell; PDCCH monitoring for the SCell; PUCCH/SPUCCH transmissions on the SCell, if configured. The MAC entity may start or restart the sCellDeactivationTimer associated with the SCell. The MAC entity may start or restart the sCellHibernationTimer associated with the SCell if sCellHibernationTimer associated with the SCell is configured. The MAC entity may trigger PHR.

In an example, for each TTI and for each configured SCell, if the MAC entity receives MAC control element(s) in this TTI deactivating the SCell; or if the sCellDeactivationTimer associated with the activated SCell expires in this TTI and sCellHibernationTimer is not configured, in a TTI according to a timing, the MAC entity may deactivate the SCell; stop the sCellDeactivationTimer associated with the SCell; flush all HARQ buffers associated with the SCell.

In an example, for each TTI and for each configured SCell, if PDCCH on the activated SCell indicates an uplink grant or downlink assignment; or if PDCCH on the Serving Cell scheduling the activated SCell indicates an uplink grant or a downlink assignment for the activated SCell; or if a MAC PDU is transmitted in a configured uplink grant or received in a configured downlink assignment, the MAC entity may restart the sCellDeactivationTimer associated with the SCell; if sCellHibernationTimer associated with the SCell is configured, the MAC entity may restart the sCell-HibernationTimer associated with the SCell; if the SCell is activated and the cqi-ShortConfigSCell expires in this TTI, according to a timing, the MAC entity may apply SCell CQI/PMI/RI/PTI/CRI reporting for the SCell using the configuration in cqi-ReportConfigSCell.

In an example, for each TTI and for each configured SCell, if the SCell is deactivated, the MAC entity may not transmit SRS on the SCell; may not report CQI/PMI/RI/PTI/CRI for the SCell; may not transmit on UL-SCH on the SCell; may not transmit on RACH on the SCell; may not monitor the PDCCH on the SCell; may not monitor the PDCCH for the SCell and may not transmit PUCCH/SPUCCH on the SCell.

In an example, HARQ feedback for the MAC PDU containing Activation/Deactivation MAC control element may not be impacted by PCell, PSCell and PUCCH SCell interruptions due to SCell activation/deactivation.

In an example, when SCell is deactivated, the ongoing Random Access procedure on the SCell, if any, may be aborted.

In an example, value of SCell deactivation timer may be in number of radio frames. For example, value rf4 may correspond to 4 radio frames, value rf8 may correspond to 8 radio frames and so on. In an example, base station may configure the field if the UE is configured with one or more SCells other than the PSCell and PUCCH SCell. In an example, if the field is absent, the UE may delete any existing value for this field and assume the value to be set to infinity. In an example, the same value may apply for each SCell of a Cell Group (e.g., MCG or SCG). The associated functionality may be performed independently for each SCell. In an example, field sCellDeactivationTimer may not apply for a PUCCH SCell.

In an example, if the MAC entity is configured with one or more SCells, the network may activate and deactivate the configured SCells. Upon configuration of an SCell, the SCell may be deactivated. In an example, the configured SCell(s) is activated and deactivated by receiving the SCell Activation/Deactivation MAC CE. In an example, by configuring sCellDeactivationTimer timer per configured SCell (except the SCell configured with PUCCH, if any), the associated SCell is deactivated upon its expiry.

In an example, if an SCell Activation/Deactivation MAC CE is received activating the SCell, the MAC entity may activate the SCell according to a timing defined. The MAC entity may apply normal SCell operation including SRS transmissions on the SCell; CSI reporting for the SCell; PDCCH monitoring on the SCell; PDCCH monitoring for the SCell; PUCCH transmissions on the SCell, if configured.

In an example, if an SCell Activation/Deactivation MAC CE is received activating the SCell, the MAC entity may start or restart the sCellDeactivationTimer associated with the SCell in the slot when the SCell Activation/Deactivation MAC CE was received.

In an example, if an SCell Activation/Deactivation MAC CE is received activating the SCell, the MAC entity may (re-)initialize any suspended configured uplink grants of configured grant Type 1 associated with this SCell according to the stored configuration, if any, and to start in a symbol. The MAC entity may trigger PHR.

In an example, if an SCell Activation/Deactivation MAC CE is received deactivating the SCell or if the sCellDeactivationTimer associated with the activated SCell expires, the MAC entity may deactivate the SCell according to a timing, stop the sCellDeactivationTimer associated with the SCell, stop the bwp-InactivityTimer associated with the SCell, clear any configured downlink assignment and any configured uplink grant Type 2 associated with the SCell respectively, suspend any configured uplink grant Type 1 associated with the SCell, flush all HARQ buffers associated with the SCell.

In an example, if PDCCH on the activated SCell indicates an uplink grant or downlink assignment; or if PDCCH on the Serving Cell scheduling the activated SCell indicates an uplink grant or a downlink assignment for the activated SCell; or if a MAC PDU is transmitted in a configured uplink grant or received in a configured downlink assignment, the MAC entity may restart the sCellDeactivationTimer associated with the SCell.

In an example, if the SCell is deactivated, the MAC entity may not transmit SRS on the SCell; may not report CSI for the SCell; may not transmit on UL-SCH on the SCell; may not transmit on RACH on the SCell; may not monitor the PDCCH on the SCell; may not monitor the PDCCH for the SCell; may not transmit PUCCH on the SCell.

In an example, HARQ feedback for the MAC PDU containing SCell Activation/Deactivation MAC CE may not be impacted by PCell, PSCell and PUCCH SCell interruptions due to SCell activation/deactivation.

In an example, when SCell is deactivated, the ongoing Random Access procedure on the SCell, if any, may be aborted.

In an example, the value of SCell deactivation timer may be in milliseconds. For example, the SCell deactivation timer may take values ms20, ms40, ms80, ms160, ms200, ms240, ms320, ms400, ms480, ms520, ms640, ms720, ms840, and ms1280. Ms20 may indicate twenty milliseconds and so on. If the field is absent, the UE may apply the value infinity.

In an example, an SCell Activation/Deactivation MAC CE of one octet may be identified by a MAC PDU subheader with a first LCID. It may have a fixed size and may consist of a single octet containing seven C-fields and one R-field.

In an example, an SCell Activation/Deactivation MAC CE of four octets may be identified by a MAC PDU subheader with a second LCID. It may have a fixed size and may consist of four octets containing 31 C-fields and one R-field.

In an example, for the case with no Serving Cell with a ServCellIndex larger than 7, SCell Activation/Deactivation MAC CE of one octet may be applied, otherwise SCell Activation/Deactivation MAC CE of four octets may be applied.

In an example, if there is an SCell configured for the MAC entity with SCellIndex i, the field Ci indicates the activation/deactivation status of the SCell with SCellIndex i, otherwise the MAC entity may ignore the Ci field. In an example, the Ci field may be set to 1 to indicate that the SCell with SCellIndex i may be activated. The Ci field may set to 0 to indicate that the SCell with SCellIndex i may be deactivated. In an example, the reserved bit R may be set to 0.

In an example, a Serving Cell may be configured with one or multiple BWPs. In an example, a maximum number of BWP per Serving Cell may be a first number.

In an example, the BWP switching for a Serving Cell may be used to activate an inactive BWP and deactivate an active BWP at a time. In an example, the BWP switching may be controlled by the PDCCH indicating a downlink assignment or an uplink grant, by the bwp-InactivityTimer, by RRC signaling, or by the MAC entity itself upon initiation of Random Access procedure. In an example, upon/in response to addition of SpCell or activation of an SCell, the DL BWP and UL BWP indicated by firstActiveDownlinkBWP-Id and firstActiveUplinkBWP-Id respectively may be active without receiving PDCCH indicating a downlink assignment or an uplink grant. The active BWP for a Serving Cell may be indicated by either RRC or PDCCH. For unpaired spectrum, a DL BWP may be paired with a UL BWP, and BWP switching may be common for both UL and DL.

In an example, for an activated Serving Cell configured with a BWP, if a BWP is activated, the MAC entity may transmit on UL-SCH on the BWP; may transmit on RACH on the BWP; may monitor the PDCCH on the BWP; may transmit PUCCH on the BWP; may transmit SRS on the BWP; may receive DL-SCH on the BWP; and may (re-) initialize any suspended configured uplink grants of configured grant Type 1 on the active BWP according to the stored configuration, if any, and to start in a symbol.

In an example, for an activated Serving Cell configured with a BWP, if a BWP is deactivated, the MAC entity may not transmit on UL-SCH on the BWP; may not transmit on RACH on the BWP; may not monitor the PDCCH on the BWP; may not transmit PUCCH on the BWP; may not report CSI for the BWP; may not transmit SRS on the BWP; may not receive DL-SCH on the BWP; may clear any configured downlink assignment and configured uplink grant of configured grant Type 2 on the BWP; and may suspend any configured uplink grant of configured grant Type 1 on the inactive BWP.

In an example, upon/in response to initiation of the Random Access procedure on a Serving Cell, if PRACH occasions are not configured for the active UL BWP, the MAC entity may switch the active UL BWP to BWP indicated by initialUplinkBWP and if the Serving Cell is a SpCell, the MAC entity may switch the active DL BWP to BWP indicated by initialDownlinkBWP. The MAC entity may perform the Random Access procedure on the active DL BWP of SpCell and active UL BWP of this Serving Cell.

In an example, upon/in response to initiation of the Random Access procedure on a Serving Cell, if PRACH occasions are configured for the active UL BWP, if the Serving Cell is a SpCell and if the active DL BWP does not have the same bwp-Id as the active UL BWP, the MAC entity may switch the active DL BWP to the DL BWP with the same bwp-Id as the active UL BWP. The MAC entity may perform the Random Access procedure on the active DL BWP of SpCell and active UL BWP of this Serving Cell.

In an example, if the MAC entity receives a PDCCH for BWP switching of a serving cell, if there is no ongoing Random Access procedure associated with this Serving Cell; or if the ongoing Random Access procedure associated with this Serving Cell is successfully completed upon reception of this PDCCH addressed to C-RNTI the MAC entity may perform BWP switching to a BWP indicated by the PDCCH.

In an example, if the MAC entity receives a PDCCH for BWP switching for a Serving Cell while a Random Access procedure associated with that Serving Cell is ongoing in the MAC entity, it may be up to UE implementation whether to switch BWP or ignore the PDCCH for BWP switching, except for the PDCCH reception for BWP switching addressed to the C-RNTI for successful Random Access procedure completion in which case the UE may perform BWP switching to a BWP indicated by the PDCCH. In an example, upon/in response to reception of the PDCCH for BWP switching other than successful contention resolution, if the MAC entity decides to perform BWP switching, the MAC entity may stop the ongoing Random Access procedure and may initiate a Random Access procedure on the new activated BWP; if the MAC decides to ignore the PDCCH for BWP switching, the MAC entity may continue with the ongoing Random Access procedure on the active BWP.

In an example, if the bwp-InactivityTimer is configured, if the defaultDownlinkBWP is configured, and the active DL BWP is not the BWP indicated by the defaultDownlinkBWP; or if the defaultDownlinkBWP is not configured, and the active DL BWP is not the initialDownlinkBWP, if a PDCCH addressed to C-RNTI or CS-RNTI indicating downlink assignment or uplink grant is received on the active BWP; or if a PDCCH addressed to C-RNTI or CS-RNTI indicating downlink assignment or uplink grant is received for the active BWP; or if a MAC PDU is transmitted in a configured uplink grant or received in a configured downlink assignment: if there is no ongoing random access procedure associated with this Serving Cell; or if the ongoing Random Access procedure associated with this Serving Cell is successfully completed upon reception of this PDCCH addressed to C-RNTI, the MAC entity may for each activated Serving Cell may start or restart the bwp-InactivityTimer associated with the active DL BWP.

In an example, if the bwp-InactivityTimer is configured, if the defaultDownlinkBWP is configured, and the active DL BWP is not the BWP indicated by the defaultDownlinkBWP; or if the defaultDownlinkBWP is not configured, and the active DL BWP is not the initialDownlinkBWP, if a PDCCH for BWP switching is received on the active DL BWP, and the MAC entity switches the active BWP, the MAC entity may for each activated Serving Cell may start or restart the bwp-InactivityTimer associated with the active DL BWP.

In an example, if the bwp-InactivityTimer is configured, if the defaultDownlinkBWP is configured, and the active DL BWP is not the BWP indicated by the defaultDownlinkBWP; or if the defaultDownlinkBWP is not configured, and the active DL BWP is not the initialDownlinkBWP, if Random Access procedure is initiated on this Serving Cell, the MAC entity may for each activated Serving Cell may stop the bwp-InactivityTimer associated with the active DL BWP of this Serving Cell, if running. In an example, if the Serving Cell is SCell, the MAC entity may stop the bwp-Inactivity Timer associated with the active DL BWP of SpCell, if running.

In an example, if the bwp-InactivityTimer is configured, if the defaultDownlinkBWP is configured, and the active DL BWP is not the BWP indicated by the defaultDownlinkBWP; or if the defaultDownlinkBWP is not configured, and the active DL BWP is not the initialDownlinkBWP, if the bwp-InactivityTimer associated with the active DL BWP expires, if the defaultDownlinkBWP is configured, the MAC entity may perform BWP switching to a BWP indicated by the defaultDownlinkBWP, otherwise the MAC entity may perform BWP switching to the initialDownlinkBWP.

In an example, a UE configured for operation in bandwidth parts (BWPs) of a serving cell, may be configured by higher layers for the serving cell a set of at most X (e.g., four) bandwidth parts (BWPs) for receptions by the UE (DL BWP set) in a DL bandwidth by a parameter (e.g., BWP-Downlink) and a set of at most Y (e.g., four) BWPs for transmissions by the UE (UL BWP set) in an UL bandwidth by a parameter (e.g., BWP-Uplink) for the serving cell.

An initial active DL BWP may be defined by a location and number of contiguous PRBs, a subcarrier spacing, and a cyclic prefix, for the control resource set for Type0-PDCCH common search space. For operation on the primary cell or on a secondary cell, a UE may be provided an initial active UL BWP by higher layer parameter initialuplinkBWP. If the UE is configured with a supplementary carrier, the UE may be provided an initial UL BWP on the supplementary carrier by higher layer parameter (e.g., initialUplinkBWP) in supplementaryUplink.

In an example, if a UE has dedicated BWP configuration, the UE may be provided by a higher layer parameter (e.g., firstActiveDownlinkBWP-Id) a first active DL BWP for receptions and by a higher layer parameter (e.g., firstActiveUplinkBWP-Id) a first active UL BWP for transmissions on the primary cell.

In an example, for each DL BWP or UL BWP in a set of DL BWPs or UL BWPs, respectively, the UE may be configured the following parameters for the serving cell: a subcarrier spacing provided by a higher layer parameter (e.g., subcarrierSpacing); a cyclic prefix provided by a higher layer parameter (e.g., cyclicPrefix); a first PRB and a number of contiguous PRBs indicated by a higher layer parameter (e.g., locationAndBandwidth) that is interpreted as RIV, setting $N_{BWP}^{size}=275$, and the first PRB is a PRB offset relative to the PRB indicated by higher layer parameters (e.g., offsetToCarrier and subcarrierSpacing); an index in the set of DL BWPs or UL BWPs by respective a higher layer parameter (e.g., bwp-Id); a set of BWP-common and a set of BWP-dedicated parameters by higher layer parameters (e.g., bwp-Common and bwp-Dedicated).

In an example, for unpaired spectrum operation, a DL BWP from the set of configured DL BWPs with index provided by higher layer parameter (e.g., bwp-Id) for the DL BWP is linked with an UL BWP from the set of configured UL BWPs with index provided by higher layer parameter (e.g., bwp-Id) for the UL BWP when the DL BWP index and the UL BWP index are equal. In an example, for unpaired spectrum operation, a UE may not expect to receive a configuration where the center frequency for a DL BWP is different than the center frequency for an UL BWP when the bwp-Id of the DL BWP is equal to the bwp-Id of the UL BWP.

In an example, for each DL BWP in a set of DL BWPs on the primary cell, a UE may be configured control resource sets for every type of common search space and for UE-specific search space. In an example, the UE may not expect to be configured without a common search space on the PCell, or on the PSCell, in the active DL BWP.

In an example, for each UL BWP in a set of UL BWPs, the UE may be configured resource sets for PUCCH transmissions.

In an example, a UE may receive PDCCH and PDSCH in a DL BWP according to a configured subcarrier spacing and CP length for the DL BWP. A UE may transmit PUCCH and PUSCH in an UL BWP according to a configured subcarrier spacing and CP length for the UL BWP.

In an example, if a bandwidth part indicator field is configured in DCI format 1_1, the bandwidth part indicator field value may indicate the active DL BWP, from the configured DL BWP set, for DL receptions. In an example, if a bandwidth part indicator field is configured in DCI format 01, the bandwidth part indicator field value may indicate the active UL BWP, from the configured UL BWP set, for UL transmissions.

If a bandwidth part indicator field is configured in DCI format 0_1 or DCI format 1_1 and indicates an UL BWP or a DL BWP different from the active UL BWP or DL BWP, respectively, for each information field in the received DCI format 0_1 or DCI format 1_1, in an example, if the size of the information field is smaller than the one required for the DCI format 0_1 or DCI format 1_1 interpretation for the UL BWP or DL BWP that is indicated by the bandwidth part indicator, respectively, the UE may prepend zeros to the information field until its size is the one required for the interpretation of the information field for the UL BWP or DL BWP prior to interpreting the DCI format 0_1 or DCI format 1_1 information fields, respectively. In an example, if the size of the information field is larger than the one required for the DCI format 0_1 or DCI format 1_1 interpretation for the UL BWP or DL BWP that is indicated by the bandwidth part indicator, respectively, the UE may use a number of least significant bits of DCI format 0_1 or DCI format 1_1 equal to the one required for the UL BWP or DL BWP indicated by bandwidth part indicator prior to interpreting the DCI format 0_1 or DCI format 1_1 information fields, respectively. In an example, the UE may set the active UL BWP or DL BWP to the UL BWP or DL BWP indicated by the bandwidth part indicator in the DCI format 0_1 or DCI format 1_1, respectively.

In an example, a UE may expect to detect a DCI format 0_1 indicating active UL BWP change, or a DCI format 1_1 indicating active DL BWP change, if a corresponding PDCCH is received within the first X (e.g., 3) symbols of a slot.

In an example, for the primary cell, a UE may be provided by a higher layer parameter (e.g., defaultDownlinkBWP-Id) a default DL BWP among the configured DL BWPs. In an example, if a UE is not provided a default DL BWP by higher layer parameter defaultDownlinkBWP-Id, the default DL BWP may be the initial active DL BWP.

In an example, if a UE is configured for a secondary cell with higher layer parameter defaultDownlinkBWP-Id indicating a default DL BWP among the configured DL BWPs and the UE is configured with higher layer parameter bwp-InactivityTimer indicating a timer value, the UE procedures on the secondary cell may be same as on the primary cell using the timer value for the secondary cell and the default DL BWP for the secondary cell.

In an example, if a UE is configured by higher layer parameter bwp-InactivityTimer a timer value for the primary cell and the timer is running, the UE may increment the timer every interval of 1 millisecond for frequency range 1 or every 0.5 milliseconds for frequency range 2 if the UE does not detect a DCI format for PDSCH reception on the primary cell for paired spectrum operation or if the UE does not detect a DCI format for PDSCH reception or a DCI format for PUSCH transmission on the primary cell for unpaired spectrum operation during the interval.

In an example, if a UE is configured by higher layer parameter BWP-InactivityTimer a timer value for a secondary cell and the timer is running, the UE may increment the timer every interval of 1 millisecond for frequency range 1 or every 0.5 milliseconds for frequency range 2 if the UE does not detect a DCI format for PDSCH reception on the secondary cell for paired spectrum operation or if the UE does not detect a DCI format for PDSCH reception or a DCI format for PUSCH transmission on the secondary cell for unpaired spectrum operation during the interval. In an example, the UE may deactivate the secondary cell when the timer expires.

In an example, if a UE is configured by higher layer parameter firstActiveDownlinkBWP-Id a first active DL BWP and by higher layer parameter firstActiveUplinkBWP-Id a first active UL BWP on a secondary cell or supplementary carrier, the UE uses the indicated DL BWP and the indicated UL BWP on the secondary cell as the respective first active DL BWP and first active UL BWP on the secondary cell or supplementary carrier.

In an example, for paired spectrum operation, a UE does not expect to transmit HARQ-ACK information on a PUCCH resource indicated by a DCI format 1_0 or a DCI format 1_1 if the UE changes its active UL BWP on the PCell between a time of a detection of the DCI format 1_0 or the DCI format 1_1 and a time of a corresponding HARQ-ACK information transmission on the PUCCH.

In an example, a UE may not expect to monitor PDCCH when the UE performs RRM over a bandwidth that is not within the active DL BWP for the UE.

In an example, a BWP IE may be used to configure a bandwidth part. In an example, for each serving cell the network may configure at least an initial bandwidth part comprising of at least a downlink bandwidth part and one (if the serving cell is configured with an uplink) or two (if using supplementary uplink (SUL)) uplink bandwidth parts. Furthermore, the network may configure additional uplink and downlink bandwidth parts for a serving cell.

In an example, the bandwidth part configuration may be split into uplink and downlink parameters and into common and dedicated parameters. Common parameters (in BWP-UplinkCommon and BWP-DownlinkCommon) may be "cell specific" and the network ensures the necessary alignment with corresponding parameters of other UEs. The common parameters of the initial bandwidth part of the PCell may be provided via system information. In an example, the network may provide the common parameters via dedicated signaling. Example BWP IE is shown below:

```
BWP ::=                               SEQUENCE {
    locationAndBandwidth              INTEGER
(0..37949),
        subcarrierSpacing             SubcarrierSpacing,
        cyclicPrefix                  ENUMERATED
{ extended }
        OPTIONAL -- Need R
}
BWP-Uplink ::=                        SEQUENCE {
    bwp-Id                            BWP-Id,
    bwp-Common                        BWP-
UplinkCommon
                                      OPTIONAL, -- Need M
    bwp-Dedicated                     BWP-
UplinkDedicated
                                      OPTIONAL, -- Need M
    ...
}
BWP-UplinkCommon ::=                  SEQUENCE {
    genericParameters                 BWP,
    rach-ConfigCommon                 SetupRelease
{ RACH-ConfigCommon }
    OPTIONAL, -- Need M
    pusch-ConfigCommon
SetupRelease { PUSCH-ConfigCommon }
                                      OPTIONAL, -- Need M
    pucch-ConfigCommon
SetupRelease { PUCCH-ConfigCommon }
                                      OPTIONAL, -- Need M
}
BWP-UplinkDedicated ::=               SEQUENCE {
    pucch-Config                      SetupRelease
{ PUCCH-Config }
    OPTIONAL, -- Need M
    pusch-Config                      SetupRelease
{ PUSCH-Config }
    OPTIONAL, -- Cond SetupOnly
        configured GrantConfig        SetupRelease
{ ConfiguredGrantConfig }
    OPTIONAL, -- Need M
        srs-Config
    SetupRelease { SRS-Config }
                                      OPTIONAL, -- Need M
        beamFailureRecoveryConfig     SetupRelease
{ BeamFailureRecoveryConfig }
    OPTIONAL, -- Cond SpCellOnly
}
BWP-Downlink ::=                      SEQUENCE {
    bwp-Id                            BWP-Id,
    bwp-Common                        BWP-
DownlinkCommon
                                      OPTIONAL, -- Need M
    bwp-Dedicated                     BWP-
DownlinkDedicated
        OPTIONAL, -- Need M
}
BWP-DownlinkCommon ::=                SEQUENCE {
    genericParameters                 BWP,
    pdcch-ConfigCommon
SetupRelease { PDCCH-ConfigCommon }
                                      OPTIONAL, -- Need M
    pdsch-ConfigCommon
SetupRelease { PDSCH-ConfigCommon }
                                      OPTIONAL, -- Need M
}
BWP-DownlinkDedicated ::=             SEQUENCE {
    pdcch-Config                      SetupRelease
{ PDCCH-Config }
    OPTIONAL, -- Need M
    pdsch-Config                      SetupRelease
{ PDSCH-Config }
    OPTIONAL, -- Need M
    sps-Config
    SetupRelease { SPS-Config }
                                      OPTIONAL, -- Need M
    radioLinkMonitoringConfig         SetupRelease
{ RadioLinkMonitoringConfig }
    OPTIONAL, -- Need M
}
```

In an example, cyclic prefix may indicate whether to use the extended cyclic prefix for this bandwidth part. If not set, the UE may use the normal cyclic prefix. Normal CP may be supported for all numerologies and slot formats. Extended CP may be supported only for 60 kHz subcarrier spacing. In an example, locationAndBanddwidth may indicate frequency domain location and bandwidth of this bandwidth part. The value of the field may be interpreted as resource indicator value (RIV). The first PRB may be a PRB determined by subcarrierSpacing of this BWP and offsetToCarrier (configured in SCS-SpecificCarrier contained within FrequencyInfoDL) corresponding to this subcarrier spacing. In case of TDD, a BWP-pair (UL BWP and DL BWP with the same bwp-Id) may have the same center frequency. In an example, subcarrierSpacing may indicate subcarrier spacing to be used in this BWP for all channels and reference signals unless explicitly configured elsewhere. In an example, the value kHz15 may corresponds to $\mu=0$, kHz30 to $\mu=1$, and so on. In an example, the values 15, 30, or 60 kHz may be used. In an example, bwp-Id may indicate an identifier for this bandwidth part. Other parts of the RRC configuration may use the BWP-Id to associate themselves with a particular bandwidth part. The BWP ID=0 may be associated with the initial BWP and may hence not be used here (in other bandwidth parts). The NW may trigger the UE to switch UL or DL BWP using a DCI field. The four code points in that DCI field may map to the RRC-configured BWP-ID as follows: For up to 3 configured BWPs (in addition to the initial BWP) the DCI code point may be equivalent to the BWP ID (initial=0, first dedicated=1, . . . ). If the NW configures 4 dedicated bandwidth parts, they may be identified by DCI code points 0 to 3. In this case it is not possible to switch to the initial BWP using the DCI field. In an example, bwp-Id may indicate an identifier for this bandwidth part. Other parts of the RRC configuration may use the BWP-Id to associate themselves with a particular bandwidth part. The BWP ID=0 may be associated with the initial BWP and may hence may not be used here (in other bandwidth parts). The NW may trigger the UE to switch UL or DL BWP using a DCI field. The four code points in that DCI field map to the RRC-configured BWP-ID as follows: For up to 3 configured BWPs (in addition to the initial BWP) the DCI code point may be equivalent to the BWP ID (initial=0, first dedicated=1, . . . ). If the NW configures 4 dedicated bandwidth parts, they may be identified by DCI code points 0 to 3. In this case it may not be possible to switch to the initial BWP using the DCI field. In an example, rach-ConfigCommon may indicate configuration of cell specific random access parameters which the UE may use for contention based and contention free random access as well as for contention based beam failure recovery. In an example, the NW may configure SSB-based RA (and hence RACH-ConfigCommon) only for UL BWPs if the linked DL BWPs allows the UE to acquire the SSB associated to the serving cell. In an example, PUCCH-config may indicate PUCCH configuration for one BWP of the regular UL or SUL of a serving cell. If the UE is configured with SUL, the network may configure PUCCH only on the BWPs of one of the uplinks (UL or SUL).

In an example, the network may configure PUCCH-Config for each SpCell. If supported by the UE, the network may configure at most one additional SCell of a cell group with PUCCH-Config (i.e. PUCCH SCell). In an example, the IE BWP-Id may be used to refer to Bandwidth Parts (BWP). The initial BWP is referred to by BWP-Id 0. The other BWPs are referred to by BWP-Id 1 to maxNrofBWPs. In an example, the ServingCellConfig IE may be used to configure (add or modify) the UE with a serving cell, which may be the SpCell or an SCell of an MCG or SCG. In an example, the parameters may be mostly UE specific but partly also cell specific (e.g. in additionally configured bandwidth parts). An example ServingCellConfig IE is shown below:

```
ServingCellConfig ::=                              SEQUENCE {
    tdd-UL-DL-ConfigurationDedicated TDD-UL-DL-ConfigDedicated
OPTIONAL, -- Cond TDD
    initialDownlinkBWP                             BWP-DownlinkDedicated
        OPTIONAL, -- Cond ServCellAdd
    downlinkBWP-ToReleaseList                      SEQUENCE
(SIZE (1..maxNrofBWPs)) OF BWP-Id
    OPTIONAL, -- Need N
    downlinkBWP-ToAddModList                       SEQUENCE
(SIZE (1..maxNrofBWPs)) OF BWP-Downlink
    OPTIONAL, -- Need N
    firstActiveDownlinkBWP-Id                      BWP-Id
        OPTIONAL, -- Cond SyncAndCellAdd
    bwp-InactivityTimer ENUMERATED { ms2, ms3, ms4, ms5, ms6,
ms8, ms10, ms20, ms30, ms40,ms50, ms60, ms80, ms100, ms200, ms300, ms500, ms750,
ms1280, ms1920, ms2560, spare10, spare9, spare8, spare7, spare6, spare5, spare4, spare3,
spare2, spare1 } OPTIONAL, -- Need R
    defaultDownlinkBWP-Id                          BWP-Id OPTIONAL, --
Need S
    uplinkConfig                                   UplinkConfig
        OPTIONAL, -- Cond ServCellAdd-UL
    supplementaryUplink                            UplinkConfig OPTIONAL, --
Cond ServCellAdd-SUL
    pdcch-ServingCellConfig                        SetupRelease { PDCCH-
ServingCellConfig } OPTIONAL, -- Need M
    pdsch-ServingCellConfig                        SetupRelease { PDSCH-
ServingCellConfig } OPTIONAL, -- Need M
    csi-MeasConfig                                 SetupRelease
{ CSI-MeasConfig } OPTIONAL, -- Need M
    sCellDeactivationTimer                         ENUMERATED { ms20, ms40,
ms80, ms160, ms200, ms240, ms320, ms400, ms480, ms520, ms640, ms720, ms840, ms1280,
spare2, spare1 } OPTIONAL, -- Cond ServingCellWithoutPUCCH
    crossCarrierSchedulingConfig                   CrossCarrierSchedulingConfig
OPTIONAL, -- Need M
    tag-Id                                         TAG-Id,
    ue-BeamLockFunction                            ENUMERATED
{enabled} OPTIONAL, -- Need R
    pathlossReferenceLinking                       ENUMERATED {pCell, sCell}
OPTIONAL, -- Cond SCellOnly
    servingCellMO                                  MeasObjectId
OPTIONAL, -- Cond MeasObject
}
UplinkConfig ::=                                   SEQUENCE {
    initialUplinkBWP                               BWP-UplinkDedicated
OPTIONAL, -- Cond ServCellAdd
    uplinkBWP-ToReleaseList                        SEQUENCE (SIZE
(1..maxNrofBWPs)) OF BWP-Id OPTIONAL, -- Need N
    uplinkBWP-ToAddModList SEQUENCE (SIZE (1..maxNrofBWPs))
OF BWP-Uplink                                      OPTIONAL, -- Need N
    firstActiveUplinkBWP-Id                        BWP-Id OPTIONAL, --
Cond SyncAndCellAdd
    pusch-ServingCellConfig                        SetupRelease { PUSCH-
ServingCellConfig } OPTIONAL, -- Need M
    carrierSwitching                               SetupRelease { SRS-CarrierSwitching
} OPTIONAL, -- Need M
}
```

In an example, the bwp_InactivityTimer may have a duration in ms after which the UE may fall back to the default Bandwidth Part. In an example, the value 0.5 ms may be applicable for carriers >6 GHz. In an example, when the network releases the timer configuration, the UE may stop the timer without switching to the default BWP.

In an example, defaultDownlinkBWP-Id may correspond to L1 parameter 'default-DL-BWP'. The initial bandwidth part may be referred to by BWP-Id=0. ID of the downlink bandwidth part to be used upon expiry. This field may be UE specific. When the field is absent the UE may use the initial BWP as default BWP.

In an example, downlinkBWP-ToAddModList may indicate list of additional downlink bandwidth parts to be added or modified.

In an example, downlinkBWP-ToReleaseList may indicate list of additional downlink bandwidth parts to be released.

In an example, firstActiveDownlinkBWP-Id if configured for an SpCell, may contain the ID of the DL BWP to be activated upon performing the reconfiguration in which it is received. If the field is absent, the RRC reconfiguration may not impose a BWP switch (corresponds to L1 parameter 'active-BWP-DL-Pcell'). If configured for an SCell, this field may contain the ID of the downlink bandwidth part to be used upon MAC-activation of an SCell. The initial bandwidth part may be referred to by BWP-Id=0.

In an example, initialDownlinkBWP may indicate a dedicated (UE-specific) configuration for the initial downlink bandwidth-part. In an example, firstActiveUplinkBWP-Id if configured for an SpCell, may contains the ID of the DL BWP to be activated upon performing the reconfiguration in which it is received. If the field is absent, the RRC reconfiguration may not impose a BWP switch (corresponds to L1 parameter 'active-BWP-UL-Pcell'). If configured for an SCell, this field may contain the ID of the uplink bandwidth part to be used upon MAC-activation of an SCell. The initial bandwidth part may be referred to by BandiwdthPartId=0. In an example, initialUplinkBWP may indicate a dedicated (UE-specific) configuration for the initial uplink bandwidth-part.

In an example, Semi-Persistent Scheduling (SPS) may be configured by RRC per Serving Cell and per BWP. Multiple configurations may be active simultaneously on different Serving Cells. Activation and deactivation of the DL SPS may be independent among the Serving Cells.

In an example, for the DL SPS, a DL assignment may be provided by PDCCH, and stored or cleared based on L1 signaling indicating SPS activation or deactivation.

In an example, RRC may configure the following parameters when SPS is configured: cs-RNTI: CS-RNTI for activation, deactivation, and retransmission; nrofHARQ-Processes: the number of configured HARQ processes for SPS; periodicity: Interval of SPS.

In an example, when SPS is released by upper layers, the corresponding configurations may be released.

In an example, after a downlink assignment is configured for SPS, the MAC entity may consider sequentially that the Nth downlink assignment occurs in the slot for which:

(numberOfSlotsPerFrame×SFN+slot number in the frame)=[(numberOfSlotsPerFrame×SFNstart time+slotstart time)+N×periodicity×numberOfSlotsPerFrame/10] modulo(1024×numberOfSlotsPerFrame)

where SFNstart time and slotstart time are the SFN and slot, respectively, of the first transmission of PDSCH where the configured downlink assignment was (re-) initialized.

In an example, there may be two types of transmission without dynamic grant: configured grant Type 1 where an uplink grant is provided by RRC, and stored as configured uplink grant; and configured grant Type 2 where an uplink grant is provided by PDCCH, and stored or cleared as configured uplink grant based on L1 signaling indicating configured uplink grant activation or deactivation.

In an example, Type 1 and Type 2 nay be configured by RRC per Serving Cell and per BWP. Multiple configurations may be active simultaneously on different Serving Cells. For Type 2, activation and deactivation may be independent among the Serving Cells. In an example, for the same Serving Cell, the MAC entity may be configured with either Type 1 or Type 2.

In an example, RRC may configure the following parameters when the configured grant Type 1 is configured:cs-RNTI: CS-RNTI for retransmission; periodicity: periodicity of the configured grant Type 1; timeDomainOffset: Offset of a resource with respect to SFN=0 in time domain; timeDomainAllocation: Allocation of configured uplink grant in time domain which contains startSymbolAndLength; nrofHlARQ-Processes: the number of HARQ processes.

In an example, RRC may configure the following parameters when the configured grant Type 2 is configured:cs-RNTI: CS-RNTI for both activation, deactivation, and retransmission; periodicity: periodicity of the configured grant Type 2; nrofHARQ-Processes: the number of HARQ processes.

In an example, upon/in response to configuration of a configured grant Type 1 for a Serving Cell by upper layers, the MAC entity may: store the uplink grant provided by upper layers as a configured uplink grant for the indicated Serving Cell; initialize or re-initialize the configured uplink grant to start in the symbol according to timeDomainOffset and S, and to reoccur with periodicity.

In an example, after an uplink grant is configured for a configured grant Type 1, the MAC entity may consider sequentially that the Nth uplink grant occurs associated with the symbol for which:

[(SFN×numberOfSlotsPerFrame×numberOfSymbolsPerSlot)+(slot number in the frame×numberOfSymbolsPerSlot)+symbol number in the slot]=(timeDomainOffset×numberOfSymbolsPerSlot+S+N×periodicity)modulo(1024×numberOfSlotsPerFrame×numberOfSymbolsPerSlot)

In an example, after an uplink grant is configured for a configured grant Type 2, the MAC entity may consider sequentially that the Nth uplink grant occurs associated with the symbol for which:

[(SFN×numberOfSlotsPerFrame×numberOfSymbolsPerSlot)+(slot number in the frame×numberOfSymbolsPerSlot)+symbol number in the slot]=[(SFNstart time×numberOfSlotsPerFrame×numberOfSymbolsPerSlot+slotstart time×numberOfSymbolsPerSlot+symbolstart time)+N×periodicity] modulo(1024× numberOfSlotsPerFrame× numberOfSymbolsPerSlot)

where SFNstart time, slotstart time, and symbolstart time are the SFN, slot, and symbol, respectively, of the first transmission of PUSCH where the configured uplink grant was re-initialized.

In example, when a configured uplink grant is released by upper layers, all the corresponding configurations may be released and all corresponding uplink grants may be cleared immediately.

In an example, if the configured uplink grant confirmation has been triggered and not cancelled and if the MAC entity has UL resources allocated for new transmission, the MAC entity may instruct the Multiplexing and Assembly procedure to generate an Configured Grant Confirmation MAC CE. The MAC entity may cancel the triggered configured uplink grant confirmation.

In an example, for a configured grant Type 2, the MAC entity may clear the configured uplink grant immediately after first transmission of Configured Grant Confirmation MAC CE triggered by the configured uplink grant deactivation.

In an example, retransmissions except for repetition of configured uplink grants may use uplink grants addressed to CS-RNTI.

In an example, if an uplink grant for a PDCCH occasion has been received for a Serving Cell on the PDCCH for the MAC entity's CS-RNTI, if the NDI in the received HARQ information is 1: the MAC entity may consider the NDI for the corresponding HARQ process not to have been toggled; the MAC entity may start or restart the configuredGrant-Timer for the corresponding HARQ process, if configured; and the MAC entity may deliver the uplink grant and the associated HARQ information to the HARQ entity.

In an example, if an uplink grant for a PDCCH occasion has been received for a Serving Cell on the PDCCH for the MAC entity's CS-RNTI, if the NDI in the received HARQ information is 0: if PDCCH contents indicate configured grant Type 2 deactivation: the MAC entity may trigger configured uplink grant confirmation.

In an example, if an uplink grant for a PDCCH occasion has been received for a Serving Cell on the PDCCH for the MAC entity's CS-RNTI, if the NDI in the received HARQ information is 0, if PDCCH contents indicate configured grant Type 2 activation: the MAC entity may trigger configured uplink grant confirmation; the MAC entity may store the uplink grant for this Serving Cell and the associated HARQ information as configured uplink grant; the MAC entity initialize or re-initialize the configured uplink grant for this Serving Cell to start in the associated PUSCH duration and to recur; the MAC entity may set the HARQ Process ID to the HARQ Process ID associated with this PUSCH duration; the MAC entity may consider the NDI bit for the corresponding HARQ process to have been toggled; the MAC entity may stop the configuredGrantTimer for the corresponding HARQ process, if running and the MAC entity may deliver the configured uplink grant and the associated HARQ information to the HARQ entity.

In an example, for a Serving Cell and a configured uplink grant, if configured and activated, if the PUSCH duration of the configured uplink grant does not overlap with the PUSCH duration of an uplink grant received on the PDCCH for this Serving Cell, the MAC entity may: set the HARQ Process ID to the HARQ Process ID associated with this PUSCH duration; and if the configuredGrantTimer for the corresponding HARQ process is not running, the MAC entity may consider the NDI bit for the corresponding HARQ process to have been toggled and the MAC entity may deliver the configured uplink grant and the associated HARQ information to the HARQ entity.

In an example, for configured uplink grants, the HARQ Process ID associated with the first symbol of a UL transmission may be derived from the following equation:

$$\text{HARQ Process ID} = [\text{floor}(\text{CURRENT\_symbol}/\text{periodicity})] \bmod \text{nrofHARQ-Processes}$$

where CURRENT_symbol=(SFN×numberOfSlotsPerFrame×numberOfSymbolsPerSlot+slot number in the frame×numberOfSymbolsPerSlot+symbol number in the slot), and numberOfSlotsPerFrame and numberOfSymbolsPerSlot refer to the number of consecutive slots per frame and the number of consecutive symbols per slot. In an example, CURRENT_symbol refers to the symbol index of the first transmission occasion of a repetition bundle that takes place. In an example, a HARQ process may be configured for a configured uplink grant if the configured uplink grant is activated and the associated HARQ process ID is less than nrofHARQ-Processes.

In an example, the Configured Grant Confirmation MAC CE may be identified by a MAC PDU subheader with a first LCID. In an example, the Configured Grant Confirmation MAC CE may have a fixed size of zero bits.

In an example, when PUSCH resource allocation is semi-statically configured by higher layer parameter ConfiguredGrantConfig in BWP information element, and the PUSCH transmission corresponding to the configured grant triggered, for Type 1 PUSCH transmissions with a configured grant, the following parameters may be given in ConfiguredGrantConfig: the higher layer parameter timeDomainAllocation value m may provide a row index m+1 pointing to an allocated table, indicating a combination of start symbol and length and PUSCH mapping type, where the table selection follows the rules for the UE specific search space; Frequency domain resource allocation may be determined by the higher layer parameter frequencyDomainAllocation for a given resource allocation type indicated by resourceAllocation; the IMCS may be provided by higher layer parameter mcsAndTBS; number of DM-RS CDM groups, DM-RS ports, SRS resource indication and DM-RS sequence initialization may be determined and the antenna port value, the bit value for DM-RS sequence initialization, precoding information and number of layers, SRS resource indicator may be provided by antennaPort, dmrs-SeqInitialization, precodingAndNumberOfLayers, and srs-ResourceIndicator respectively; and when frequency hopping is enabled, the frequency offset between two frequency hops may be configured by higher layer parameter frequencyHoppingOffset.

In an example, when PUSCH resource allocation is semi-statically configured by higher layer parameter ConfiguredGrantConfig in BWP information element, and the PUSCH transmission corresponding to the configured grant triggered, for Type 2 PUSCH transmissions with a configured grant: the resource allocation may follow the higher layer configuration and UL grant received on the DCI.

In an example, the UE may not transmit anything on the resources configured by ConfiguredGrantConfig if the higher layers did not deliver a transport block to transmit on the resources allocated for uplink transmission without grant. In an example, a set of allowed periodicities P may be defined.

In an example, the higher layer configured parameters repK and repK-RV may define the K repetitions to be applied to the transmitted transport block, and the redundancy version pattern to be applied to the repetitions. For the nth transmission occasion among K repetitions, n=1, 2, . . .

, K, it may be associated with (mod(n−1,4)+1)th value in the configured RV sequence. In an example, the initial transmission of a transport block may start at the first transmission occasion of the K repetitions if the configured RV sequence is {0, 2, 3, 1}. In an example, the initial transmission of a transport block may start at any of the transmission occasions of the K repetitions that are associated with RV=0 if the configured RV sequence is {0, 3, 0, 3}. In an example, the initial transmission of a transport block may start at any of the transmission occasions of the K repetitions if the configured RV sequence is {0, 0, 0, 0}, except the last transmission occasion when K=8.

In an example, for any RV sequence, the repetitions may be terminated after transmitting K repetitions, or at the last transmission occasion among the K repetitions within the period P, or when a UL grant for scheduling the same TB is received within the period P, whichever is reached first. In an example, the UE may not be expected to be configured with the time duration for the transmission of K repetitions larger than the time duration derived by the periodicity P.

In an example, for both Type 1 and Type 2 PUSCH transmissions with a configured grant, when the UE is configured with repK>1, the UE may repeat the TB across the repK consecutive slots applying the same symbol allocation in each slot. In an example, if the UE procedure for determining slot configuration determines symbols of a slot allocated for PUSCH as downlink symbols, the transmission on that slot may be omitted for multi-slot PUSCH transmission.

In an example, the IE ConfiguredGrantConfig may be used to configure uplink transmission without dynamic grant according to a number (e.g., two) possible schemes. In an example, the actual uplink grant may be configured via RRC (type 1) or may be provided via the PDCCH (addressed to CS-RNTI) (type2). An example, ConfiguredGrantConfig information element is shown below:

```
ConfiguredGrantConfig ::=                    SEQUENCE {
    frequency Hopping                        ENUMERATED {mode1, mode2}
OPTIONAL, -- Need S,
    cg-DMRS-Configuration                    DMRS-
UplinkConfig,
    mcs-Table                                ENUMERATED {qam256,
spare1} OPTIONAL, -- Need S
    mcs-TableTransformPrecoder               ENUMERATED {qam256,
spare1} OPTIONAL, -- Need S
    uci-OnPUSCH
    SetupRelease { CG-UCI-OnPUSCH },
    resourceAllocation
    ENUMERATED { resourceAllocationType0, resourceAllocationType1,
dynamicSwitch },
    rbg-Size                                 ENUMERATED
{config2} OPTIONAL, -- Need S
    powerControlLoopToUse
    ENUMERATED {n0, n1},
    p0-PUSCH-Alpha                           P0-
PUSCH-AlphaSetId,
    transformPrecoder                        ENUMERATED {enabled}
OPTIONAL, -- Need S
    nrofHARQ-Processes                       INTEGER(1..16),
    repK                                     ENUMERATED {n1, n2,
n4, n8},
    repK-RV                                  ENUMERATED {s1-0231, s2-0303, s3-0000}
OPTIONAL, -- Cond RepK
    periodicity                              ENUMERATED {
        sym2, sym7, symlx14, sym2x14, sym4x14, sym5x14, sym8x14,
sym10x14, sym16x14, sym20x14, sym32x14, sym40x14, sym64x14, sym80x14, sym128x14,
sym160x14, sym256x14, sym320x14, sym512x14, sym640x14, sym1024x14, sym1280x14,
sym2560x14, sym5120x14, sym6, symlx12, sym2x12, sym4x12, sym5x12, sym8x12,
sym10x12, sym16x12, sym20x12, sym32x12, sym40x12, sym64x12, sym80x12, sym128x12,
sym160x12, sym256x12, sym320x12, sym512x12, sym640x12, sym1280x12, sym2560x12
    },
    configuredGrantTimer                     INTEGER
(1..64) OPTIONAL, -- Need R
    rrc-ConfiguredUplinkGrant                SEQUENCE {
        timeDomainOffset
    INTEGER (0..5119),
        timeDomain Allocation
    INTEGER (0..15),
        frequency DomainAllocation           BIT
STRING (SIZE(18)),
        antennaPort                          INTEGER
(0..31),
        dmrs-SeqInitializationINTEGER (0..1) OPTIONAL, -- Cond
NoTransformPrecoder
        precodingAndNumberOfLayers           INTEGER (0..63),
        srs-ResourceIndicator                INTEGER (0..15),
        mcsAndTBS
    INTEGER (0..31),
        frequency HoppingOffset              INTEGER
(1.. maxNrofPhysicalResourceBlocks-1)        OPTIONAL, -- Need M
        pathlossReferenceIndex               INTEGER
(0..maxNrofPUSCH-PathlossReferenceRSs-1),
    }
                                             OPTIONAL -- Need R
```

```
}
CG-UCI-OnPUSCH ::= CHOICE {
    dynamic
    SEQUENCE (SIZE (1..4)) OF BetaOffsets,
        semiStatic
    BetaOffsets
}
```

In an example, the IE confguredGrantTimer may indicate an initial value of the configured grant timer in number of periodicities. In an example, nrofHARQ-Processes may indicate a number of HARQ processes configured. It may apply for both Type 1 and Type 2. In an example, Periodicity may indicate periodicity for UL transmission without UL grant for type 1 and type 2. In an example, periodicities may be supported depending on the configured subcarrier spacing [symbols]. In an example, if repetitions is used, repK-RV may indicate the redundancy version (RV) sequence to use. In an example, repK may indicate the number of repetitions. In an example, resourceAllocation may indicate configuration of resource allocation type 0 and resource allocation type 1. For Type 1 UL data transmission without grant, "resourceAllocation" may be resourceAllocationType0 or resourceAllocationType1. In an example, rrc-ConfiguredUplinkGrant indicates configuration for "configured grant" transmission with fully RRC-configured UL grant (Type1). If this field is absent the UE may use UL grant configured by DCI addressed to CS-RNTI (Type2). In an example, type 1 configured grant may be configured for UL or SUL, but not for both simultaneously. In an example, timeDomainAllocation may indicate a combination of start symbol and length and PUSCH mapping type. In an example, timeDomainOffset may indicate offset to SFN=0.

In an example, a logical channel may be configured with a configuredGrantType1Allowed IE. A value of true for this IE may indicate that the logical channel may be transmitted employing configured grant type 1 resources.

In an example, a Logical Channel Prioritization procedure may be applied whenever a new transmission is performed. RRC may control the scheduling of uplink data by signaling for each logical channel per MAC entity: priority where an increasing priority value may indicate a lower priority level; prioritisedBitRate which may set the Prioritized Bit Rate (PBR); bucketSizeDuration which may set the Bucket Size Duration (BSD).

In an example, RRC may additionally control the LCP procedure by configuring mapping restrictions for a logical channel: allowedSCS-List which may sets the allowed Subcarrier Spacing(s) for transmission; maxPUSCH-Duration which may set the maximum PUSCH duration allowed for transmission; configuredGrantType1Allowed which may set whether a configured grant Type 1 can be used for transmission; allowedServingCells which may set the allowed cell(s) for transmission.

In an example, a UE variable Bj may be used for the Logical channel prioritization procedure which is maintained for each logical channel j. In an example, the MAC entity may initialize Bj of the logical channel to zero when the logical channel is established.

In an example, for a logical channel j, the MAC entity may: increment Bj by the product PBR×T before every instance of the LCP procedure, where T is the time elapsed since Bj was last incremented. In an example, if the value of Bj is greater than the bucket size (i.e. PBR×BSD), the MAC entity may set Bj to the bucket size. In an example, the exact moment(s) when the UE updates Bj between LCP procedures may be up to UE implementation, as long as Bj is up to date at the time when a grant is processed by LCP.

In an example, when a new transmission is performed, the MAC entity may select the logical channels for each UL grant that satisfy all the following conditions: the set of allowed Subcarrier Spacing index values in allowedSCS-List, if configured, includes the Subcarrier Spacing index associated to the UL grant; and maxPUSCH-Duration, if configured, is larger than or equal to the PUSCH transmission duration associated to the UL grant; and configuredGrantType1 Allowed, if configured, is set to TRUE in case the UL grant is a Configured Grant Type 1; and allowedServingCells, if configured, includes the Cell information associated to the UL grant. In an example, the Subcarrier Spacing index, PUSCH transmission duration and Cell information are included in Uplink transmission information received from lower layers for the corresponding scheduled uplink transmission.

In an example, when a new transmission is performed, the MAC entity may allocate resources to the logical channels. The logical channels selected for the UL grant with Bj>0 may be allocated resources in a decreasing priority order. If the PBR of a logical channel is set to infinity, the MAC entity may allocate resources for all the data that is available for transmission on the logical channel before meeting the PBR of the lower priority logical channel(s). The MAC entity may decrement Bj by the total size of MAC SDUs served to logical channel j above. If any resources remain, the logical channels selected may be served in a strict decreasing priority order (regardless of the value of Bj) until either the data for that logical channel or the UL grant is exhausted, whichever comes first. In an example, logical channels configured with equal priority should be served equally. In an example, the value of Bj may be negative.

In an example, if the MAC entity is requested to simultaneously transmit multiple MAC PDUs, or if the MAC entity receives the multiple UL grants within one or more coinciding PDCCH occasions (e.g., on different Serving Cells), it may be up to UE implementation in which order the grants are processed.

In an example, the UE not segment an RLC SDU (or partially transmitted SDU or retransmitted RLC PDU) if the whole SDU (or partially transmitted SDU or retransmitted RLC PDU) fits into the remaining resources of the associated MAC entity.

In an example, if the UE segments an RLC SDU from the logical channel, it may maximize the size of the segment to fill the grant of the associated MAC entity as much as possible. In an example, the UE may maximize the transmission of data.

In an example, if the MAC entity is given a UL grant size that is equal to or larger than 8 bytes while having data available for transmission, the MAC entity may not transmit only padding BSR and/or padding.

In an example, the MAC entity may not generate a MAC PDU for the HARQ entity if the following conditions are satisfied: the MAC entity is configured with skipUplinkTx-Dynamic and the grant indicated to the HARQ entity was addressed to a C-RNTI, or the grant indicated to the HARQ entity is a configured uplink grant; and there is no aperiodic CSI requested for this PUSCH transmission as specified; and the MAC PDU includes zero MAC SDUs; and the MAC PDU includes the periodic BSR and there is no data available for any LCG, or the MAC PDU includes only the padding BSR.

In an example, the logical channels may be prioritized in accordance with the following order (e.g., highest priority listed first): C-RNTI MAC CE or data from UL-CCCH; Configured Grant Confirmation MAC CE; MAC CE for BSR, with exception of BSR included for padding; Single Entry PHR MAC CE or Multiple Entry PHR MAC CE; data from any Logical Channel, except data from UL-CCCH; MAC CE for Recommended bit rate query; MAC CE for BSR included for padding.

In an example, the MAC entity may multiplex MAC CEs and MAC SDUs in a MAC PDU.

In an example, the IE LogicalChannelConfig may be used to configure the logical channel parameters. An example LogicalChanelConfig information element is shown below:

configuredGrantType1Allowed, if present, may indicate UL MAC SDUs from this logical channel can be transmitted on a configured grant type 1. In an example, logicalChannelGroup may indicate ID of a logical channel group which the logical channel belongs. In an example, logicalChannelSR-Mask may indicate whether SR masking is configured for this logical channel. In an example, logicalChannelSR-DelayTimerApplied may indicate whether to apply the delay timer for SR transmission for this logical channel. In an example, maxPUSCH-Duration, if present, may indicate UL MAC SDUs from this logical channel may be transmitted using uplink grants that result in a PUSCH duration shorter than or equal to the duration indicated by this field. Otherwise, UL MAC SDUs from this logical channel may be transmitted using an uplink grant resulting in any PUSCH duration. In an example, priority may indicate logical channel priority. In an example, prioritisedBitRate may have a value in kiloBytes/s. In an example, 0 kBps may correspond to 0, 8 kBps may correspond to 8 kiloBytes/s, 16 kBps may correspond to 16 kiloBytes/s, and so on. In an example, for SRBs, the value may only be set to infinity.

In an example, the IE LogicalChannelIdentity may be used to identify one logical channel (LogicalChannelConfig)

```
LogicalChannelConfig ::=                SEQUENCE {
    ul-SpecificParameters               SEQUENCE {
        priority                        INTEGER (1..16),
        prioritisedBitRate
 ENUMERATED {kBps0, kBps8, kBps16, kBps32, kBps64, kBps128, kBps256,
kBps512, kBps1024, kBps2048, KBps4096, kBps8192, kBps16384, KBps32768,
kBps65536,
infinity },
        bucketSizeDuration              ENUMERATED {ms5, ms10,
ms20, ms50, ms100, ms150, ms300, ms500, ms1000, spare7, spare6, spare5, spare4,
spare3, spare2, spare1},
        allowedServingCells
    SEQUENCE (SIZE (1..maxNrofServingCells-1)) OF ServCellIndex
            OPTIONAL, -- Need R
        allowedSCS-List
    SEQUENCE (SIZE (1..maxSCSs)) OF SubcarrierSpacing
            OPTIONAL, -- Need R
        maxPUSCH-Duration
    ENUMERATED { ms0p02, ms0p04, ms0p0625, ms0p125, ms0p25, ms0p5,
spare2, spare1 }
                                        OPTIONAL, -- Need R
        configuredGrantType1 Allowed
    ENUMERATED {true} PTIONAL, -- Need R
        logicalChannelGroup             INTEGER (0..maxLCG-ID)
    OPTIONAL, -- Need R
        schedulingRequestID SchedulingRequestId OPTIONAL, --
Need R
        logicalChannelSR-Mask
    BOOLEAN,
        logical ChannelSR-Delay TimerApplied      BOOLEAN,
    }
                                        OPTIONAL, --
Cond UL
    }
```

In an example, allowedSCS-List, if present, may indicate UL MAC SDUs from this logical channel can only be mapped to the indicated numerology. Otherwise, UL MAC SDUs from this logical channel may be mapped to any configured numerology. In an example, allowedServingCells, if present, may indicate UL MAC SDUs from this logical channel may be mapped to the serving cells indicated in this list. Otherwise, UL MAC SDUs from this logical channel may be mapped to any configured serving cell of this cell group. In an example, bucketSizeDuration may have values in ms. For example, ms5 may indicate 5 ms, ms10 may indicate 10 ms and so on. In an example, and the corresponding RLC bearer (RLC-BearerConfig). In an example, configuration parameters of a logical channel may comprise a parameter indicating a channel access priority. The wireless device may determine channel access priority for LBT operation before transmission of a transport block based on the logical channel(s) and MAC CE(s) multiplexed in the transport block and their associated channel access priority.

Figure 17:
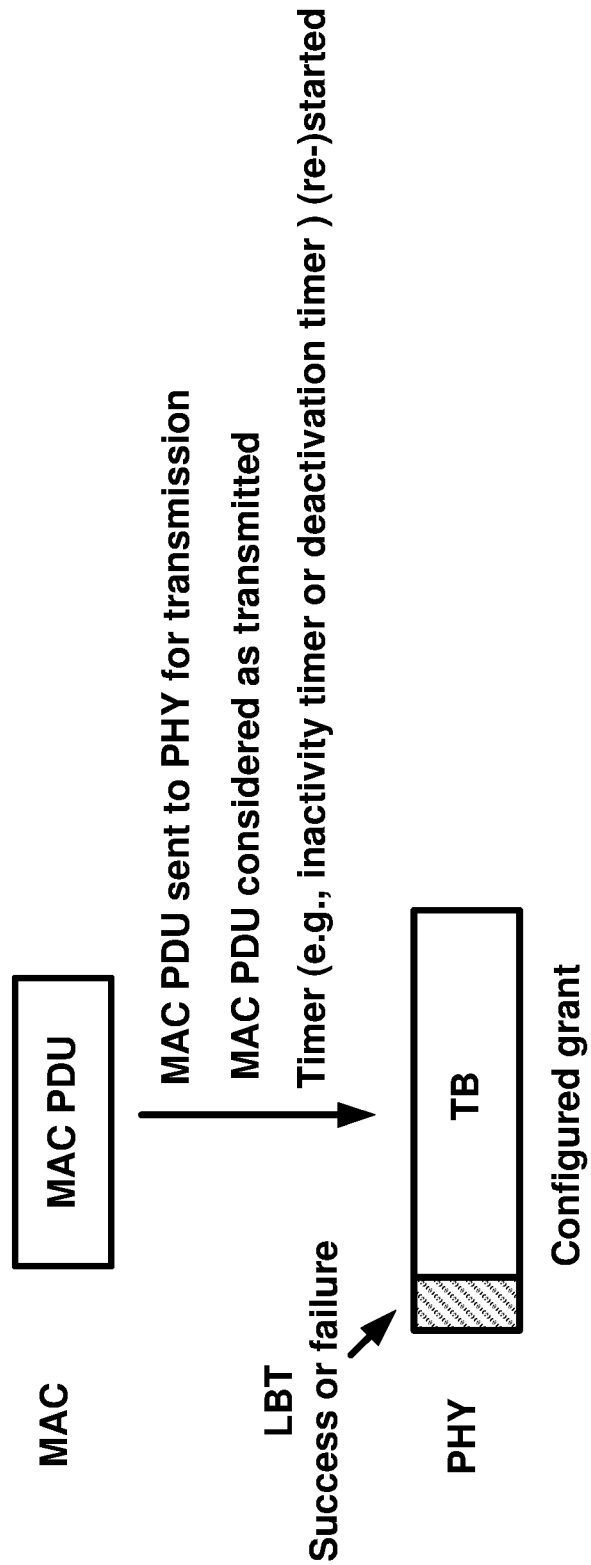
FIG. 17 is an example process as per an aspect of an embodiment of the present disclosure.

The legacy procedures for managing the inactivity timer of a bandwidth part of a cell comprise restarting the inactivity timer in response to transmitting a packet (e.g., MAC PDU/transport block) in a configured grant (e.g., transmission time interval/slot/mini-slot/configured grant occasion). For configured grants on unlicensed bandwidth parts (e.g., bandwidth parts of unlicensed cells) comprising resource elements/blocks in unlicensed frequency, a transmission of a packet is preceded by a listen-before-talk procedure at the physical layer. The packet may be transmitted if the listen before talk procedure indicates clear channel. The packet may not be transmitted by the physical layer if the listen before talk procedure indicates occupied/busy channel. An example of this procedure is shown in FIG. 17. From a MAC layer perspective, if a packet is created for a configured grant (e.g., if the configured grant is not skipped), and the packet is sent from the MAC layer to a physical layer for transmission, the packet is considered transmitted irrespective of whether: the listen before talk is successful and the packet is actually transmitted, or the listen before talk fails and the packet is not transmitted by the physical layer. The bandwidth part inactivity timer is therefore started by the wireless device if a packet (e.g., MAC PDU) is created by the MAC layer but is not transmitted by the physical layer due to a listen before talk failure. For proper scheduling and efficient network performance, the bandwidth part inactivity timer at the base station and the wireless device need to be synchronized. However, if the LBT at the wireless device fails in a configured grant, the inactivity timer at the base station is not restarted because the base station is not receiving a packet at a transmission time interval corresponding to the configured grant. The base station may assume that the wireless device has skipped the transmission (e.g., due to lack of data). The wireless device may start/restart the bandwidth part inactivity timer and the base station may not start/restart the bandwidth part inactivity timer. This causes the bandwidth part inactivity timer at the wireless device and the base station to not be synchronized. For example, the bandwidth inactivity timer at the base station may expire and the bandwidth part inactivity timer at the wireless device may be running. The base station may assume that the wireless device has switched to a default downlink bandwidth part while the wireless device has not switched the downlink bandwidth part. This causes scheduling problems and inefficiencies such as missing the downlink control information, e.g., comprising scheduling information, at the wireless device and degrades the network performance. For example, the base station may transmit a DCI via the default downlink bandwidth part and the wireless may miss the DCI because the wireless device has not switched to the default downlink bandwidth part. Example embodiments of the present disclosure enhance the bandwidth part inactivity timer management and can be used to alleviate these problems and inefficiencies as well as others. Example embodiments of the present disclosure enhance the bandwidth part switching processes.

In an example embodiment, a wireless device may receive one or more messages comprising configuration parameters. In an example, the one or more messages may comprise RRC messages. The one or more messages may comprise configuration parameters of a plurality of cells. In an example, the plurality of cells may comprise one or more unlicensed cells. In an example, the plurality of cells may comprise one or more licensed cells and one or more unlicensed cells. The configuration parameters may comprise first configuration parameters of a licensed cell. The configuration parameters may comprise second configuration parameters of an unlicensed cell. The licensed cell may comprise one or more first bandwidth parts. The unlicensed cell may comprise one or more second bandwidth parts.

In an example, the first configuration parameters may comprise/indicate first bandwidth part configuration parameters for a first plurality of bandwidth parts comprising a first bandwidth part of the licensed cell. The first configuration parameters may comprise/indicate a first value for a first inactivity timer of the first bandwidth part of the licensed cell. The first configuration parameters may comprise/indicate a first value for a first inactivity timer of a downlink bandwidth part corresponding to the first bandwidth part of the licensed cell. The first configuration parameters may comprise/indicate first configured grant/periodic resource allocation configuration parameters indicating a first plurality of configure grants for the first bandwidth part. The first occasions of the first plurality of configured grants may be based on a period and/or a pattern (e.g., indicated by RRC as a bitmap/pattern/period). In an example the first plurality of configured grants may be activated upon/in response to receiving the first configured grant/periodic resource allocation configuration parameters (e.g., upon/in response to RRC configuration). In an example the first plurality of configured grants may be activated upon/in response to receiving the first configured grant/periodic resource allocation configuration parameters and without further receiving an activation command. In an example, the first plurality of configured grants may be activated upon/in response to reception of a first activation command. In an example, the first activation command may be transmitted by physical layer signaling (e.g., PDCCH/EPDCCH). In an example, the downlink control signaling (e.g., PDCCH/EPDCCH) may be validated as an activation command. The validation may comprise comparing one or more fields in the downlink control signaling (e.g., activation command DCI) with predefined values. In an example, the validation may comprise the activation command DCI being associated with a first RNTI. In response to the validation being successful, the first plurality of configured grants may be activated. In an example, the first activation command may be a MAC command (e.g., transmitted via a MAC CE).

In an example, the second configuration parameters may comprise/indicate second bandwidth part configuration parameters of a second plurality of bandwidth parts comprising a second bandwidth part of the unlicensed cell. The second configuration parameters may comprise/indicate a second value for a second inactivity timer of the second bandwidth part of the unlicensed cell. The second configuration parameters may comprise/indicate a second value for a second inactivity timer of a downlink bandwidth part corresponding to the second bandwidth part of the unlicensed cell. The second configuration parameters may comprise/indicate second configured grant/periodic resource allocation/autonomous uplink configuration parameters indicating a second plurality of configured grants for the second bandwidth part. The second occasions of the second plurality of configured grants may be based on a period and/or a pattern (e.g., indicated by RRC e.g., as a bitmap/pattern/period). In an example the second plurality of configured grants may be activated upon/in response to receiving the second configured grant/periodic resource allocation configuration/autonomous uplink parameters. In an example the second plurality of configured grants may be activated upon/in response to receiving the second configured grant/periodic resource allocation configuration/autonomous uplink parameters and without further receiving an activation command. In an example, the second plurality of configured grants may be activated upon/in response to reception of a second activation command. In an example, the second activation command may be transmitted by physical layer signaling (e.g., PDCCH/EPDCCH). In an example, the downlink control signaling (e.g., PDCCH/EPDCCH) may be validated as an activation command. The validation may comprise comparing one or more fields in the downlink control signaling (e.g., activation command DCI) with pre-defined values. In an example, the validation may comprise the activation command DCI being associated with a second RNTI. In response to the validation being successful, the first plurality of configured grants may be activated. In an example, the second activation command may be a MAC command (e.g., transmitted via a MAC CE).

Figure 18:
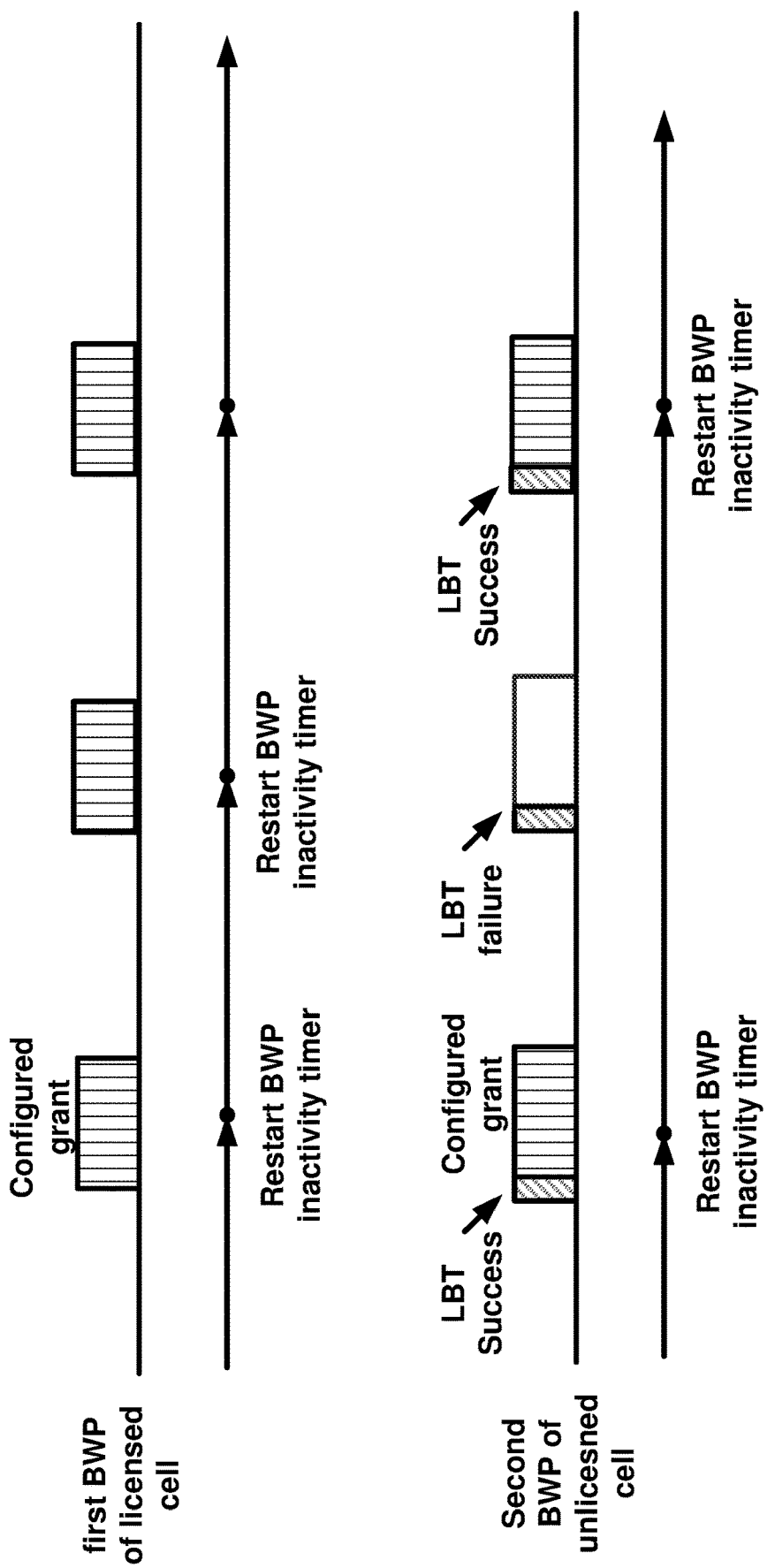
FIG. 18 is an example process as per an aspect of an embodiment of the present disclosure.

In an example, the wireless device may create a first packet (e.g., a first MAC PDU/transport block) for transmission based on a first configured grant of the first plurality of configured grants on the first bandwidth part of the licensed cell. In an example, the creating the first packet may comprise multiplexing one or more logical channels and/or MAC CEs to create a MAC PDU. The multiplexing may be based on a logical channel prioritization procedure. In an example the one or more logical channels multiplexed in the first packet may be based on a numerology associated with radio resources corresponding to the first configured grant. In an example, the numerology associated with radio resources corresponding to the first configured grant may be the numerology of the first bandwidth part. In an example, one or more parameters to create the first packet may be indicated in the first configured grant/periodic resource allocation configuration parameters. In an example, one or more parameters to create the first packet may be indicated in the first activation command (e.g., PDCCH activation). In an example, the one or more parameters may comprise resource allocation parameters (e.g., time/frequency resources) and/or transmission time interval/transmission duration/bandwidth part/numerology and/or power control parameters and/or HARQ related parameters (e.g., HARQ ID, NDI, RV, etc.), etc. In an example, the wireless device may determine a HARQ ID corresponding to the first packet based on the radio resources used for transmission of the first packet. In an example, the wireless device may transmit the first packet employing the resources corresponding to the first configured grant. An example is shown in FIG. 18. In an example, the wireless device may start the first inactivity timer of the first bandwidth part of the licensed cell in response to creating the first packet. In an example, the wireless device may start the first inactivity timer of a downlink bandwidth part corresponding to the first bandwidth part of the licensed cell in response to creating the first packet. In an example, the wireless device may start the first inactivity timer of the first bandwidth part of the licensed cell in response to transmitting the first packet. In an example, the wireless device may start the first inactivity timer of the downlink bandwidth part corresponding to the first bandwidth part of the licensed cell in response to transmitting the first packet. In an example, MAC layer may consider a packet as transmitted upon creation of the packet and sending the packet to the physical layer for transmission. Irrespective of successful or unsuccessful transmission of the packet at the physical layer, the MAC layer of the wireless device may consider the packet as transmitted and may start the first inactivity timer. In an example, the base station may transmit a retransmission grant for retransmission of the second packet if the second packet is not received correctly. The wireless device may retransmit the second packet with an appropriate redundancy version (e.g., as indicated in the retransmission grant). The wireless device may store the second packet and different redundancy versions of the second packet in one or more HARQ buffers associated with the HARQ ID of the second packet.

In an example, the wireless device may create a second packet (e.g., a second MAC PDU/transport block) for transmission based on a second configured grant of the second plurality of configured grants on the second bandwidth part of the unlicensed cell. In an example, the creating the second packet may comprise multiplexing one or more logical channels and/or MAC CEs to create a MAC PDU. The multiplexing may be based on a logical channel prioritization procedure. In an example the one or more logical channels multiplexed in the first packet may be based on a numerology associated with radio resources corresponding to the second configured grant. In an example, the numerology associated with radio resources corresponding to the second configured grant may be the numerology of the second bandwidth part. In an example, one or more parameters to create the second packet may be indicated in the second configured grant/periodic resource allocation/autonomous uplink configuration parameters. In an example, one or more parameters to create the second packet may be indicated in the second activation command (e.g., PDCCH activation). In an example, the one or more parameters may comprise resource allocation parameters and/or transmission time interval/transmission duration/bandwidth part/numerology and/or power control parameters and/or HARQ related parameters (e.g., HARQ ID, NDI, RV, etc.), etc. In an example, the wireless device may determine a HARQ ID corresponding to the second packet based on the radio resources used for transmission of the second packet.

An example embodiment is shown in FIG. 18. In an example, the wireless device may perform a listen before talk procedure before/for transmission of the second packet. The wireless device may start the second inactivity timer of the second bandwidth part of the unlicensed cell in response to the listen before talk procedure indicating a clear channel. The wireless device may start the second inactivity timer of the downlink bandwidth part corresponding to the second bandwidth part of the unlicensed cell in response to the listen before talk procedure indicating a clear channel. In an example, the wireless device may not start the second inactivity timer in response to the listen before talk procedure indicating an occupied/busy channel. The wireless device may let the second inactivity timer continue running without restarting the second inactivity timer in response to the listen before talk procedure indicating an occupied/busy channel.

An example embodiment is shown in FIG. 18. In an example, the wireless device may perform a listen before talk procedure before/for transmission of the second packet. The wireless device may determine to start the second inactivity timer of the second bandwidth part of the unlicensed cell in response to the listen before talk procedure indicating clear channel. The wireless device may determine to start the second inactivity timer of a downlink bandwidth part corresponding to the second bandwidth part of the unlicensed cell in response to the listen before talk procedure indicating clear channel. The wireless device may start the second inactivity timer based on the determining. In an example, the wireless device may determine not to start/restart the second inactivity timer of the second bandwidth part in response to the listen before talk procedure indicating an occupied/busy channel. The wireless device may determine not to start/restart the second inactivity timer of the downlink bandwidth part corresponding to the second bandwidth part in response to the listen before talk procedure indicating an occupied/busy channel. The wireless device may not start/restart the second inactivity timer of the second bandwidth part in response to the determining.

An example embodiment is shown in FIG. 18. In an example, the wireless device may perform a listen before talk procedure before/for transmission of the second packet. The wireless device may start the second inactivity timer of the second bandwidth part of the unlicensed cell in response to the listen before procedure indicating a clear channel, otherwise (e.g., in response to the listen before talk procedure indicating a busy/occupied channel) the wireless device may not start the second inactivity timer of the second bandwidth part of the unlicensed cell. The wireless device may start the second inactivity timer of a downlink bandwidth part corresponding to the second bandwidth part of the second cell in response to the listen before procedure indicating a clear channel, otherwise (e.g., in response to the listen before talk procedure indicating a busy/occupied channel) the wireless device may not start the second inactivity timer of the downlink bandwidth part corresponding to the second bandwidth part of the unlicensed cell.

Figure 19:
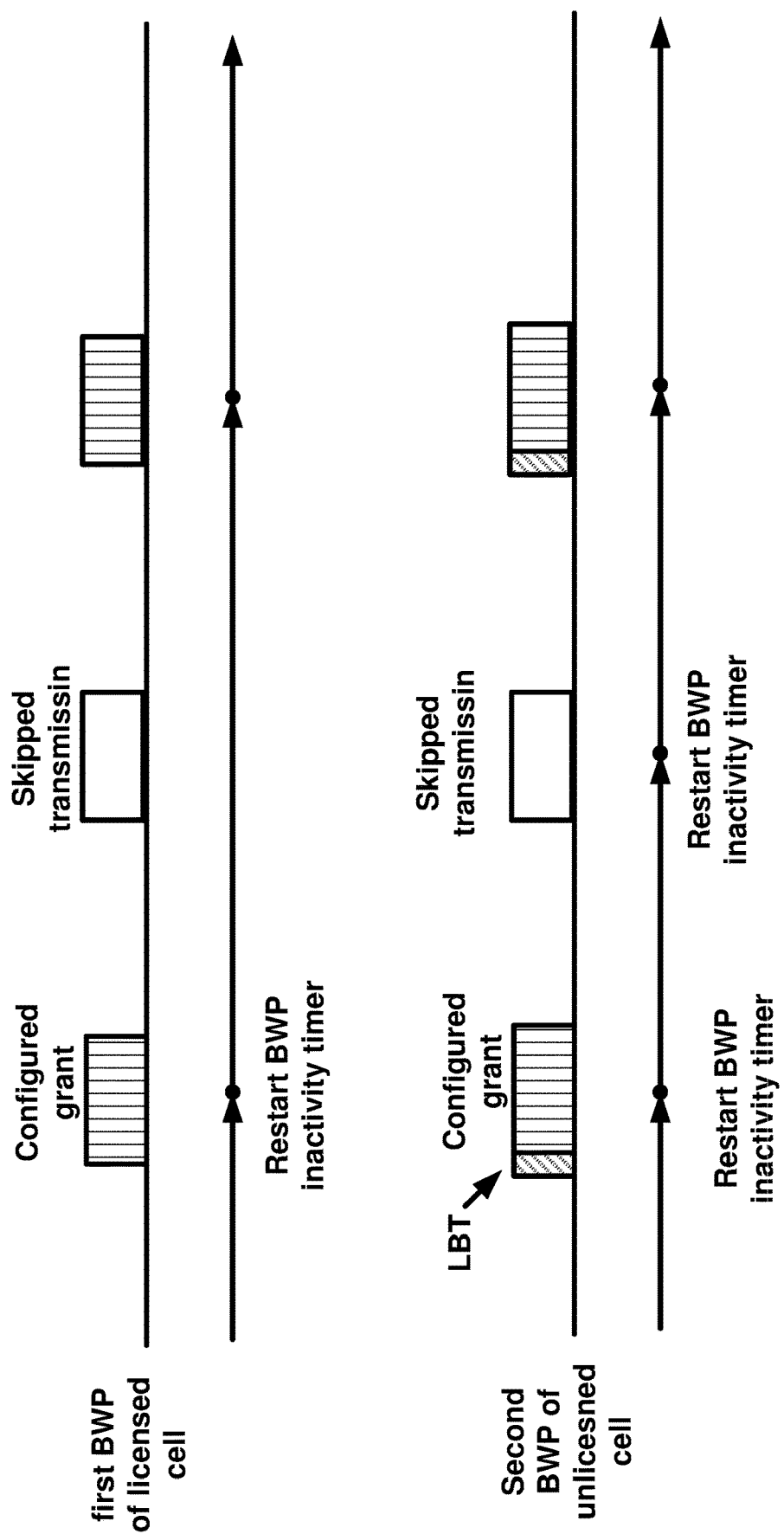
FIG. 19 is an example procedure as per an aspect of an embodiment of the present disclosure.

An example embodiment is shown in FIG. 19. In an example, the wireless device may start the first inactivity timer of the first bandwidth part of the licensed cell in a first transmission time interval/symbol time/slot time/subframe/ time instance associated with a first configured grant of the first plurality of configured grants in response to creating/ transmitting a first packet based on the first configured grant. In an example embodiment, the wireless device may start the first inactivity timer of the downlink bandwidth part corresponding to the first bandwidth part of the licensed cell in a first transmission time interval/symbol time/slot time/subframe/time instance associated with a first configured grant of the first plurality of configured grants in response to creating/transmitting a first packet based on the first configured grant.

An example embodiment is shown in FIG. 19. In an example, the wireless device may start the second inactivity timer of the second bandwidth part of the unlicensed cell in a second transmission time interval/symbol time/slot time/ subframe/time instance associated with a second configured grant of the second plurality of configured grants irrespective of creating/transmitting or skipping (e.g., not creating/ transmitting) a second packet based on the second configured grant. In an example embodiment, the wireless device may start the second inactivity timer of a downlink bandwidth part corresponding to the second bandwidth part of the unlicensed cell in a second transmission time interval/ symbol time/slot time/subframe/time instance associated with a second configured grant of the second plurality of configured grants irrespective of creating/transmitting or skipping (e.g., not creating/transmitting) a second packet based on the second configured grant.

Figure 20:
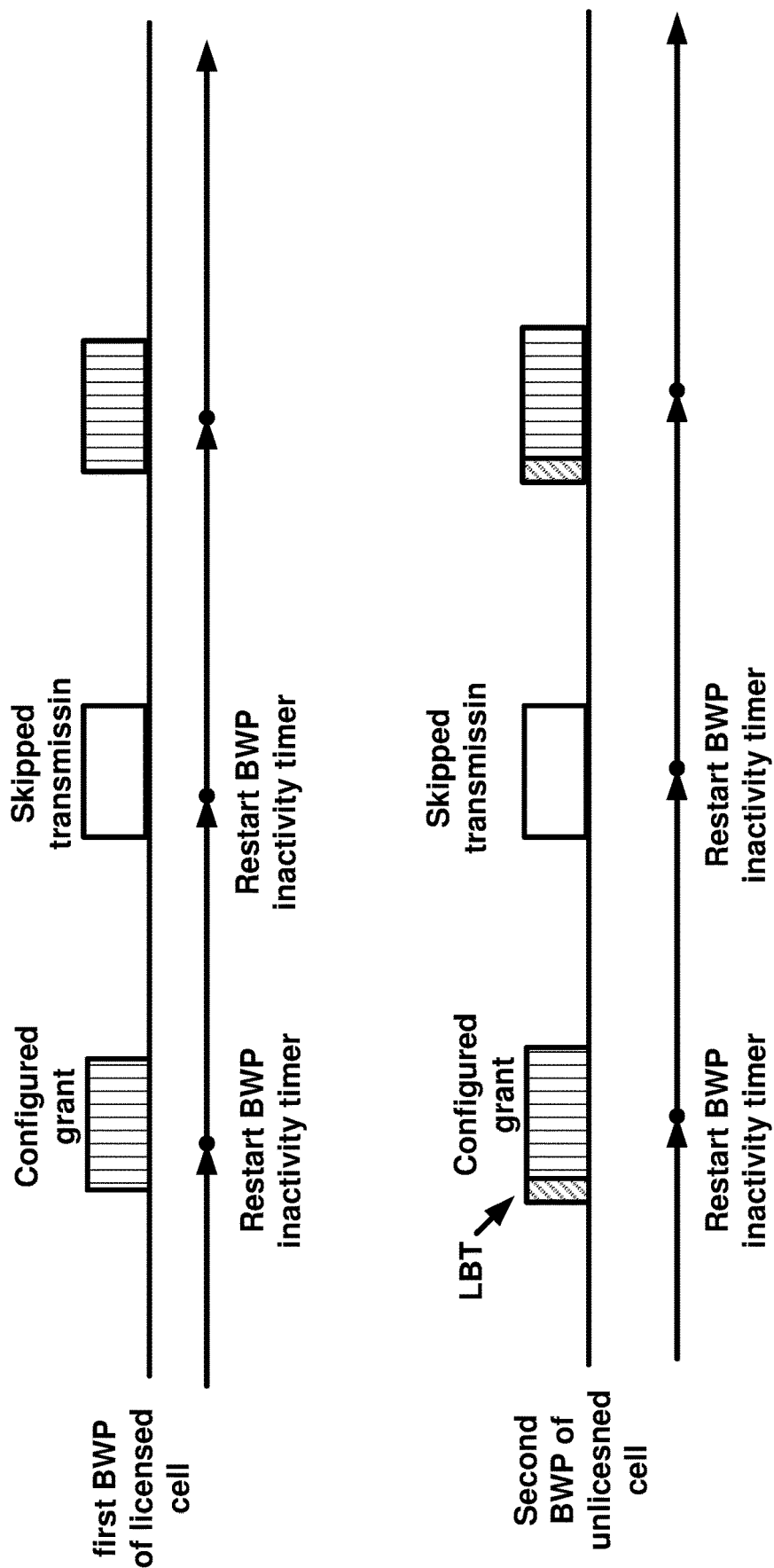
FIG. 20 is an example procedure as per an aspect of an embodiment of the present disclosure.

An example embodiment is shown in FIG. 20. In an example, the wireless device may start the first inactivity timer of the first bandwidth part of the licensed cell in a first transmission time interval/symbol time/slot time/time instance associated with a first configured grant of the first plurality of configured grants irrespective of creating/transmitting or skipping (e.g., not creating/transmitting) the first packet based on the first configured grant. In an example embodiment, the wireless device may start the first inactivity timer of a downlink bandwidth part corresponding to the first bandwidth part of the licensed cell in a first transmission time interval/symbol time/slot time/time instance associated with a first configured grant of the first plurality of configured grants irrespective of creating/transmitting or skipping (e.g., not creating/transmitting) the first packet based on the first configured grant. In an example, the wireless device may start the second inactivity timer of the second bandwidth part of the unlicensed cell in a second transmission time interval/symbol time/slot time/subframe/time instance associated with a second configured grant of the second plurality of configured grants irrespective of creating/transmitting or skipping (e.g., not creating/transmitting) a second packet based on the second configured grant. In an example embodiment, the wireless device may start the second inactivity timer of a downlink bandwidth part corresponding to the second bandwidth part of the unlicensed cell in a second transmission time interval/symbol time/slot time/subframe/ time instance associated with a second configured grant of the second plurality of configured grants irrespective of creating/transmitting or skipping (e.g., not creating/transmitting) a second packet based on the second configured grant.

In an example embodiment, the configuration parameters of a cell may indicate bandwidth part configuration parameters of a plurality of bandwidth parts of the cell. The plurality of bandwidth parts may comprise a first bandwidth part and a second bandwidth part. In an example, the second bandwidth part may be a default bandwidth and/or a first active bandwidth part and/or an initial bandwidth part. In an example, the second bandwidth part may be a downlink bandwidth part. The first bandwidth part may be the current active bandwidth part. In an example, the cell may be an unlicensed cell. In an example, the first bandwidth part may comprise resource elements in unlicensed frequencies. In an example, the wireless device may receive a plurality of grants for transmission of a plurality of transport blocks via the first bandwidth part. In an example, a grant in the plurality of grants may indicate transmission of one or more transport blocks. The transmission parameters of the one or more transport blocks may be indicated in the grant and/or RRC configuration parameters (e.g., in configured grant configuration parameters, e.g., if the grant is a configured grant). The transmission parameters of the one or more transport blocks may comprise radio resource allocation parameters (e.g., time and frequency resources e.g., resource blocks), HARQ related parameters (HARQ ID, NDI, RV, etc.), power control parameters/commands, etc. In an example, a grant in the plurality of grants may be a dynamic grant. The wireless device may receive a scheduling DCI and the DCI may indicate the dynamic grant. In an example, a grant in the plurality of grants may be configured grant. In an example, the configured grant may be activated upon reception of RRC configurations of the configured grant. In an example, the configured grant may be activated upon reception of RRC configurations and an activation command (e.g., PDCCH activation). In an example, the plurality of grants may be configured grants and/or correspond to a periodic resource allocation and/or autonomous uplink transmission. In an example, a first grant in the plurality of grants may be a dynamic grant and a second grant in the plurality of grants may be a configured grant and/or correspond to a periodic resource allocation and/or autonomous uplink transmission.

Figure 21:
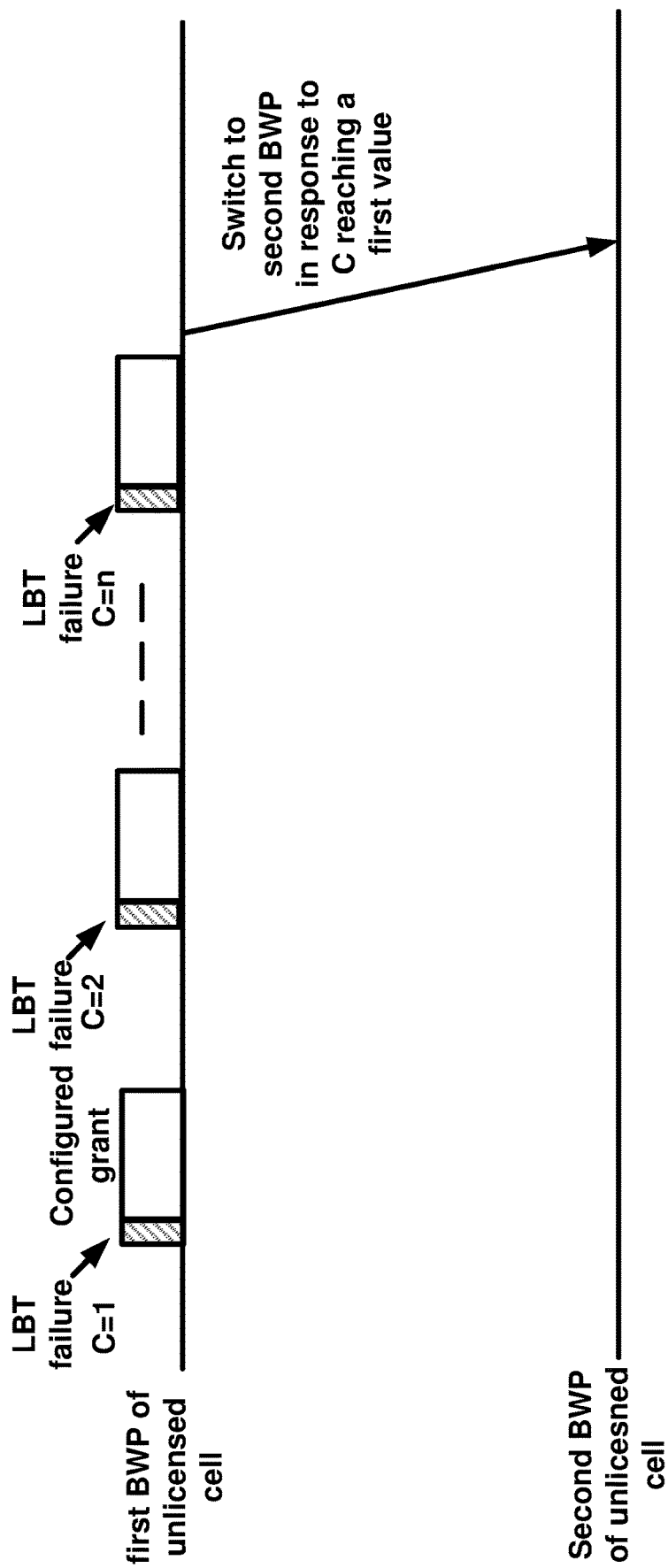
FIG. 21 is an example procedure as per an aspect of an embodiment of the present disclosure.

An example embodiment is shown in FIG. 21. In an example, the wireless device may perform a listen before talk procedure for/before transmission of a transport block corresponding to a grant in the plurality of grants. In an example, the wireless device may increment a counter in response to a listen before talk corresponding to the grant (e.g., performed before transmission of one or more transport blocks corresponding to the grant) in the plurality of grants failing/being unsuccessful. The wireless device may switch from the first bandwidth part to the second bandwidth part in response to the counter reaching a first value. In an example, the wireless device may switch a downlink bandwidth part associated with the first bandwidth part to a second bandwidth (or second downlink bandwidth part associated with the second bandwidth part) in response to the counter reaching a first value. In an example, the first value may be a pre-configured value. In an example, the one or more messages (e.g., RRC configuration parameters) may comprise/indicate configuration parameters of the counter, the configuration parameters of the counter indicating the first value. In an example, the one or more messages may comprise a plurality of values. A DCI (e.g., a value of a field in the DCI, e.g., an activation DCI for configured grants or scheduling DCI for dynamic grants) may indicate the first value as one of the plurality of values.

In an example, the counter may correspond to the first bandwidth part. In an example, each bandwidth part of a plurality of bandwidth part of an unlicensed cell may have a corresponding counter. In an example, the first value may be cell-specific, e.g., common among UEs configured with the same cell, and/or UE-specific. In an example, the first value may be configured for the UE and cells configured for the UE may use a common first value. In an example, the first value may be configured independently for cells configured for the UE (e.g., different cells with independent configured first values). In an example, the first value may be bandwidth part-specific, e.g., the first value may be configured independently for different bandwidth parts of a cell. In an example, the first value may be pre-configured.

In an example, the counter may be reset (e.g., to a second value, e.g., zero), in response to a second listen before talk procedure corresponding to a second grant in the plurality of grants indicating a clear channel. In an example, the counter value may remain unchanged (e.g., the counter may not be incremented) in response to a second listen before talk procedure corresponding to a second grant in the plurality of grants indicating a clear channel.

Figure 22:
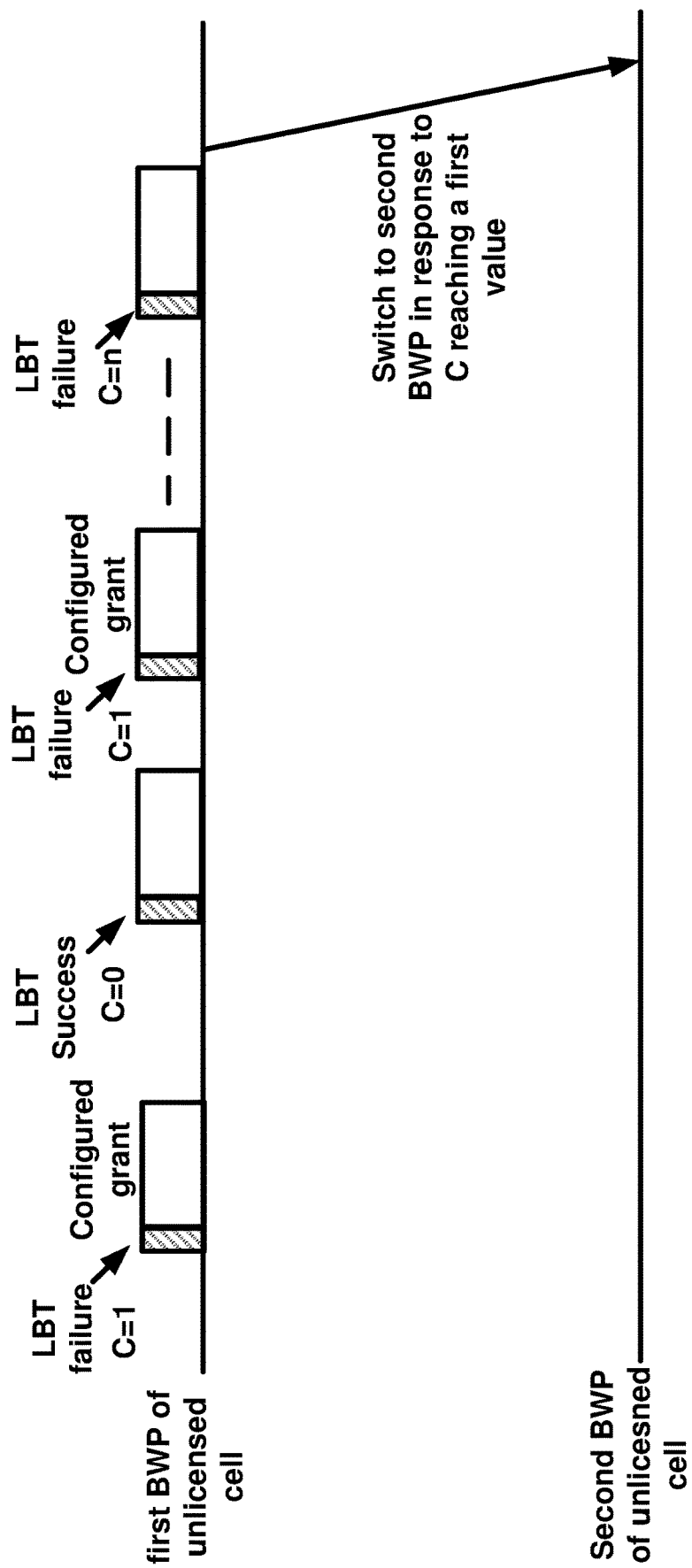
FIG. 22 is an example procedure as per an aspect of an embodiment of the present disclosure.
Figure 23:
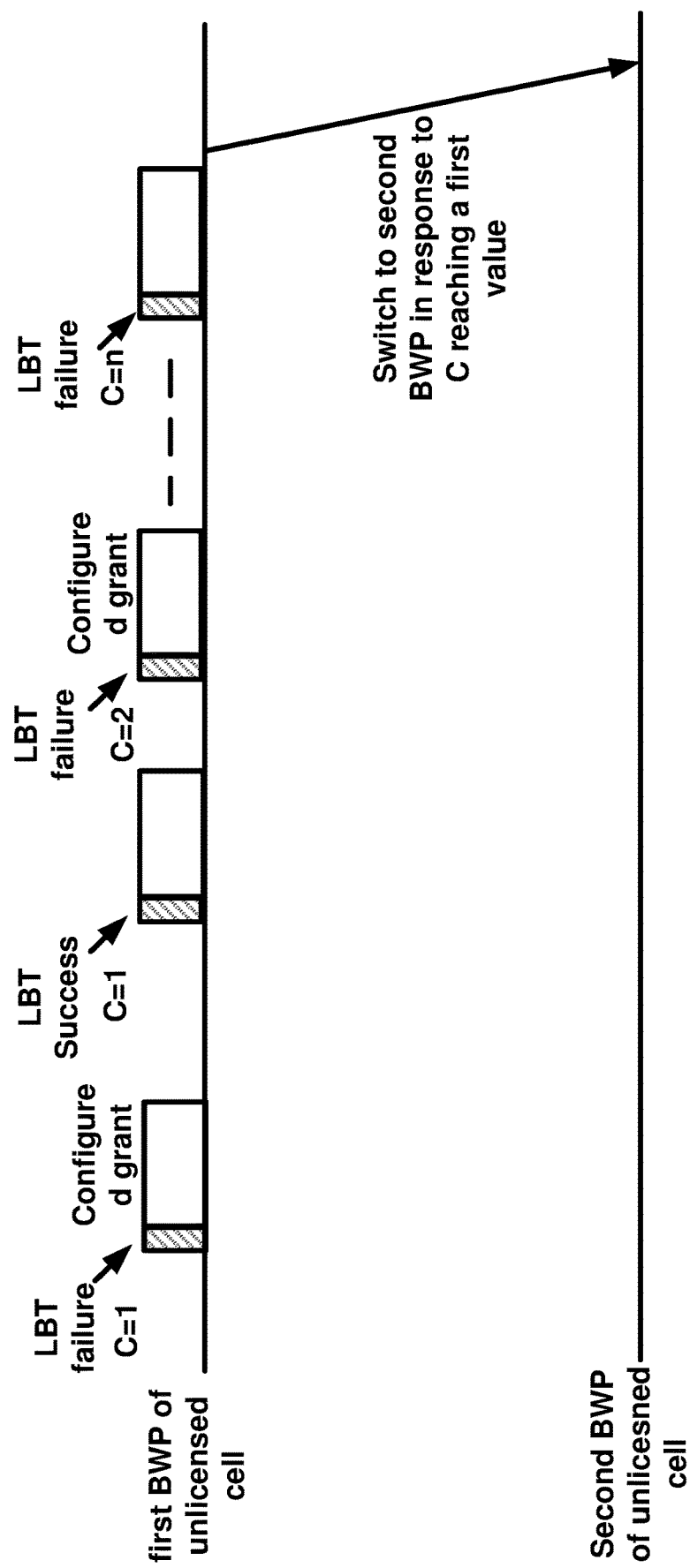
FIG. 23 is an example procedure as per an aspect of an embodiment of the present disclosure.

In an example as shown in FIG. 22, in response to the counter reaching the first value and switching from the first bandwidth part to the second bandwidth part, the wireless device may transmit uplink signals (e.g., CSI, SRS, etc.) to the base station using second bandwidth part. In an example as shown in FIG. 23, in response to the counter reaching the first value and switching from the first bandwidth part to the second bandwidth part, the wireless device may resume any suspended configured grant on the second bandwidth part. The wireless device may transmit one or more packets based on the resumed configured grants.

The legacy procedures for managing the deactivation timer of a secondary cell comprise restarting the deactivation timer in response to transmitting a packet (e.g., MAC PDU/transport block) in a configured grant (e.g., transmission time interval/slot/mini-slot/configured grant occasion). For configured grants on unlicensed secondary cells, a transmission of a packet is preceded by listen-before-talk procedure at the physical layer. The packet may be transmitted by the physical layer if the listen before talk procedure indicates clear channel. The packet may not be transmitted by the physical layer if the listen before talk procedure indicates occupied/busy channel. An example is shown in FIG. 17. From a MAC layer perspective, if a packet is created for a configured grant (e.g., if the configured grant is not skipped), and the packet is sent from MAC layer to physical layer for transmission, the packet is considered transmitted irrespective of whether the listen before talk is successful and the packet is actually transmitted or the listen before talk fails and the packet is not transmitted by the physical layer. The SCell deactivation timer is therefore started by the wireless device if a packet (e.g., MAC PDU) is created by the MAC layer but is not transmitted by the physical layer due to listen before talk failure. For proper scheduling and efficient network performance, the SCell deactivation timer at the base station and the wireless device need to be synchronized. However, if the LBT at the wireless device fails in a configured grant, the SCell deactivation timer at the base station is not restarted because the base station is not receiving a packet at a transmission time interval corresponding to the configured grant. The base station may assume that the wireless device has skipped the transmission (e.g., due to lack of data). The wireless device may start/restart the SCell deactivation timer and the base station may not start/restart the SCell deactivation timer. This causes the SCell deactivation timer at the wireless device and the base station not being synchronized. For example, the SCell deactivation timer at the base station may expire and the SCell deactivation timer at the wireless device may be running. The base station may assume that the SCell is deactivated while the wireless device assumes that the SCell is still active. This causes problems and inefficiencies. For example, the wireless device may monitor the control channels on the SCell while the base station does not transmit downlink control signaling on the SCell because the SCell is deactivated from the base station perspective. In an example, the wireless device may transmit uplink signals (such as CSI, SRS) or transmit at configured grants on the SCell. However, from the base station perspective the SCell is deactivated and these uplink signals or packets cannot be detected. Example embodiments enhance the SCell deactivation timer management.

In an example embodiment, a wireless device may receive one or more messages comprising configuration parameters. In an example, the one or more messages may comprise RRC messages. The one or more messages may comprise configuration parameters of a plurality of cells. In an example, the plurality of cells may comprise one or more unlicensed cells. In an example, the plurality of cells may comprise one or more licensed cells and one or more unlicensed cells. The configuration parameters may comprise first configuration parameters of a licensed cell. The configuration parameters may comprise second configuration parameters of an unlicensed cell.

In an example, the first configuration parameters may comprise/indicate a first value for a first deactivation timer of the licensed cell. In an example, the first configuration parameters may comprise first bandwidth part configuration parameters of a first plurality of bandwidth parts of the licensed cell comprising a first bandwidth part. The first configuration parameters may comprise/indicate first configured grant/periodic resource allocation configuration parameters indicating a first plurality of configure grants for the licensed cell and/or a first bandwidth part of the licensed cell. The first occasions of the first plurality of configured grants may be based on a period and/or a pattern (e.g., indicated by RRC e.g., as a bitmap/pattern/period). In an example the first plurality of configured grants may be activated upon/in response to receiving the first configured grant/periodic resource allocation configuration parameters (e.g., upon/in response to RRC configuration). In an example the first plurality of configured grants may be activated upon/in response to receiving the first configured grant/periodic resource allocation configuration parameters and without further receiving an activation command. In an example, the first plurality of configured grants may be activated upon/in response to reception of a first activation command. In an example, the first activation command may be transmitted by physical layer signaling (e.g., PDCCH/EPDCCH). In an example, the downlink control signaling (e.g., PDCCH/EPDCCH) may be validated as an activation command. The validation may comprise comparing one or more fields in the downlink control signaling (e.g., activation command DCI) with pre-defined values. In an example, the validation may comprise the activation command DCI being associated with a first RNTI. In response to the validation being successful, the first plurality of configured grants may be activated. In an example, the first activation command may be a MAC command (e.g., transmitted via a MAC CE).

In an example, the second configuration parameters may comprise/indicate a second value for a second deactivation timer of the unlicensed cell. In an example, the second configuration parameters may comprise second bandwidth part configuration parameters of a second plurality of bandwidth parts of the unlicensed cell comprising a second bandwidth part. The second configuration parameters may comprise/indicate second configured grant/periodic resource allocation/autonomous uplink configuration parameters indicating a second plurality of configured grants for the unlicensed cell and/or second bandwidth part of the unlicensed cell. The second occasions of the second plurality of configured grants may be based on a period and/or a pattern (e.g., indicated by RRC e.g., as a bitmap/pattern/period). In an example the second plurality of configured grants may be activated upon/in response to receiving the second configured grant/periodic resource allocation configuration/autonomous uplink parameters. In an example the second plurality of configured grants may be activated upon/in response to receiving the second configured grant/periodic resource allocation configuration/autonomous uplink parameters and without further receiving an activation command. In an example, the second plurality of configured grants may be activated upon/in response to reception of a second activation command. In an example, the second activation command may be transmitted by physical layer signaling (e.g., PDCCH/EPDCCH). In an example, the downlink control signaling (e.g., PDCCH/EPDCCH) may be validated as an activation command. The validation may comprise comparing one or more fields in the downlink control signaling (e.g., activation command DCI) with pre-defined values. In an example, the validation may comprise the activation command DCI being associated with a second RNTI. In response to the validation being successful, the first plurality of configured grants may be activated. In an example, the second activation command may be a MAC command (e.g., transmitted via a MAC CE).

Figure 24:
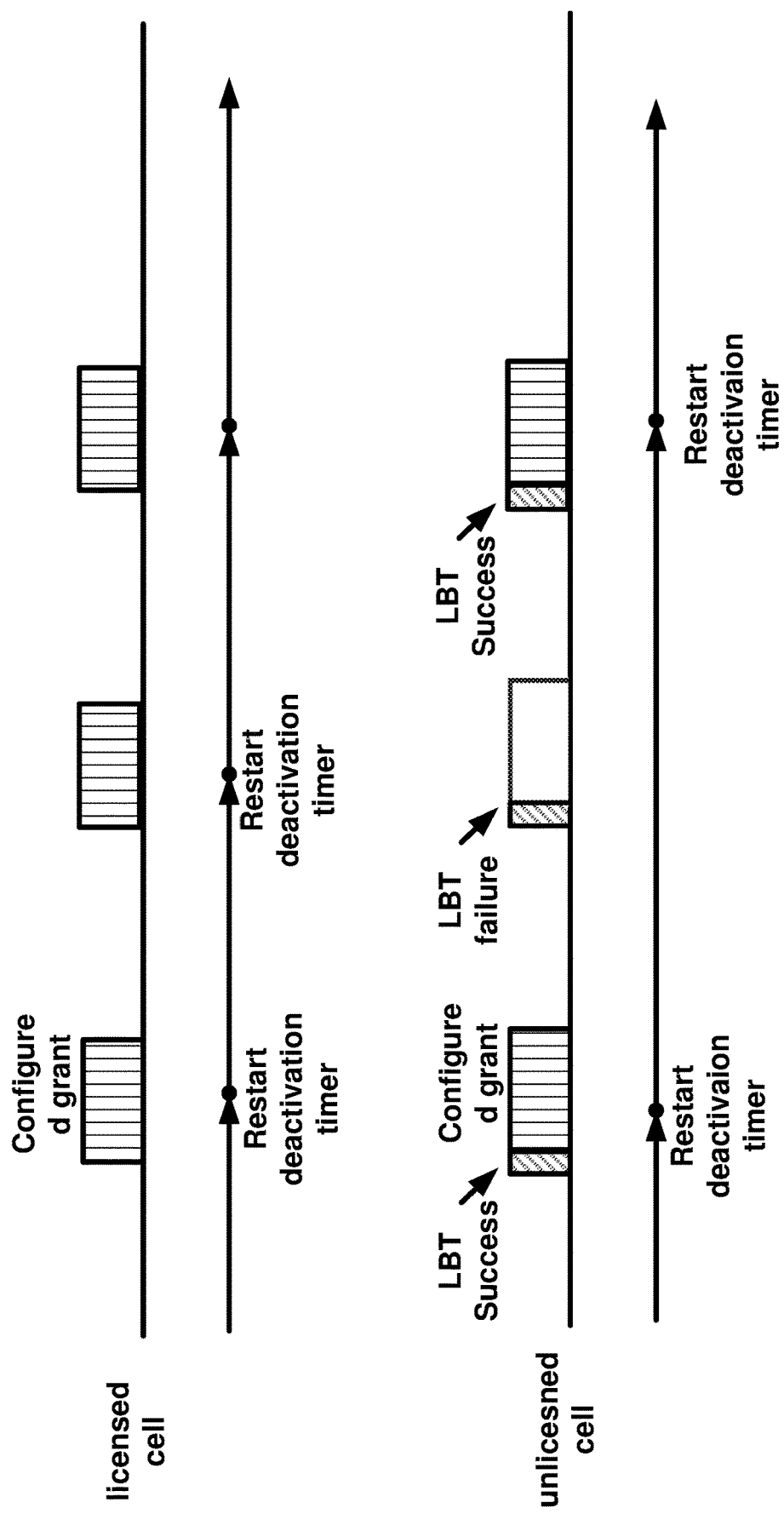
FIG. 24 is an example procedure as per an aspect of an embodiment of the present disclosure.

An example embodiment is shown in FIG. 24. In an example, the wireless device may create a first packet (e.g., a first MAC PDU/transport block) for transmission based on a first configured grant of the first plurality of configured grants on the licensed cell (e.g., the first bandwidth part of the licensed cell wherein the first plurality of configured grants are configured). In an example, the creating the first packet may comprise multiplexing one or more logical channels and/or MAC CEs to create a MAC PDU. The multiplexing may be based on a logical channel prioritization procedure. In an example the one or more logical channels multiplexed in the first packet may be based on a numerology associated with radio resources corresponding to the first configured grant. In an example, the numerology associated with radio resources corresponding to the first configured grant may be the numerology of the licensed cell and/or the numerology of the first bandwidth part of the licensed cell wherein the first plurality of configured grants are configured. In an example, one or more parameters to create the first packet may be indicated in the first configured grant/periodic resource allocation configuration parameters. In an example, one or more parameters to create the first packet may be indicated in the first activation command (e.g., PDCCH activation). In an example, the one or more parameters may comprise resource allocation parameters (e.g., time/frequency resources) and/or transmission time interval/transmission duration/bandwidth part/numerology and/or power control parameters and/or HARQ related parameters (e.g., HARQ ID, NDI, RV, etc.), etc. In an example, the wireless device may determine a HARQ ID corresponding to the first packet based on the radio resources used for transmission of the first packet. In an example, the wireless device may transmit the first packet employing the resources corresponding to the first configured grant. In an example, the wireless device may start the first deactivation timer of the licensed cell in response to creating the first packet. In an example, the wireless device may start the first deactivation timer of the licensed cell in response to transmitting the first packet. In an example, MAC layer may consider a packet as transmitted upon creation of the packet and sending the packet to the physical layer for transmission. Irrespective of successful or unsuccessful transmission of the packet at the physical layer, the MAC layer of the wireless device may consider the packet as transmitted and may start the first deactivation timer. In an example, the base station may transmit a retransmission grant for retransmission of the second packet if the second packet is not received correctly. The wireless device may retransmit the second packet with an appropriate redundancy version (e.g., as indicated in the retransmission grant). The wireless device may store the second packet and different redundancy versions of the second packet in one or more HARQ buffers associated with the HARQ ID of the second packet.

In an example, the wireless device may create a second packet (e.g., a second MAC PDU/transport block) for transmission based on a second configured grant of the second plurality of configured grants on unlicensed cell (e.g., the second bandwidth part of the unlicensed cell wherein the second plurality of configured grants are configured). In an example, the creating the second packet may comprise multiplexing one or more logical channels and/or MAC CEs to create a MAC PDU. The multiplexing may be based on a logical channel prioritization procedure. In an example the one or more logical channels multiplexed in the first packet may be based on a numerology associated with radio resources corresponding to the second configured grant. In an example, the numerology associated with radio resources corresponding to the second configured grant may be the numerology of the unlicensed cell and/or the numerology of the second bandwidth part of the unlicensed cell wherein the second plurality of configured grants are configured. In an example, one or more parameters to create the second packet may be indicated in the second configured grant/periodic resource allocation/autonomous uplink configuration parameters. In an example, one or more parameters to create the second packet may be indicated in the second activation command (e.g., PDCCH activation). In an example, the one or more parameters may comprise resource allocation parameters and/or transmission time interval/transmission duration/bandwidth part/numerology and/or power control parameters and/or HARQ related parameters (e.g., HARQ ID, NDI, RV, etc.), etc. In an example, the wireless device may determine a HARQ ID corresponding to the second packet based on the radio resources used for transmission of the second packet.

An example embodiment is shown in FIG. 24. In an example, the wireless device may perform a listen before talk procedure before/for transmission of the second packet. The wireless device may start the second deactivation timer of the unlicensed cell in response to the listen before talk procedure indicating a clear channel. In an example, the wireless device may not start the second deactivation timer in response to the listen before talk procedure indicating an occupied/busy channel. The wireless device may let the second deactivation timer continue running without restarting the second deactivation timer in response to the listen before talk procedure indicating an occupied/busy channel.

An example embodiment is shown in FIG. 24. In an example, the wireless device may perform a listen before talk procedure before/for transmission of the second packet. The wireless device may determine to start the second deactivation timer of the unlicensed cell in response to the listen before talk procedure indicating clear channel. The wireless device may start the second deactivation timer based on the determining. In an example, the wireless device may determine not to start/restart the second deactivation timer of unlicensed cell in response to the listen before talk procedure indicating an occupied/busy channel. The wireless device may not start/restart the second inactivity timer of the second bandwidth part in response to the determining.

An example embodiment is shown in FIG. 24. In an example, the wireless device may perform a listen before talk procedure before/for transmission of the second packet. The wireless device may start the second deactivation timer of the unlicensed cell in response to the listen before procedure indicating a clear channel, otherwise (e.g., in response to the listen before talk procedure indicating a busy/occupied channel) the wireless device may not start the second deactivation timer of the unlicensed cell.

Figure 25:
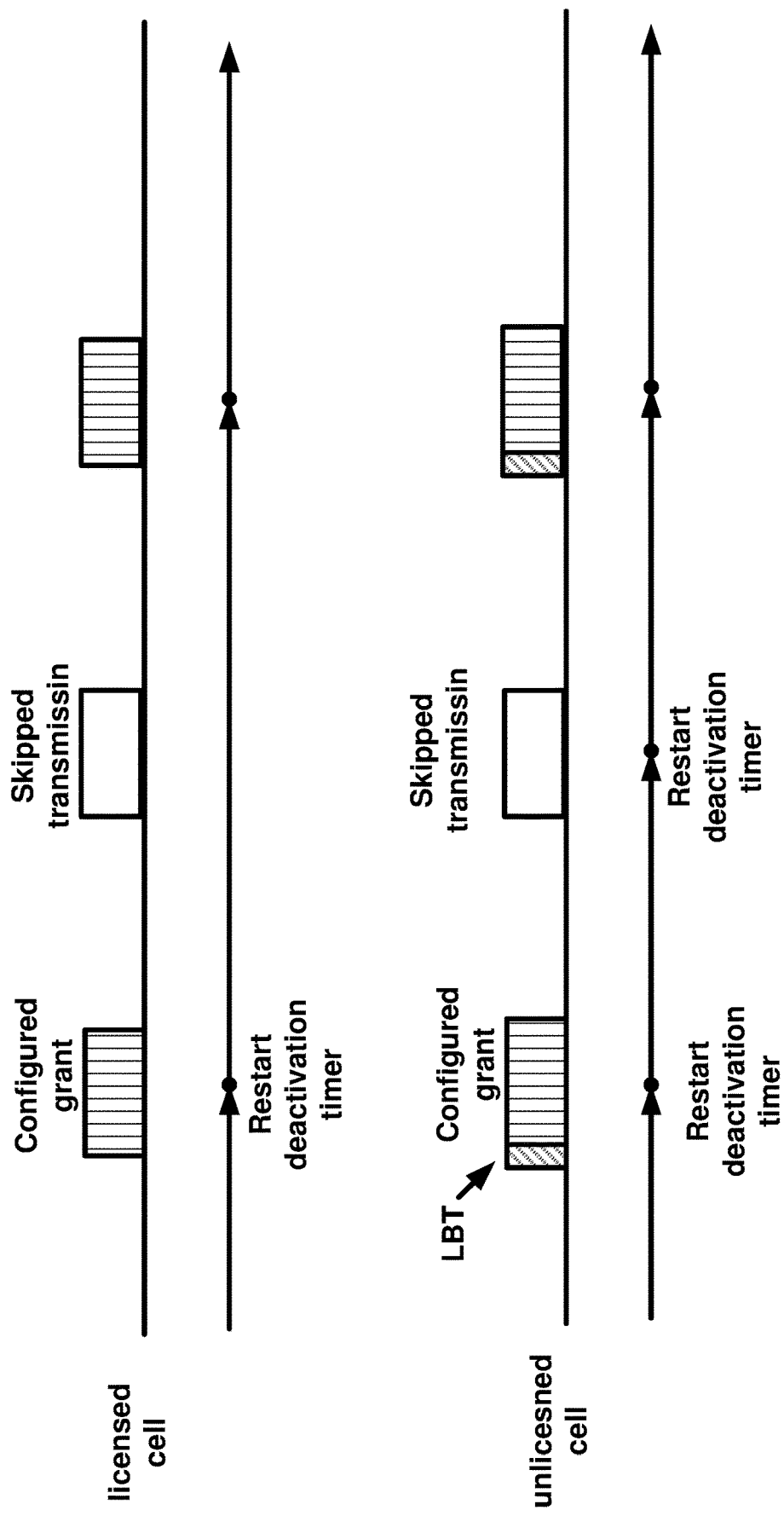
FIG. 25 is an example procedure as per an aspect of an embodiment of the present disclosure.

An example embodiment is shown in FIG. 25. In an example, the wireless device may start the first deactivation timer of the licensed cell in a first transmission time interval/ symbol time/slot time/subframe/time instance associated with a first configured grant of the first plurality of configured grants in response to creating/transmitting a first packet based on the first configured grant. The wireless device may not start the first deactivation timer of the licensed cell in a first transmission time interval/symbol time/slot time/subframe/time instance associated with a first configured grant of the first plurality of configured grants in response to skipping the first configured grant.

An example embodiment is shown in FIG. 25. In an example, the wireless device may start the second deactivation timer of the unlicensed cell in a second transmission time interval/symbol time/slot time/subframe/time instance associated with a second configured grant of the second plurality of configured grants irrespective of creating/transmitting or skipping (e.g., not creating/transmitting) a second packet based on the second configured grant.

Figure 26:
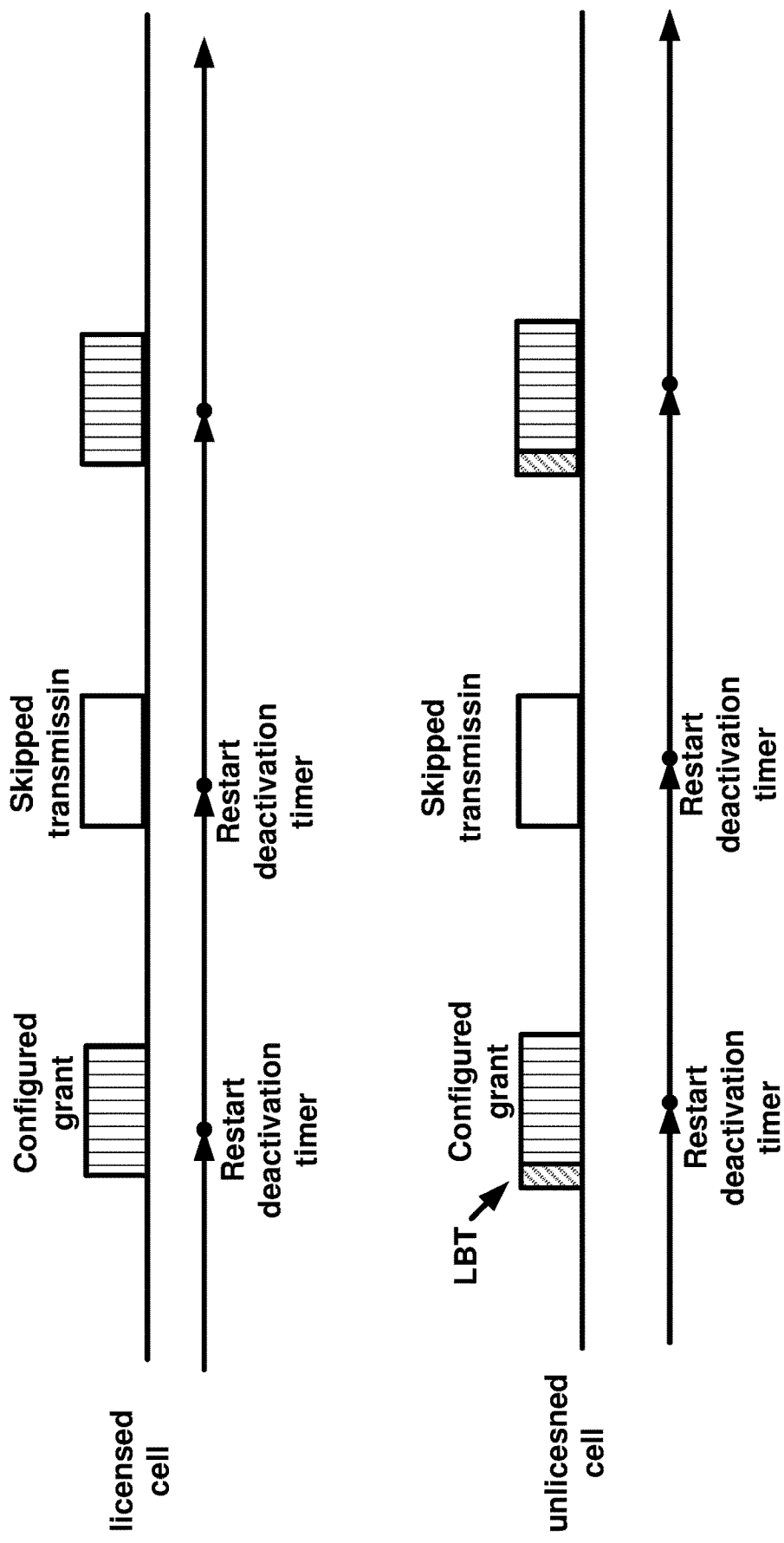
FIG. 26 is an example procedure as per an aspect of an embodiment of the present disclosure.

An example embodiment is shown in FIG. 26. In an example, the wireless device may start the first deactivation timer of the licensed cell in a first transmission time interval/ symbol time/slot time/time instance associated with a first configured grant of the first plurality of configured grants irrespective of creating/transmitting or skipping (e.g., not creating/transmitting) the first packet based on the first configured grant. In an example, the wireless device may start the second deactivation timer of the unlicensed cell in a second transmission time interval/symbol time/slot time/ time instance associated with a second configured grant of the second plurality of configured grants irrespective of creating/transmitting or skipping (e.g., not creating/transmitting) the second packet based on the second configured grant.

In an example, the wireless device may select first HARQ related parameters (e.g., HARQ ID, RV, NDI, etc.) of the second packet and may transmit the HARQ related parameters with PUSCH in the second configured grant. In an example, in response to the listen before talk procedure before transmission of the second packet indicating an occupied/busy channel, the wireless device may transmit the second packet employing a third configured grant of the second plurality of configured grants. The wireless device may select second HARQ related parameters for transmission of the second packet employing the third configured grant. In an example, one or more parameters of the second HARQ related parameters may be different from the corresponding parameters in the first HARQ related parameters. In an example, the wireless device may receive a DCI indicating a dynamic grant for retransmission of the second packet. The wireless device may transmit the second packet employing resources and/or HARQ related parameters indicated by the dynamic grant transmitted by the base station.

Uplink transmission of a wireless device in an unlicensed band may be subject to a listen before talk (LBT) procedure. The wireless device may perform the uplink transmission based on the LBT procedure indicating a clear channel. The wireless device may not perform the uplink transmission based on the LBT procedure indicating a busy channel. Uplink transmission in a bandwidth part of an unlicensed cell may consistently fail due to channel congestion and transmissions by other devices in the shared unlicensed band. This may cause additional delay uplink transmission of data and control packets. Based on existing technologies, the base station may determine the consistent LBT failures at the wireless device by using implementation methods and/or based on the wireless device feedback. For example, the wireless device may transmit its LBT status and statistics (e.g., an LBT counter value) and the base station may take actions based on this wireless device feedback. The base station may reconfigure one or more parameters for the wireless device. The existing technologies rely on a base station to take a recovery action. This may cause additional delay after experiencing consistent LBT failures until the wireless device receives a recovery command. There is a need to enhance the existing LBT failure recovery technologies by providing a faster recovery mechanism. Example embodiments enhance the existing LBT failure recovery processes by enabling a wireless device to autonomously switch the active bandwidth part. In example embodiments, a wireless device makes a determination to switch from an existing bandwidth part based on LBT statistics (e.g. without a need for a switching command from a base station). Example embodiments reduces recovery delay when LBT procedure for a bandwidth part is unsuccessful.

In an example embodiment, a wireless device may receive one or more messages (e.g., one or more RRC messages) configuration comprising parameters. The configuration parameters may comprise first configuration parameters of a first bandwidth part and a second bandwidth part of a cell. In an example, the cell may be an unlicensed cell. The configuration parameters may comprise a first parameter indicating a value of a listen before talk counter. In an example, the value of the listen before talk counter may be for the cell. In an example, the value of the listen before talk counter may be for a bandwidth part of the cell and different values of listen before talk counters may be configured for different bandwidth parts of the cell. In an example, the listen before talk counter may be for transmission via a first uplink channel (e.g., PUSCH, PUCCH, PRACH, etc.). In an example, the listen before talk counter may be for transmissions of a first uplink signal (e.g., SRS, DM-RS, PT-RS, etc.). In an example, the listen before talk counter may be for any of a plurality of uplink channels (e.g., any of PUSCH, PUCCH, PRACH, etc.). In an example, the listen before talk counter may be for any of a plurality of uplink signals (e.g., any of SRS, DM-RS, PT-RS, etc.).

The wireless device may perform a listen before talk procedure for an uplink transmission via the first bandwidth part of the cell. In an example, the uplink transmission may be a transmission via an uplink channel. In an example, the uplink transmission may be a transmission of an uplink signal. In an example, the uplink transmission may be via an uplink channel or an uplink signal. In an example, the uplink channel may be an uplink shared channel for data transmission. In an example, the uplink channel may be an uplink control channel for transmission of control signaling. In an example, the uplink transmission may be transmission of a scheduling request (e.g., via an uplink control channel). In an example, the uplink transmission may be transmission via an uplink configured grant. In an example, the uplink transmission may be transmission via a dynamic grant. In an example, the uplink channel may be one of a plurality of uplink channels. The plurality of uplink channels may comprise an uplink shared channel, an uplink control channel, a random access channel, etc. In an example, the uplink signal may be a sounding reference signal (SRS). In an example, the uplink signal may be a demodulation reference signal (DM-RS). In an example, the uplink signal may be a phase tracking reference signal (PT-RS), etc. In an example, the uplink signal may be one of a plurality of uplink signals comprising sounding reference signal (SRS), demodulation reference signal (DM-RS) or phase tracking reference signal (PT-RS).

Figure 27:
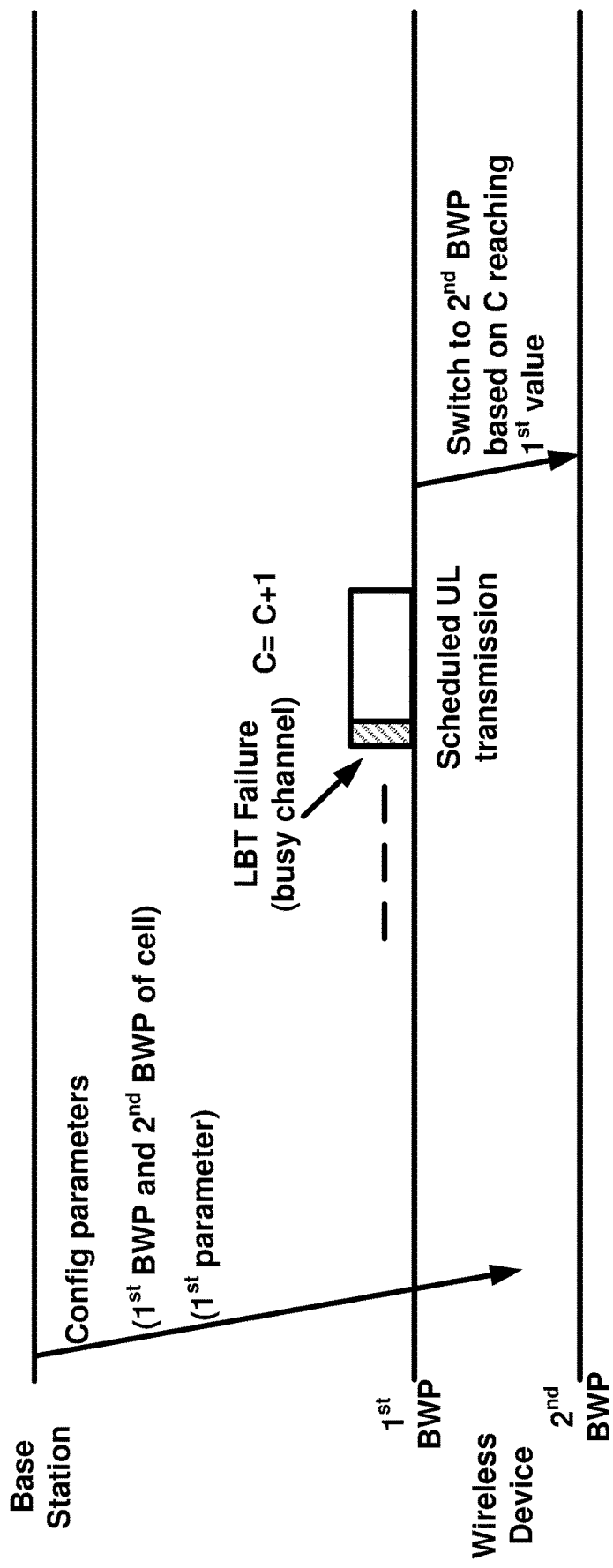
FIG. 27 is an example listen before talk recovery procedure as per an aspect of an embodiment of the present disclosure.
Figure 28:
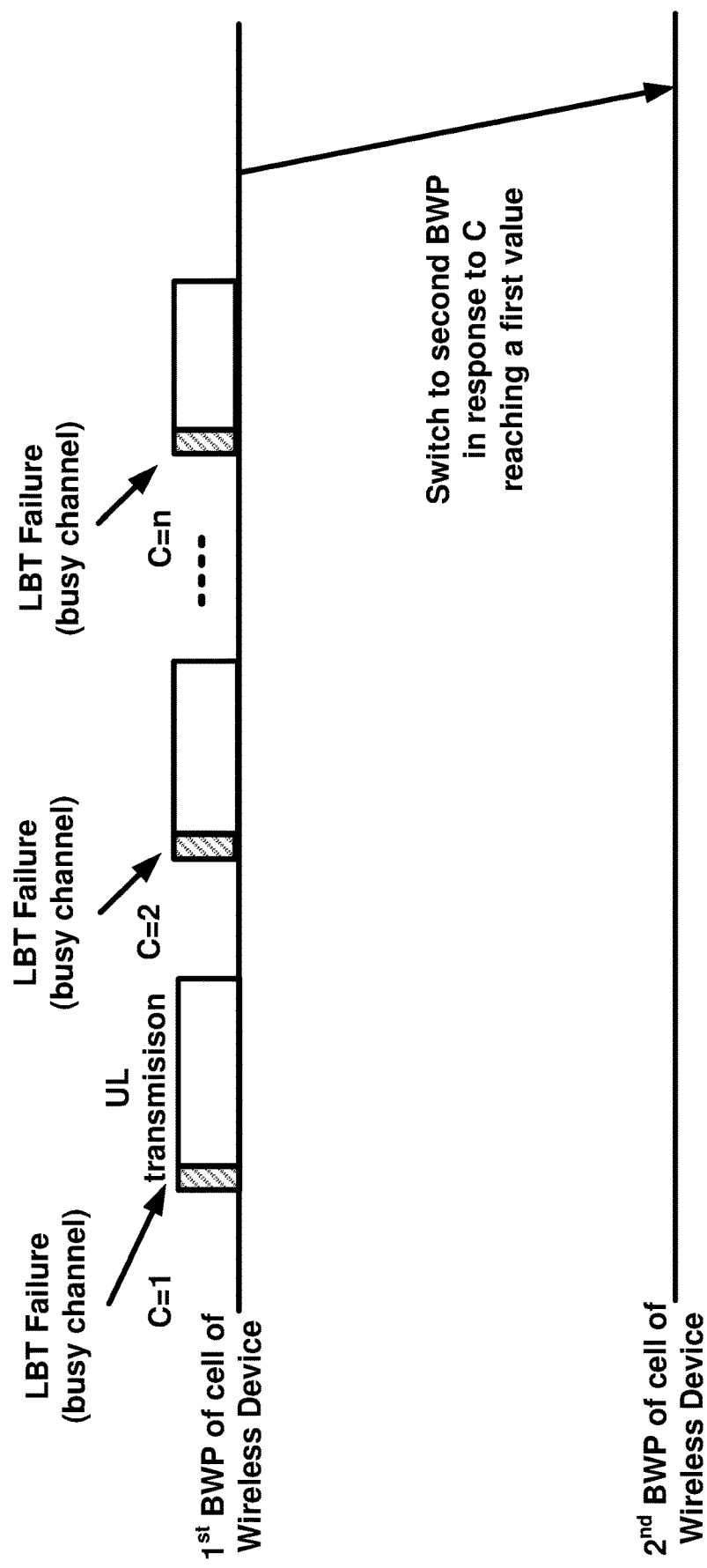
FIG. 28 is an example listen before talk recovery procedure as per an aspect of an embodiment of the present disclosure.

In an example embodiment as shown in FIG. 27 and FIG. 28, the wireless device may increment the listen before talk counter based on the listen before talk procedure for the uplink transmission indicating a busy channel. The listen before talk counter may reach a value based on the incrementing. The counter reaching the first value (e.g., the first value of the listen before talk counter indicated by the first parameter) may indicate that the level of congestion and interference of the first bandwidth part is high and the wireless device may perform a recovery action based on the value of the listen before talk counter being equal to the first value. The autonomous wireless device recovery action enables a fast recovery for the wireless device from consistent LBT failures. The wireless device may switch from the first bandwidth part to the second bandwidth part based on the listen before talk counter reaching the first value.

A bandwidth part inactivity timer may be used by a wireless device to switch to a default bandwidth part when there is no or little activity (e.g., transmission or reception activity) on an active bandwidth part of a cell. The wireless device may keep the current active bandwidth part active if the corresponding bandwidth part inactivity timer is running and may switch to the default bandwidth part if the corresponding bandwidth part inactivity timer expires. The default bandwidth part may have a smaller bandwidth compared to other bandwidth parts of a cell and switching to the default bandwidth part may enhance the power consumption performance of the wireless device.

Based on existing technologies, a wireless device may restart the bandwidth part inactivity timer based on creating/generating a packet, at the MAC layer, for transmission via a configured grant of the bandwidth part. The wireless device may restart the bandwidth part inactivity timer when the MAC layer instructs the physical layer to transmit a MAC PDU (regardless of physical layer transmission being successful or not). In a licensed band, the MAC PDU transmission may fail (e.g. base station transmits a NACK) due to excessive interference or poor channel quality. In an unlicensed band, when the channel experiences interference, the transmission of the packet (MAC PDU) may not be successful for example due to LBT failure. In existing technologies, the bandwidth part inactivity timer is restarted even if the MAC PDU transmission fails due to excessive interference. Existing technologies for bandwidth part operation in unlicensed bands may lead to unsynchronized values of the bandwidth part inactivity timer at the wireless device and the base station. When existing technologies are implemented, the wireless device may keep a bandwidth of an unlicensed cell as active while from the base station perspective the bandwidth part inactivity timer may be expired and the base station may assume that the wireless device has switched to a default bandwidth part. There is a need to enhance the existing bandwidth part operations in unlicensed bands so that the bandwidth part inactivity timer is synchronized at the wireless device and the base station.

Example embodiments enhance the existing bandwidth part inactivity timer processes in unlicensed bands. In an example embodiment, the wireless device may restart the bandwidth part inactivity timer when the LBT procedure for a transmission of a packet is successful. The wireless device may not restart the BWP inactivity timer when the MAC PDU instructs the physical layer to transmit a packet, and LBT procedure fails. Example embodiment may improve radio link efficiency by maintaining the bandwidth part timer synchronized between a wireless device and a base station.

Figure 29:
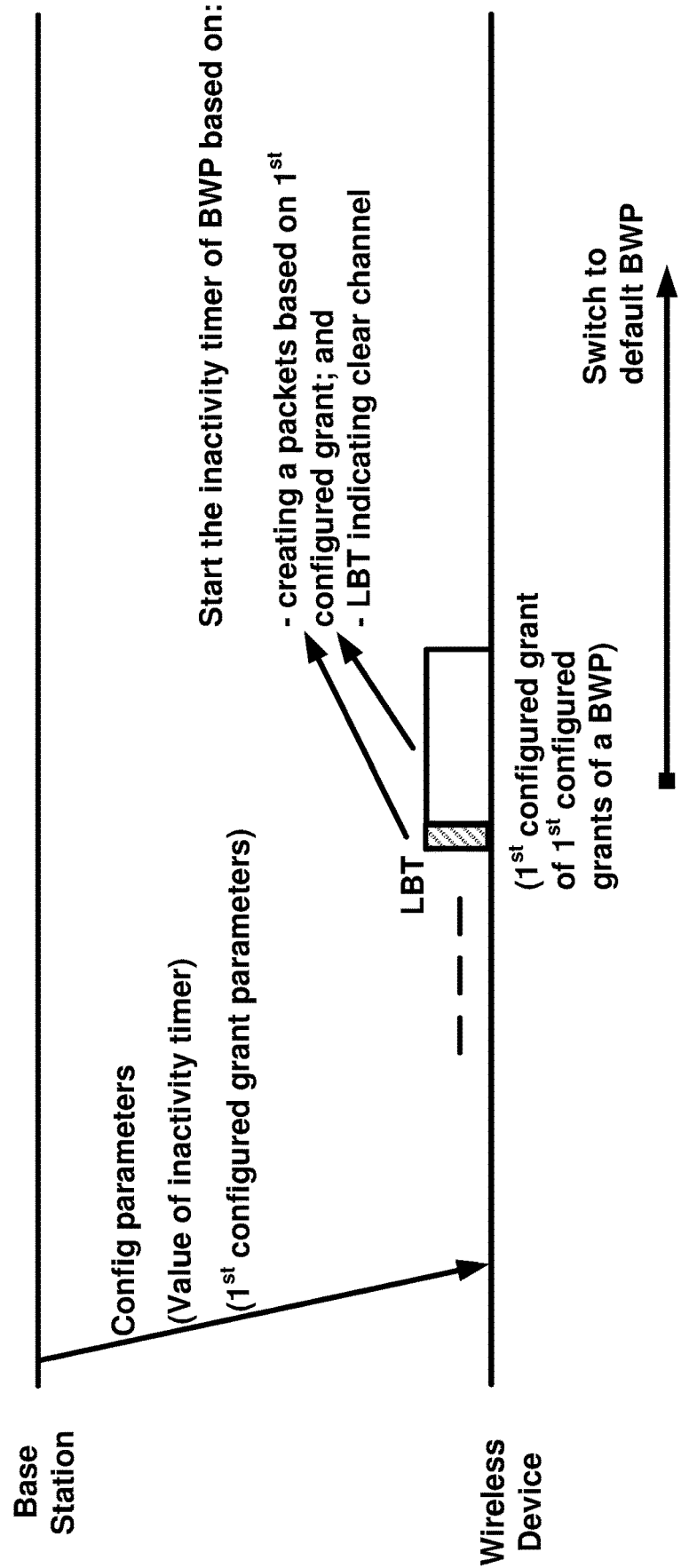
FIG. 29 is an example bandwidth part inactivity timer operation as per an aspect of an embodiment of the present disclosure.

In an example embodiment as shown in FIG. 29, a wireless device may receive one or more messages (e.g., one or more RRC messages) comprising configuration parameters. The configuration parameters may comprise parameters for an unlicensed cell. The parameters may comprise first configuration parameters of one or more bandwidth parts of the unlicensed cell. The configuration parameters may indicate a value of an inactivity timer of a bandwidth part of the unlicensed cell. The configuration parameters may comprise first configured grant parameters of first configured grants of the bandwidth part of the unlicensed cell. In an example, the first configured grant parameters may comprise type 1 configured grant configuration parameters. The first configured grants may be activated based on the first configured grants being Type 1 configured grants and based on receiving the first configured grant configuration parameters. In an example, the first configured grant parameters may comprise type 2 configured grant configuration parameters. The first configured grants may be activated based on the first configured grants being Type 2 configured grants and based on receiving the first configured grant configuration parameters and an activation DCI indicating the activation of the first configured grants. The first configured grant parameters may comprise a periodicity parameter, a number of HARQ processes, one or more modulation and coding parameters, one or more repetition parameters, resource allocation parameters, a configured grant timer parameter, etc.

The wireless device may create a packet (e.g., a MAC layer packet data unit (PDU)) based on a first configured grant of the first configured grants. The wireless device may create the packet based on parameters of the first configured grant. The wireless device may multiplex data of one or more logical channels and/or one or more MAC control elements and create the MAC layer packet. In an example, the wireless device may store the packet in HARQ buffer and may pass the packet to the Physical layer for transmission. The transmission of the packet at the physical layer may be subject to performing a listen before talk procedure and the listen before talk procedure indicating a clear channel.

The wireless device may start the bandwidth part inactivity timer of the bandwidth part of the unlicensed cell based on creating the packet based on the first configured grant and based on the listen before talk procedure for transmission of the packet indicating a clear channel. The wireless device may start the bandwidth part inactivity timer not just based on creating the packet at the MAC layer but also based on an actual transmission of the packet at the Physical layer after a listen before talk for transmission of the packet indicates a clear channel. This enhanced process enables the synchronization of the bandwidth part inactivity timer at the wireless device and the base station. In an example, the wireless device may determine a status of the listen before talk procedure (e.g., clear channel or busy channel) based on an indication from the physical layer to the MAC layer of the wireless device. The wireless device may start the bandwidth part inactivity timer with the value of the bandwidth part inactivity timer indicated by the configuration parameters. The wireless device may switch from the first bandwidth part to a default bandwidth part based on the bandwidth part inactivity timer of the first bandwidth part of the unlicensed cell expiring.

Figure 30:
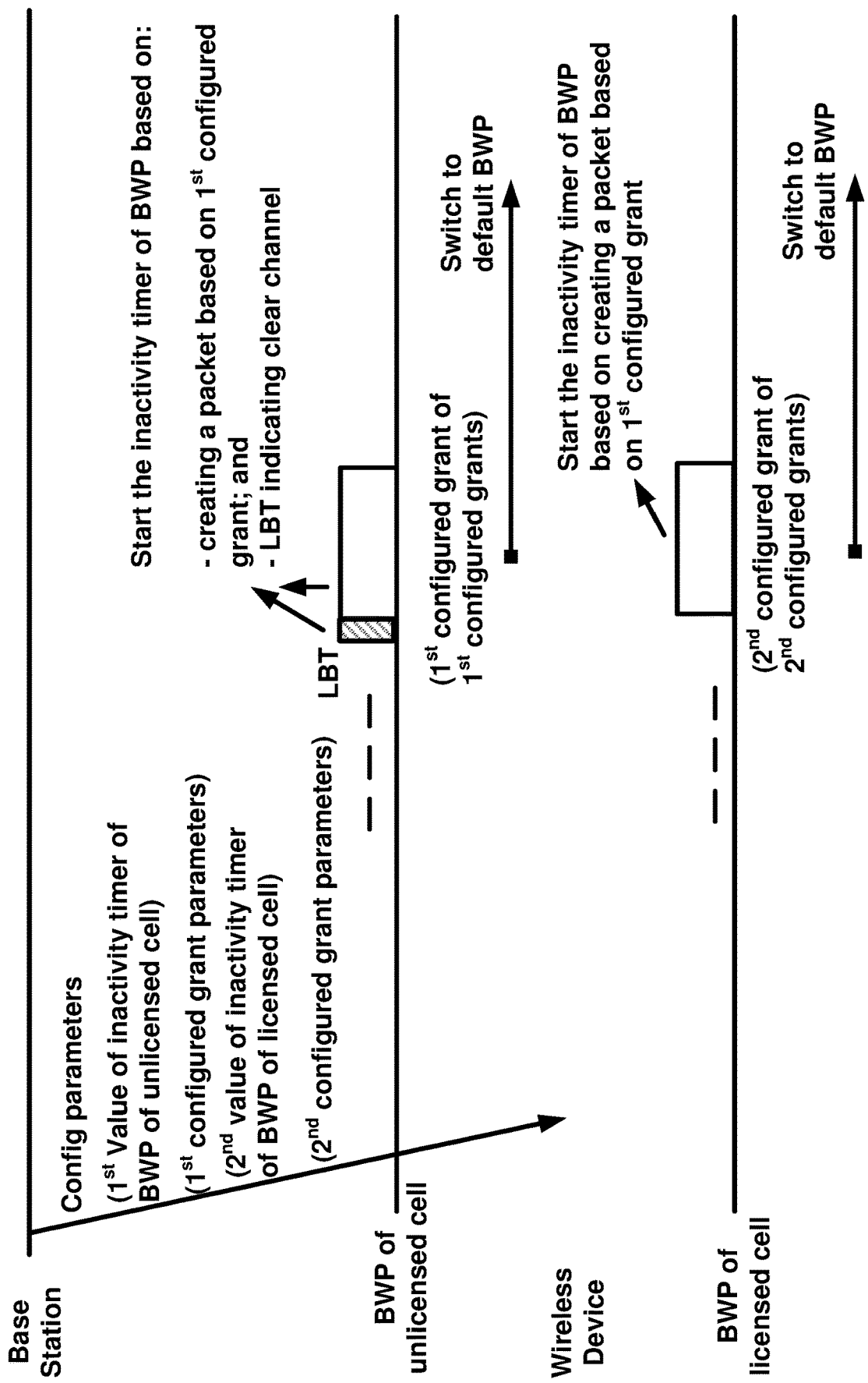
FIG. 30 is an example bandwidth part inactivity timer operation as per an aspect of an embodiment of the present disclosure.
Figure 31:
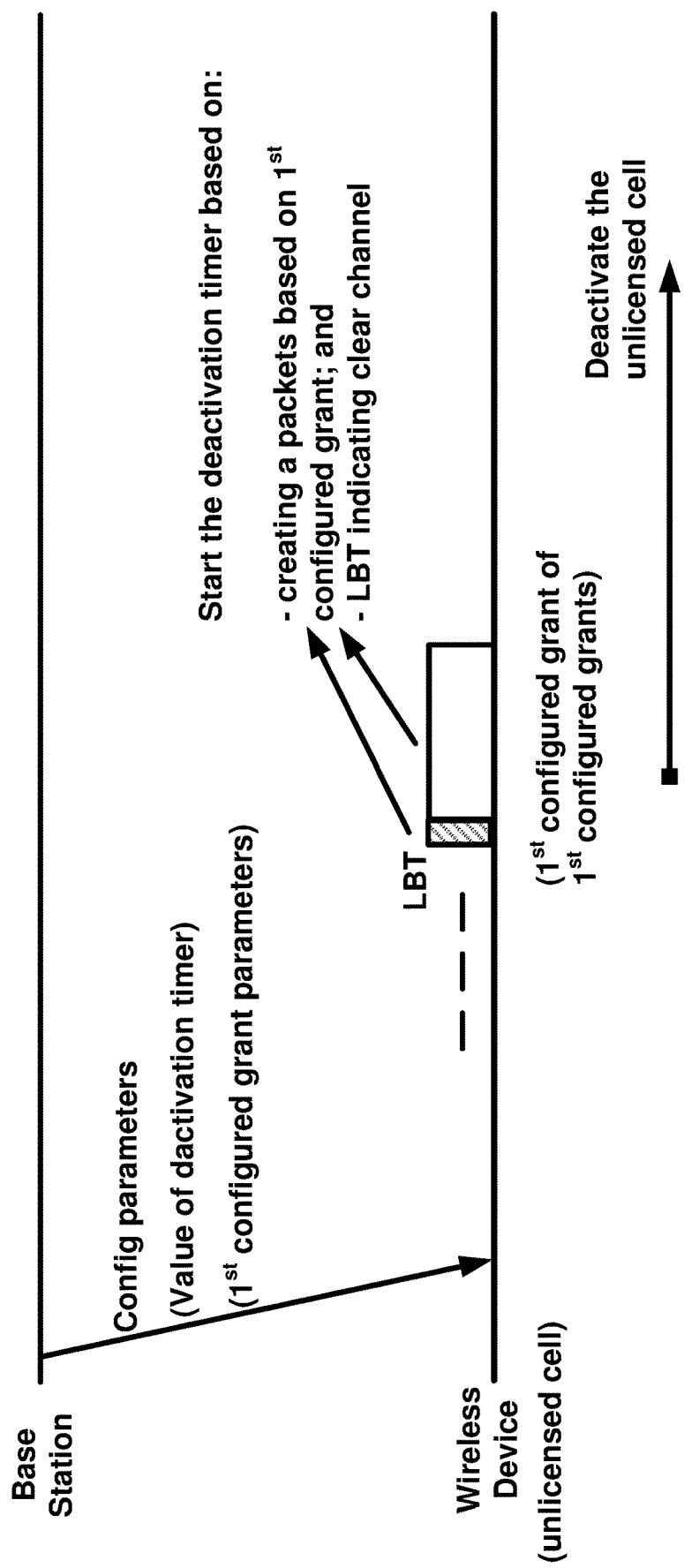
FIG. 31 is an example cell deactivation timer operation as per an aspect of an embodiment of the present disclosure.

In an example embodiment as shown in FIG. 30, the configuration parameters may further indicate a second value of a second bandwidth part inactivity timer of a second bandwidth part of a licensed cell. The configuration parameters may further indicate second configuration parameters of second configured grants for the second bandwidth part. The wireless device may create a second packet based on a third configured grant of the second configured grants. The wireless device may start the bandwidth part inactivity timer of the second bandwidth part of the licensed cell based on creating the second packet. The wireless device may switch from the second bandwidth part to a default bandwidth part based on the bandwidth part inactivity timer of the second bandwidth part of the licensed cell expiring.

A cell deactivation timer is used by a wireless device to deactivate a cell when there is no or little activity (e.g., transmission or reception activity) on the cell. The wireless device may keep the cell as active if the corresponding cell deactivation timer is running and may deactivate the cell if the corresponding cell deactivation timer expires.

Based on existing technologies, a wireless device may restart the cell deactivation timer based on creating/generating a packet, at the MAC layer, for transmission via a configured grant of the cell. The wireless device may restart the cell deactivation timer when the MAC layer instructs the physical layer to transmit a MAC PDU (regardless of physical layer transmission being successful or not). In a licensed band, the MAC PDU transmission may fail (e.g. base station transmits a NACK) due to excessive interference or poor channel quality. In an unlicensed band, when the channel experiences interference, the transmission of the packet (MAC PDU) may not be successful for example due to LBT failure. In existing technologies, the cell deactivation timer is restarted even if the MAC PDU transmission fails due to excessive interference. Existing technologies for wireless device operation in unlicensed bands may lead to unsynchronized values of the cell deactivation timer at the wireless device and the base station. When existing technologies are implemented, the wireless device may keep an unlicensed cell as active while from the base station perspective the cell deactivation timer of the unlicensed cell may be expired and the base station may assume that the wireless device has deactivated the unlicensed cell. There is a need to enhance the existing cell deactivation operations in unlicensed bands so that the cell deactivation timer is synchronized at the wireless device and the base station.

Example embodiments enhance the existing cell deactivation timer processes in unlicensed bands. In an example embodiment, the wireless device may restart the cell deactivation timer when the LBT procedure for a transmission of a packet is successful. The wireless device may not restart the cell deactivation timer when the MAC PDU instructs the physical layer to transmit a packet, and LBT procedure fails. Example embodiment may improve radio link efficiency by maintaining the cell deactivation timer synchronized between a wireless device and a base station.

Figure 32:
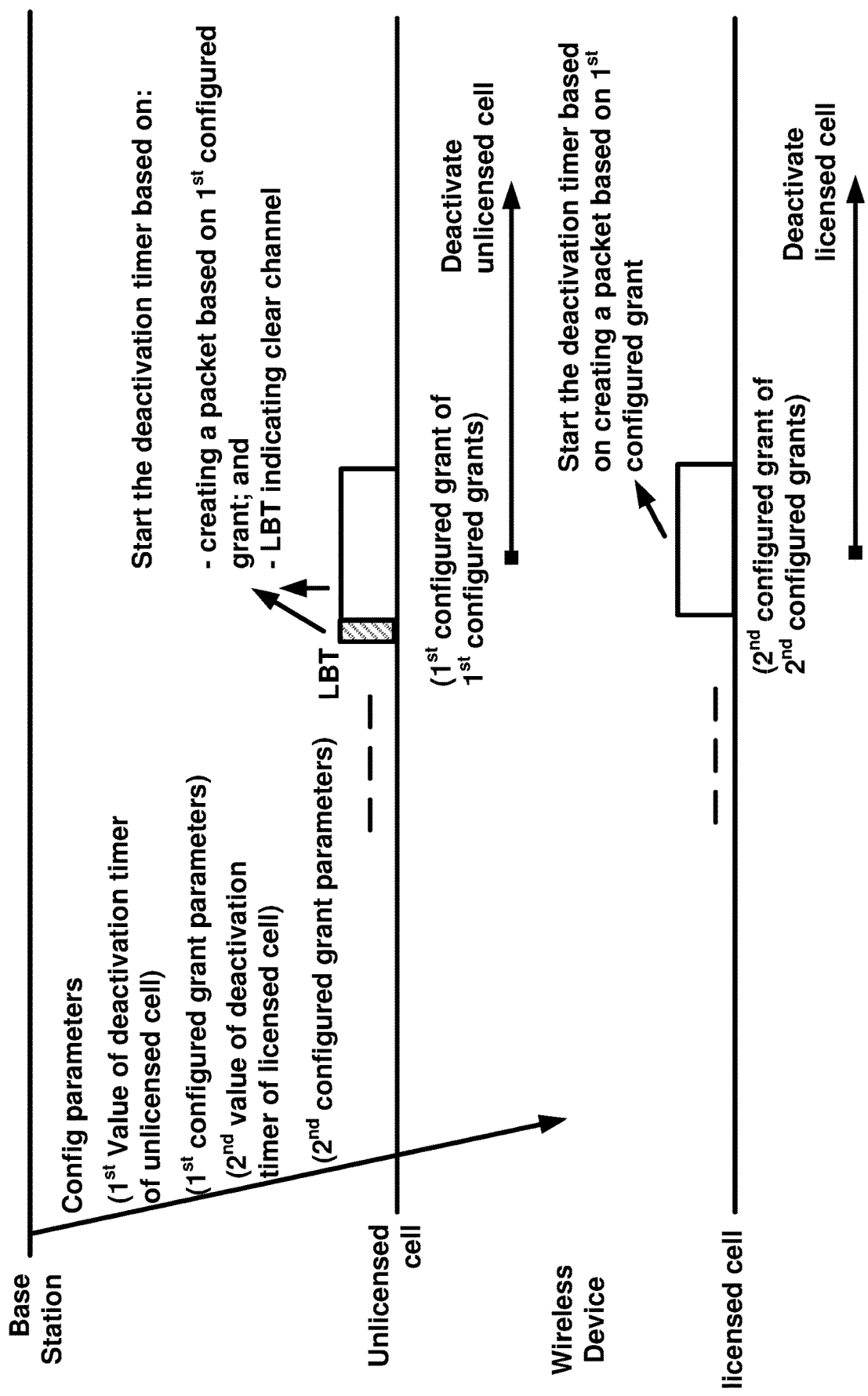
FIG. 32 is an example cell deactivation timer operation as per an aspect of an embodiment of the present disclosure.

In an example embodiment as shown in FIG. 32, a wireless device may receive one or more messages (e.g., one or more RRC messages) comprising configuration parameters. The configuration parameters may comprise parameters for an unlicensed cell. The configuration parameters may indicate a value of an deactivation timer of the unlicensed cell. The configuration parameters may comprise first configured grant parameters of first configured grants of the unlicensed cell. In an example, the first configured grant parameters may comprise type 1 configured grant configuration parameters. The first configured grants may be activated based on the first configured grants being Type 1 configured grants and based on receiving the first configured grant configuration parameters. In an example, the first configured grant parameters may comprise type 2 configured grant configuration parameters. The first configured grants may be activated based on the first configured grants being Type 2 configured grants and based on receiving the first configured grant configuration parameters and an activation DCI indicating the activation of the first configured grants. The first configured grant parameters may comprise a periodicity parameter, a number of HARQ processes, one or more modulation and coding parameters, one or more repetition parameters, resource allocation parameters, a configured grant timer parameter, etc.

The wireless device may create a packet (e.g., a MAC layer packet data unit (PDU)) based on a first configured grant of the first configured grants. The wireless device may create the packet based on parameters of the first configured grant. The wireless device may multiplex data of one or more logical channels and/or one or more MAC control elements and create the MAC layer packet. In an example, the wireless device may store the packet in HARQ buffer and may pass the packet to the Physical layer for transmission. The transmission of the packet at the physical layer may be subject to performing a listen before talk procedure and the listen before talk procedure indicating a clear channel.

The wireless device may start the SCell deactivation timer of the unlicensed cell based on creating the packet based on the first configured grant and based on the listen before talk procedure for transmission of the packet indicating a clear channel. The wireless device may start the SCell deactivation timer not just based on creating the packet at the MAC layer but also based on an actual transmission of the packet at the Physical layer after a listen before talk for transmission of the packet indicates a clear channel. This enhanced process enables the synchronization of the SCell deactivation timer at the wireless device and the base station. In an example, the wireless device may determine a status of the listen before talk procedure (e.g., clear channel or busy channel) based on an indication from the physical layer to the MAC layer of the wireless device. The wireless device may start the SCell deactivation timer with the value of the SCell deactivation timer indicated by the configuration parameters. The wireless device may deactivate the unlicensed cell based on the SCell deactivation timer of the unlicensed cell expiring.

In an example embodiment as shown in FIG. 32, the configuration parameters may further indicate a second value of a second SCell deactivation timer of a licensed cell. The configuration parameters may further indicate second configuration parameters of second configured grants for the licensed cell. The wireless device may create a second packet based on a third configured grant of the second configured grants. The wireless device may start the SCell deactivation timer of the licensed cell based on creating the second packet. The wireless device may deactivate the licensed cell based on the SCell deactivation timer of the licensed cell expiring.

Figure 33:
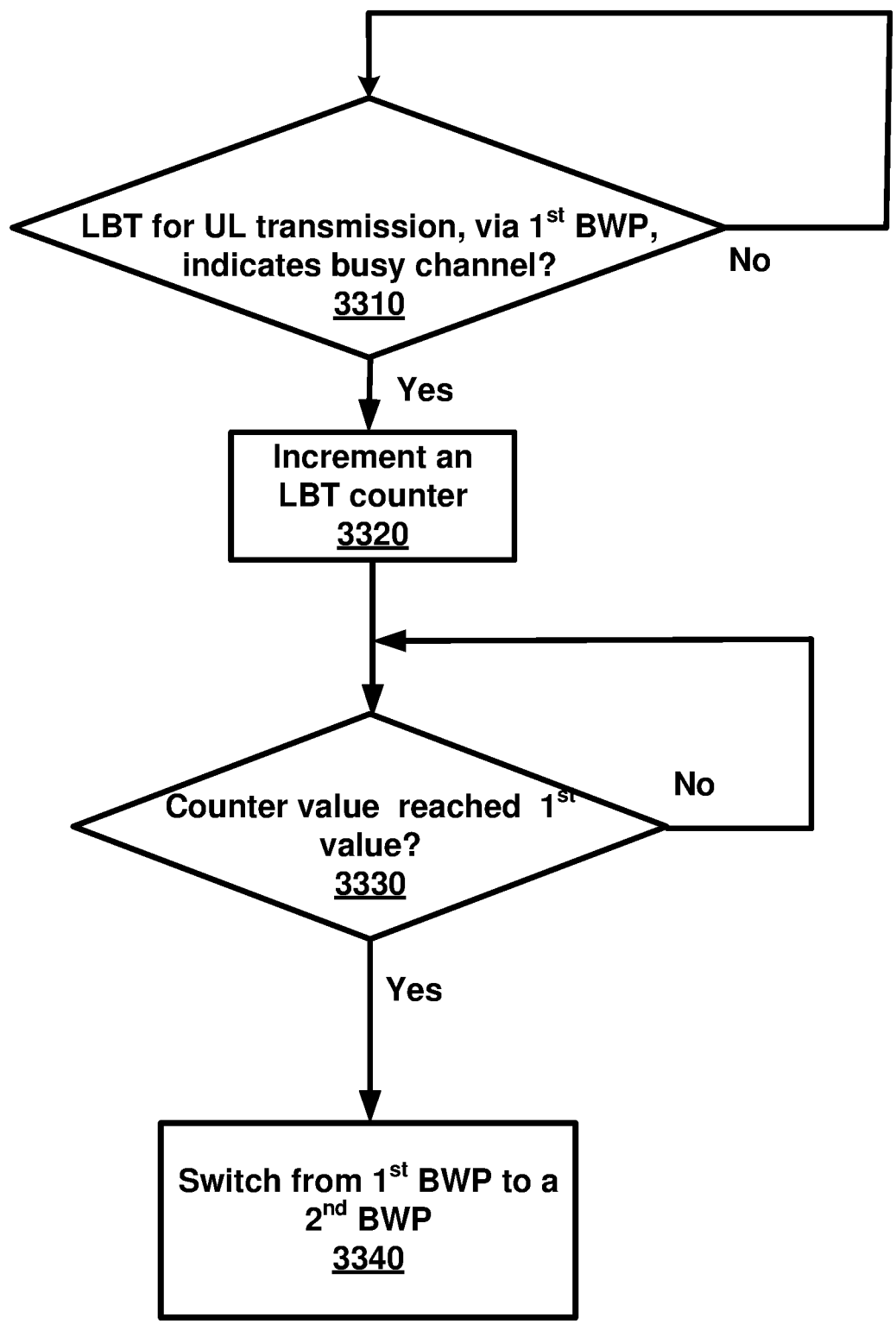
FIG. 33 is an example flow diagram of an aspect of an embodiment of the present invention disclosure.

FIG. 33 is a flow diagram as per an aspect of an example embodiment of the present disclosure. At 3310, a wireless device may determine whether LBT for UL transmission via a first BWP indicates a busy channel. At 3320, the wireless device may increment an LBT counter based on the LBT for the UL transmission via the first BWP indicates a busy channel. At 3330, the wireless device may determine whether a counter value of the LBT counter reached a first value. At 3340, the wireless device may switch from the first BWP to a second BWP based on the LBT counter reaching the first value.

According to an example embodiment, the wireless device may receive one or more messages comprising: configuration parameters of the first bandwidth part and the second bandwidth part; and a first parameter indicating the first value of the listen before talk counter.

According to an example embodiment, the first bandwidth part and the second bandwidth part may be of a cell. According to an example embodiment, the wireless device may perform a listen before talk procedure for the uplink transmission. According to an example embodiment, the wireless device may transmit one or more uplink signals via the second bandwidth part based on the switching. According to an example embodiment, the wireless device may reset the listen before talk counter based on a second listen before talk procedure for a second uplink transmission indicating a clear channel. According to an example embodiment, a value of the listen before talk counter may remain unchanged based on a second listen before talk procedure for a second uplink transmission indicating a clear channel. According to an example embodiment, the uplink transmission may be transmitted via one of a plurality of uplink channels. According to an example embodiment, the second bandwidth part may be a default bandwidth part. According to an example embodiment, the cell may be an unlicensed cell. According to an example embodiment, the listen before talk procedure may be based on an energy detection threshold. According to an example embodiment, the uplink transmission may be transmission of one or more transport blocks. According to an example embodiment, the uplink transmission may be based on a dynamic grant or a configured grant.

Figure 34:
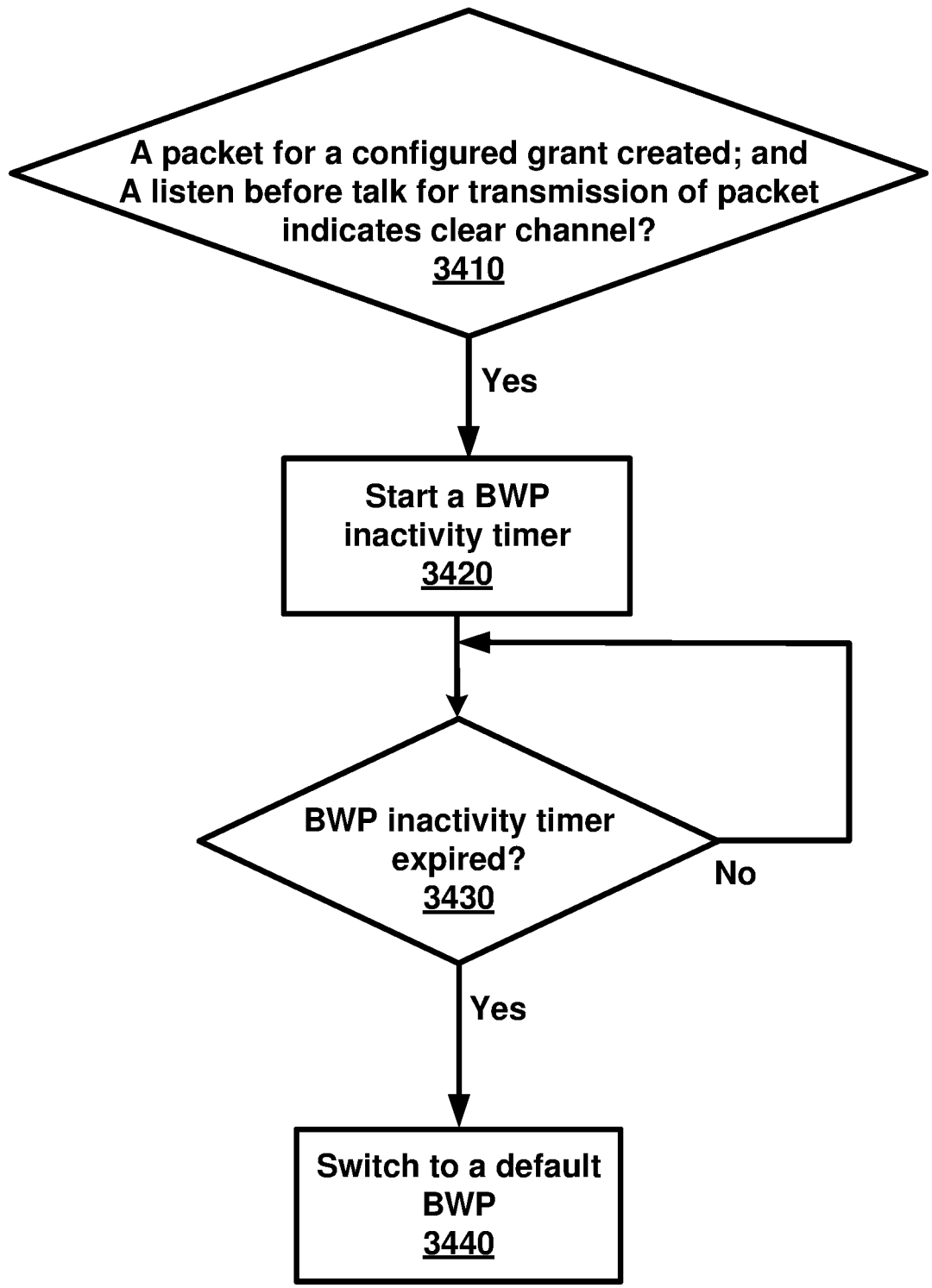
FIG. 34 is an example flow diagram of an aspect of an embodiment of the present invention disclosure.

FIG. 34 is a flow diagram as per an aspect of an example embodiment of the present disclosure. At 3410, a wireless device may determine whether a packet for a configured grant created; and a listen before talk for transmission of packet indicates clear channel. At 3420, the wireless device may start a BWP inactivity timer based on creating the packet for the configured grant; and the listen before talk for transmission of packet indicating a clear channel. At 3430 the wireless device may determine whether the BWP inactivity timer expired. At 3440, the wireless device may switch to a default BWP based on the BWP timer expiring.

According to an example embodiment, the wireless device may receive configured grant parameters of first configured grants, comprising the configured grant, of a bandwidth part. According to an example embodiment, the creating the packet is based on the first configured grant parameters. According to an example embodiment, the bandwidth part may be of an unlicensed cell. According to an example embodiment, the packet comprises data of one or more logical channels based on a numerology of the bandwidth part. According to an example embodiment, the first configured grant parameters may comprise a periodicity parameter indicating the first configured grant. According to an example embodiment, the receiving the first configured grant parameters may indicate activation of the first configured grants. According to an example embodiment, the wireless device may receive a downlink control information indicating activation of the first configured grants.

According to an example embodiment, the wireless device may receive a value of the inactivity timer, wherein the starting the inactivity timer may be with the value. According to an example embodiment, the packet may be a medium access control packet data unit. According to an example embodiment, the listen before talk procedure is based on an energy detection threshold. According to an example embodiment, the configuration parameters further indicate: a second value of a second inactivity timer of a second bandwidth part of a licensed cell; and second configured grant parameters of second configured grants for the second bandwidth part. According to an example embodiment, the wireless device may create a second packet based on a third configured grant of the second configured grants. The wireless device may start the second inactivity timer based on the creating the second packet.

Figure 35:
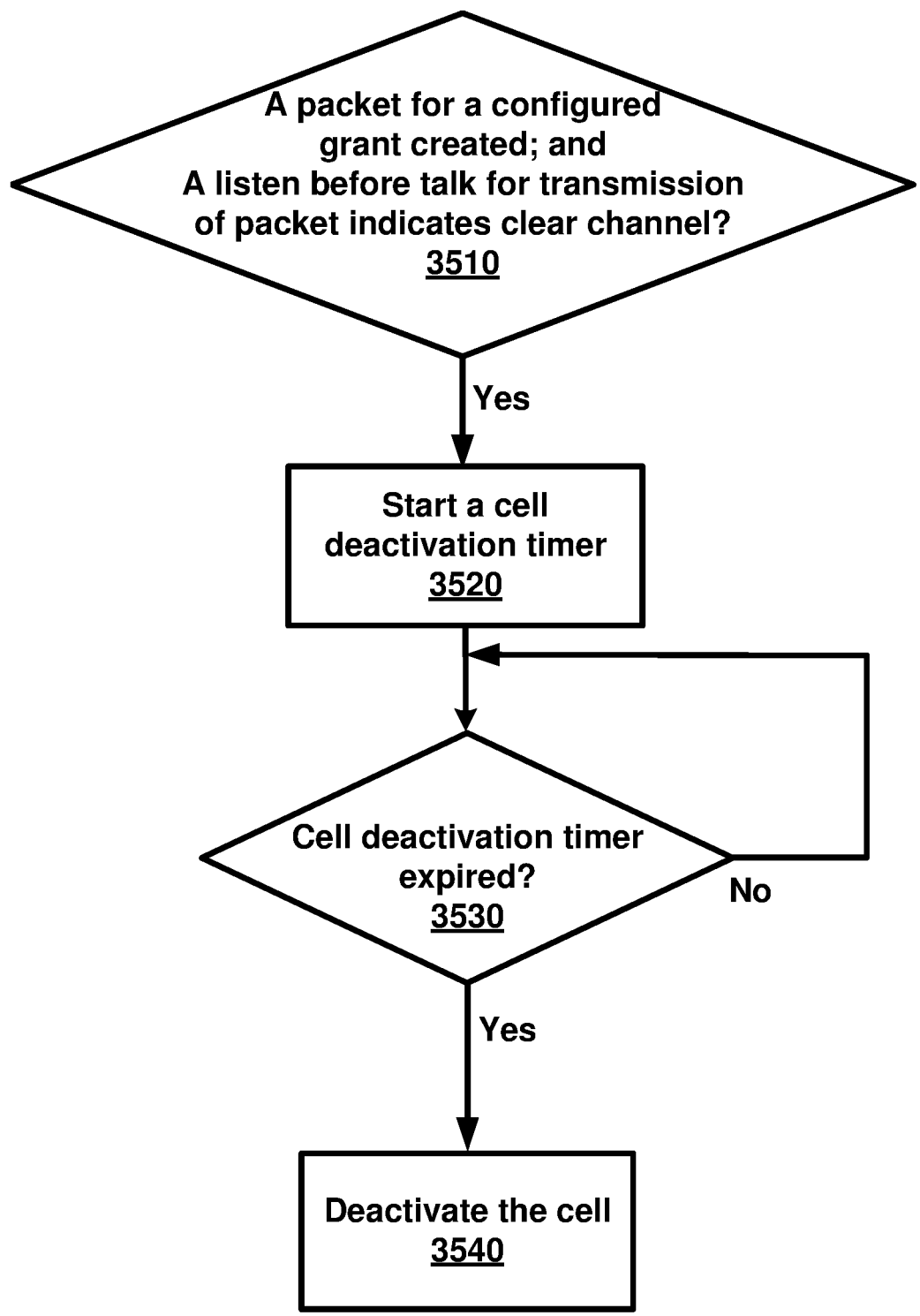
FIG. 35 is an example flow diagram of an aspect of an embodiment of the present invention disclosure.

FIG. 35 is a flow diagram as per an aspect of an example embodiment of the present disclosure. At 3510, a wireless device may determine whether a packet for a configured grant created; and a listen before talk for transmission of packet indicates clear channel. At 3520, the wireless device may start a cell deactivation timer based on creating the packet for the configured grant; and the listen before talk for transmission of packet indicating a clear channel. At 3530 the wireless device may determine whether the cell deactivation timer expired. At 3540, the wireless device may deactivate the cell based on the cell deactivation timer expiring.

According to an example embodiment, the wireless device may receive configuration parameters indicating: a value of a deactivation timer of the cell; and configured grant parameters of configured grants for the cell. According to an example embodiment, the cell is an unlicensed cell. According to an example embodiment, the wireless device may create the packet based on a first configured grant of the configured grants. According to an example embodiment, the wireless device may start a deactivation timer based on: creating a packet based on a configured grant of a cell; and a listen before talk procedure, for transmission of the packet, indicating a clear channel. The wireless device may deactivate the cell based on an expiry of the deactivation timer. According to an example embodiment, the wireless device may receive configuration parameters indicating: a value of a deactivation timer of the cell; and configured grant parameters of configured grants for the cell. According to an example embodiment, wherein the cell may be an unlicensed cell. According to an example embodiment, the listen before talk procedure may be based on an energy detection threshold. According to an example embodiment, the first configured grant parameters may comprise a periodicity parameter indicating the first configured grant. According to an example embodiment, the creating the packet may be based on the first configured grant parameters. According to an example embodiment, the packet may be a medium access control packet data unit. According to an example embodiment, the packet may comprise data of one or more logical channels based on a numerology of a bandwidth part of the unlicensed cell. According to an example embodiment, the configuration parameters may further indicate: a second value of a second deactivation timer of a licensed cell; and second configured grant parameters of second configured grants for the licensed cell. According to an example embodiment, the wireless device may create a second packet based on a third configured grant of the second configured grants. The wireless device may start the second deactivation timer based on the creating the second packet. According to an example embodiment, the receiving the first configured grant parameters may indicate activation of the first configured grants. According to an example embodiment, the wireless device may receive a downlink control information indicating activation of the first configured grants.

Embodiments may be configured to operate as needed. The disclosed mechanism may be performed when certain criteria are met, for example, in a wireless device, a base station, a radio environment, a network, a combination of the above, and/or the like. Example criteria may be based, at least in part, on for example, wireless device or network node configurations, traffic load, initial system set up, packet sizes, traffic characteristics, a combination of the above, and/or the like. When the one or more criteria are met, various example embodiments may be applied. Therefore, it may be possible to implement example embodiments that selectively implement disclosed protocols.

A base station may communicate with a mix of wireless devices. Wireless devices and/or base stations may support multiple technologies, and/or multiple releases of the same technology. Wireless devices may have some specific capability(ies) depending on wireless device category and/or capability(ies). A base station may comprise multiple sectors. When this disclosure refers to a base station communicating with a plurality of wireless devices, this disclosure may refer to a subset of the total wireless devices in a coverage area. This disclosure may refer to, for example, a plurality of wireless devices of a given LTE or 5G release with a given capability and in a given sector of the base station. The plurality of wireless devices in this disclosure may refer to a selected plurality of wireless devices, and/or a subset of total wireless devices in a coverage area which perform according to disclosed methods, and/or the like. There may be a plurality of base stations or a plurality of wireless devices in a coverage area that may not comply with the disclosed methods, for example, because those wireless devices or base stations perform based on older releases of LTE or 5G technology.

In this disclosure, "a" and "an" and similar phrases are to be interpreted as "at least one" and "one or more." Similarly, any term that ends with the suffix "(s)" is to be interpreted as "at least one" and "one or more." In this disclosure, the term "may" is to be interpreted as "may, for example." In other words, the term "may" is indicative that the phrase following the term "may" is an example of one of a multitude of suitable possibilities that may, or may not, be employed to one or more of the various embodiments.

If A and B are sets and every element of A is also an element of B, A is called a subset of B. In this specification, only non-empty sets and subsets are considered. For example, possible subsets of B={cell1, cell2} are: {cell1}, {cell2}, and {cell1, cell2}. The phrase "based on" (or equally "based at least on") is indicative that the phrase following the term "based on" is an example of one of a multitude of suitable possibilities that may, or may not, be employed to one or more of the various embodiments. The phrase "in response to" (or equally "in response at least to") is indicative that the phrase following the phrase "in response to" is an example of one of a multitude of suitable possibilities that may, or may not, be employed to one or more of the various embodiments. The phrase "depending on" (or equally "depending at least to") is indicative that the phrase following the phrase "depending on" is an example of one of a multitude of suitable possibilities that may, or may not, be employed to one or more of the various embodiments. The phrase "employing/using" (or equally "employing/using at least") is indicative that the phrase following the phrase "employing/using" is an example of one of a multitude of suitable possibilities that may, or may not, be employed to one or more of the various embodiments.

The term configured may relate to the capacity of a device whether the device is in an operational or non-operational state. Configured may also refer to specific settings in a device that effect the operational characteristics of the device whether the device is in an operational or non-operational state. In other words, the hardware, software, firmware, registers, memory values, and/or the like may be "configured" within a device, whether the device is in an operational or nonoperational state, to provide the device with specific characteristics. Terms such as "a control message to cause in a device" may mean that a control message has parameters that may be used to configure specific characteristics or may be used to implement certain actions in the device, whether the device is in an operational or non-operational state In this disclosure, various embodiments are disclosed. Limitations, features, and/or elements from the disclosed example embodiments may be combined to create further embodiments within the scope of the disclosure.

In this disclosure, parameters (or equally called, fields, or Information elements: IEs) may comprise one or more information objects, and an information object may comprise one or more other objects. For example, if parameter (IE) N comprises parameter (IE) M, and parameter (IE) M comprises parameter (IE) K, and parameter (IE) K comprises parameter (information element) J. Then, for example, N comprises K, and N comprises J. In an example embodiment, when one or more (or at least one) message(s) comprise a plurality of parameters, it implies that a parameter in the plurality of parameters is in at least one of the one or more messages, but does not have to be in each of the one or more messages. In an example embodiment, when one or more (or at least one) message(s) indicate a value, event and/or condition, it implies that the value, event and/or condition is indicated by at least one of the one or more messages, but does not have to be indicated by each of the one or more messages.

Furthermore, many features presented above are described as being optional through the use of "may" or the use of parentheses. For the sake of brevity and legibility, the present disclosure does not explicitly recite each and every permutation that may be obtained by choosing from the set of optional features. However, the present disclosure is to be interpreted as explicitly disclosing all such permutations. For example, a system described as having three optional features may be embodied in seven different ways, namely with just one of the three possible features, with any two of the three possible features or with all three of the three possible features.

Many of the elements described in the disclosed embodiments may be implemented as modules. A module is defined here as an element that performs a defined function and has a defined interface to other elements. The modules described in this disclosure may be implemented in hardware, software in combination with hardware, firmware, wetware (i.e. hardware with a biological element) or a combination thereof, all of which may be behaviorally equivalent. For example, modules may be implemented as a software routine written in a computer language configured to be executed by a hardware machine (such as C, C++, Fortran, Java, Basic, Matlab or the like) or a modeling/simulation program such as Simulink, Stateflow, GNU Octave, or LabVIEWMathScript. Additionally, it may be possible to implement modules using physical hardware that incorporates discrete or programmable analog, digital and/or quantum hardware. Examples of programmable hardware comprise: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. The above mentioned technologies are often used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

While various embodiments have been described above, it should be understood that they have been presented by way of example, and not limitation. It will be apparent to persons skilled in the relevant art(s) that various changes in form and detail can be made therein without departing from the scope. In fact, after reading the above description, it will be apparent to one skilled in the relevant art(s) how to implement alternative embodiments. Thus, the present embodiments should not be limited by any of the above described exemplary embodiments.

In addition, it should be understood that any figures which highlight the functionality and advantages, are presented for example purposes only. The disclosed architecture is sufficiently flexible and configurable, such that it may be utilized in ways other than that shown. For example, the actions listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112. Claims that do not expressly include the phrase "means for" or "step for" are not to be interpreted under 35 U.S.C. 112.

What is claimed is:

1. A method comprising:
   receiving, by a wireless device, a radio resource control (RRC) message comprising configuration parameters associated with a first bandwidth part (BWP) of a cell and a second BWP of the cell, and a first parameter indicating a first value associated with a listen before talk (LBT) counter for the cell;
   performing a first LBT procedure for a first uplink transmission via the first BWP;
   incrementing the LBT counter based on determination that the first LBT procedure fails; and
   switching from the first BWP to a second BWP as an active BWP, based on determination that the LBT counter reaches the first value,
   wherein the first value is used to determine after how many consistent uplink LBT failure events the wireless device triggers uplink LBT failure recovery.

2. The method of claim 1, further comprising transmitting one or more uplink signals via the second BWP based on the switching.

3. The method of claim 1, further comprising resetting the LBT counter based on a second LBT procedure for a second uplink transmission indicating a clear channel.

4. The method of claim 1, wherein a value of the LBT counter remains unchanged based on a second LBT procedure for a second uplink transmission indicating a clear channel.

5. The method of claim 1, wherein the first uplink transmission comprises one or more of:
   a sounding reference signal,
   a demodulation reference signal,
   a phase tracking reference signal,
   a physical random access channel signal,
   a physical uplink shared channel signal, or
   a physical uplink control channel signal.

6. The method of claim 1, wherein the first uplink transmission is transmission of one or more transport blocks.

7. The method of claim 1, wherein the first uplink transmission is based on a dynamic grant or a configured grant.

8. The method of claim 1,
   wherein, the RRC message further comprises a BWP inactivity timer of the cell, and
   wherein, the first BWP is switched to a default BWP, based on determination that the BWP inactivity timer of the cell has expired.

9. A wireless device comprising:
   one or more processors; and
   memory storing instructions that, when executed by the one or more processors, cause the wireless device to:

receive a radio resource control (RRC) message comprising configuration parameters associated with a first bandwidth part (BWP) of a cell and a second BWP of the cell, and a first parameter indicating a first value associated with a listen before talk (LBT) counter for the cell, perform a first LBT procedure for a first uplink transmission via the first BWP, increment the LBT counter based on determination that the first LBT procedure fails, and switch from the first BWP to a second BWP as an active BWP, based on determination that the LBT counter reaches the first value, wherein the first value is used to determine after how many consistent uplink LBT failure events the wireless device triggers uplink LBT failure recovery.

10. The wireless device of claim 9, wherein the instructions further cause the wireless device to transmit one or more uplink signals via the second BWP based on the switch.

11. The wireless device of claim 9, wherein the instructions further cause the wireless device to reset the LBT counter based on a second LBT procedure for a second uplink transmission indicating a clear channel.

12. The wireless device of claim 9, wherein a value of the LBT counter remains unchanged based on a second LBT procedure for a second uplink transmission indicating a clear channel.

13. The wireless device of claim 9, wherein the first uplink transmission comprises one or more of:
  a sounding reference signal,
  a demodulation reference signal,
  a phase tracking reference signal,
  a physical random access channel signal,
  a physical uplink shared channel signal, or
  a physical uplink control channel signal.

14. The wireless device of claim 9, wherein the first uplink transmission is transmission of one or more transport blocks.

15. The wireless device of claim 9, wherein the first uplink transmission is based on a dynamic grant or a configured grant.

16. The wireless device of claim 9,
  wherein, the RRC message further comprises a BWP inactivity timer of the cell, and
  wherein, the first BWP is switched to a default BWP, based on determination that the BWP inactivity timer of the cell has expired.

* * * * *